(12) United States Patent
Peneguy

(10) Patent No.: US 12,486,980 B2
(45) Date of Patent: Dec. 2, 2025

(54) VENT GAS RECOVERY WITH FLARE CONTROL DURING A FLARE EVENT

(71) Applicant: Chevron Phillips Chemical Company LP, The Woodlands, TX (US)

(72) Inventor: Daniel W. Peneguy, League City, TX (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 636 days.

(21) Appl. No.: 17/821,373

(22) Filed: Aug. 22, 2022

(65) Prior Publication Data
US 2024/0068661 A1 Feb. 29, 2024

(51) Int. Cl.
| | | |
|---|---|---|
| *F23G 7/08* | (2006.01) | |
| *F23G 7/06* | (2006.01) | |
| *F23L 7/00* | (2006.01) | |
| *F23N 1/02* | (2006.01) | |
| *F23N 5/26* | (2006.01) | |

(52) U.S. Cl.
CPC ............. *F23G 7/085* (2013.01); *F23G 7/065* (2013.01); *F23N 1/022* (2013.01); *F23N 5/265* (2013.01); *F23L 7/005* (2013.01); *F23N 2225/04* (2020.01); *F23N 2241/12* (2020.01)

(58) Field of Classification Search
CPC ...... F23G 2207/102; F23G 7/08; F23G 7/085; F23G 2209/14
See application file for complete search history.

(56) References Cited

U.S. PATENT DOCUMENTS

| | | | | |
|---|---|---|---|---|
| 2,758,473 | A | * | 8/1956 | Templeton .............. G01F 23/14 |
| | | | | 73/861.53 |
| 2,891,607 | A | * | 6/1959 | Webster .................... F23G 7/08 |
| | | | | 137/247.35 |
| 7,014,824 | B2 | | 3/2006 | Krodel |
| 8,096,803 | B2 | | 1/2012 | Mashhour |
| 9,267,686 | B1 | | 2/2016 | Little |
| 9,677,762 | B2 | | 6/2017 | Tullos |

(Continued)

FOREIGN PATENT DOCUMENTS

WO 2017009158 A1 1/2017

OTHER PUBLICATIONS

Adam Bader et al., Selecting the Proper Flare Systems, CEP, Jul. 2011 at 45.

(Continued)

*Primary Examiner* — Jorge A Pereiro
(74) *Attorney, Agent, or Firm* — Scheef & Stone, LLP

(57) ABSTRACT

Flare control with vent gas recovery is disclosed. Vent gas is recovered for end use (e.g., process gas, fuel gas, etc.) while a flare is in a standby state. Upon detection of a flare event that causes vent gas to flow to the flare, the flare is changed from the standby state to an active state. The flare is controlled for efficient combustion of vent gas that flows to the flare during the flare event. Upon detection of a subsidence of the flare event, the flare is changed from the active state to the standby state. The flare can remain in standby until another flare event is detected. The flare event is detected when one or more of the disclosed flare activation conditions are detected, and subsidence of the flare event is detected when the flare deactivation conditions are detected.

19 Claims, 11 Drawing Sheets

(56) References Cited

U.S. PATENT DOCUMENTS

| | | | |
|---|---|---|---|
| 10,746,400 B2 | 8/2020 | Johnson | |
| 11,047,573 B2 | 6/2021 | Fisher | |
| 11,150,220 B2 | 10/2021 | Tao | |
| 2011/0085030 A1 | 4/2011 | Poe | |
| 2011/0308482 A1* | 12/2011 | Hottovy | F02C 9/40 |
| | | | 123/3 |
| 2016/0091355 A1* | 3/2016 | Mesnard | G01F 1/698 |
| | | | 73/197 |
| 2019/0242575 A1* | 8/2019 | Fisher | F23L 7/005 |
| 2021/0278081 A1* | 9/2021 | Fisher | F23G 7/085 |
| 2022/0107087 A1* | 4/2022 | Beck | F23G 7/085 |

OTHER PUBLICATIONS

Kolmetz Handbook of Process Equipment Design, Flare Systems Safety, Selection and Sizing, Rev.01 pp. 1-19 (2007).
Marc McDaniel, Flare Efficiency Study, prepared for the U.S. Environmental Protection Agency EPA-600/2-83/052 (Jul. 1983).
Parameters for Properly Designed and Operated Flares, U.S. Environmental Protection Agency Office of Air Quality Planning and Standards (Apr. 2012).
Petroleum Refinery Sector Risk and Technology Review and New Source Performance Standards, vol. 79, No. 158, Fed. Reg. 36,880 (Aug. 15, 2014).
Pressure-relieving and Depressuring Systems, API Standard 521, 6th Ed. (Jan. 2014).

\* cited by examiner

VENT GAS RECOVERY WITH FLARE CONTROL DURING A FLARE EVENT

CROSS-REFERENCE TO RELATED APPLICATIONS

Not applicable.

STATEMENT REGARDING FEDERALLY SPONSORED RESEARCH OR DEVELOPMENT

Not applicable.

FIELD

This disclosure generally relates to the control of flow of one or more of vent gas, air, steam, and supplemental fuel gas to a flare during a flare event.

BACKGROUND

Chemical and petroleum production, refining, and processing plants and facilities can produce plant gases, which can include both continuous streams of combustible gases, and occasional streams of combustible gases. It is generally desirable that the combustible gases are economically and completely consumed.

One technique for consuming the combustible gases is flaring. The flame of the flare may be elevated high above the ground on a flare stack or closer to the ground in the case of a ground flare. In both cases a vent gas having flammable gaseous components can be directed to the flare. Efficient combustion of the vent gas can be accomplished by supplying air or steam to the combustion zone of the flare along with a supplemental fuel gas as necessary.

The flow of the vent gas to the flare can change greatly, for example, due to an emergency shutdown (e.g., loss of electricity, failure of key plant component, natural disaster) or planned operations (e.g., startup, normal shutdown, or normal transitions between sets of operating conditions), and can lead to undesirable amounts of vent gas being flared.

There is a need to reduce use of the flare, and to maintain efficient combustion of combustible gases when the flare is in use.

SUMMARY

Methods and apparatuses for vent gas recovery with flare control during a flare event are disclosed.

A method as disclosed herein can include flowing, while a flare is in a standby state, a vent gas to a vent gas recovery system; detecting one or more flare activation conditions; adjusting the flare from the standby state to an active state based on the detecting; and controlling, while the flare is in the active state and in real-time based at least in part on a concentration of at least one hydrocarbon in a vent gas stream that is fluidly connected to the flare, i) a flow of supplemental fuel gas and a flow of steam to the flare or ii) a flow of supplemental fuel gas and a flow of air to the flare.

Another method as disclosed herein can include flowing, while a flare is in an active state, a vent gas to a vent gas recovery system and to a flare; controlling, in real-time based at least in part on a concentration of at least one hydrocarbon in a vent gas stream, i) a flow of supplemental fuel gas and a flow of steam to the flare or ii) a flow of supplemental fuel gas and a flow of air to the flare; detecting, while the flare is in the active state, a plurality of flare deactivation conditions; and adjusting the flare from the active state to a standby state based on the detecting.

A flare control and vent gas recovery apparatus as disclosed herein can include a raw vent gas stream configured to split into a first stream and a second stream; a vent gas recovery system having an inlet fluidly coupled to the first stream; a pressure seal apparatus having a seal inlet fluidly coupled to the second stream; a vent gas stream having a vent gas flow meter located therein, wherein the vent gas stream is fluidly coupled to a seal inlet or to a seal outlet of the pressure seal apparatus, wherein the pressure seal apparatus has a differential pressure sensor fluidly coupled to the seal inlet and to the seal outlet, wherein the pressure seal apparatus has a liquid level sensor configured to indicate a liquid level in the pressure seal apparatus; a supplemental fuel gas stream fluidly coupled to the vent gas stream upstream or downstream of a first location in the vent gas stream where the seal outlet is coupled to the vent gas stream, wherein the supplemental fuel gas stream has a supplemental fuel gas flow meter located therein; a flare fluidly coupled to the vent gas stream downstream of a second location in the vent gas stream where the supplemental fuel gas stream is fluidly coupled to the vent gas stream; and a flare control system coupled to the differential pressure sensor, the liquid level sensor, the vent gas flow meter, and the supplemental fuel gas flow meter, wherein the flare control system is configured to i) detect a flare activation condition or a plurality of flare deactivation conditions and ii) adjust the flare between a standby state and an active state.

The foregoing has outlined rather broadly the features and technical advantages of the disclosed inventive subject matter in order that the following detailed description may be better understood. The various characteristics described above, as well as other features, will be readily apparent to those skilled in the art upon reading the following detailed description of the preferred aspects and embodiments, and by referring to the accompanying drawings.

DESCRIPTION OF THE DRAWINGS

For a detailed description of the preferred aspects and embodiments of the disclosed methods and apparatuses, reference will now be made to the accompanying drawings in which.

DETAILED DESCRIPTION

Figure 1A:
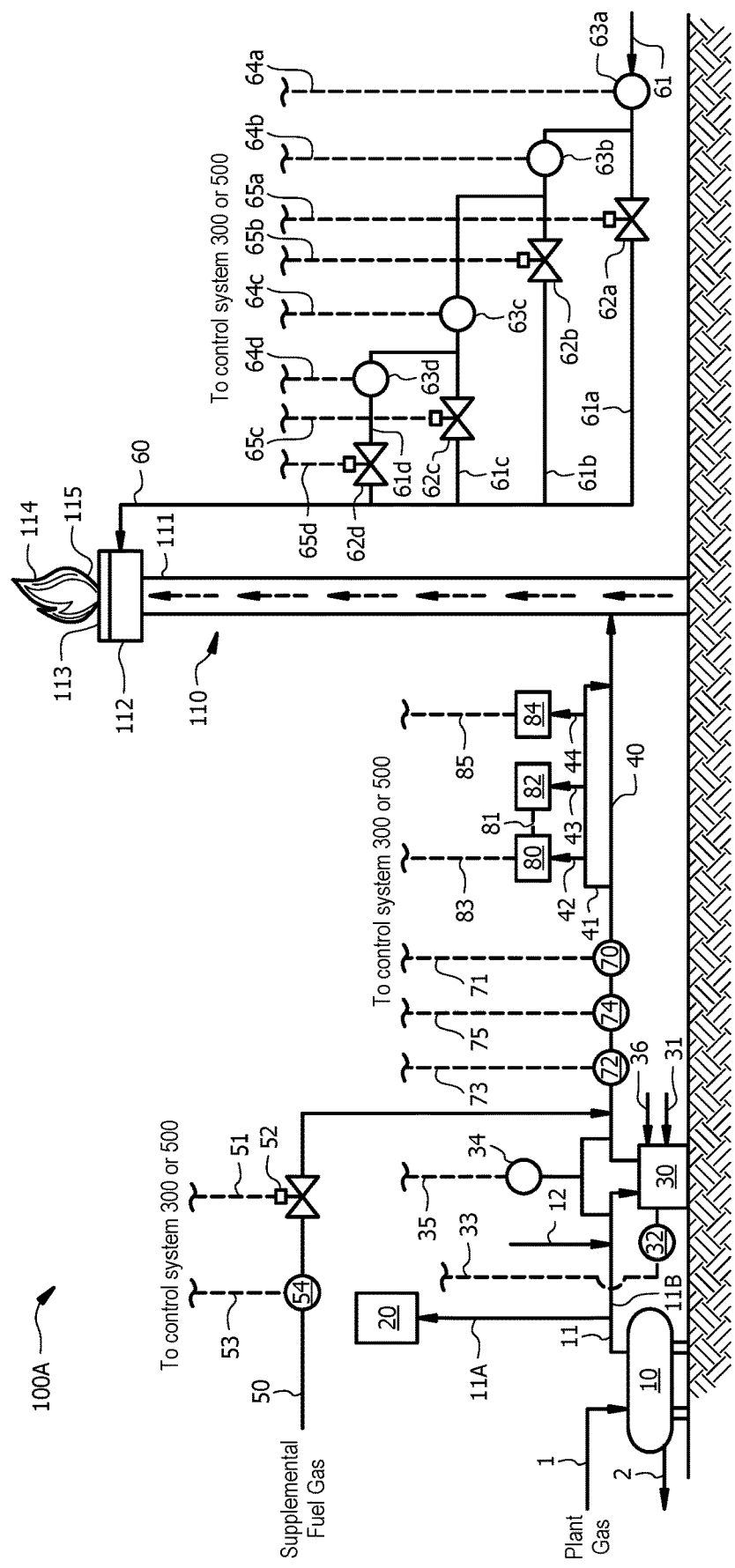
FIG. 1A illustrates a schematic diagram of an embodiment of a flare control and vent gas recovery apparatus utilizing steam-assisted flaring.

The description herein may be in context of the apparatus or in context of method steps; however, it is contemplated that aspects and embodiments of the disclosed method can include features discussed in apparatus context and that aspects and embodiments of the disclosed apparatus can include features discussed in the method context.

As used herein, the term "vent gas" refers to the combination of organic and inorganic gases that can feed to a flare for combustion, including any supplemental fuel gas added as described herein.

As used herein, the term "supplemental fuel gas" refers to a fuel gas, a natural gas, one or more of a similar flammable gas, or a combination thereof.

As used herein, the term "real-time" means that controlling either the concentration of at least one hydrocarbon, the flow of steam, the flow of air, the flow of a supplemental fuel gas, or a combination thereof occurs less than one minute, preferably less than 20 seconds, after the measurement of the concentration of at least one hydrocarbon in a vent gas stream, the measurement of the velocity of the vent gas in the vent gas stream, or a combination thereof.

As used herein, the term "net heating value" is the lower heating value of a chemical component, in units of BTU/SCF, except where specifically noted otherwise.

As used herein, the term "combustion zone" of a flare is defined as the portion of the flame at the flare tip where the gas received from a vent gas stream is combined with steam and/or air and combusted.

As used herein, the term "efficient combustion" is defined as having a combustion efficiency or a destruction efficiency of at least the threshold set by local regulatory agencies.

$$\text{combustion efficiency } \% = \frac{CO_2}{CO_2 + CO + THC + Cp}$$

$$\text{destruction efficiency } \% = \frac{CO_2 + CO}{CO_2 + CO + THC + Cp}$$

where $CO_2$ is the carbon dioxide concentration (ppmv), CO is the carbon monoxide concentration (ppmv), THC is the total hydrocarbon concentration (ppmv as methane), Cp is the particulate concentration (ppmv), all concentrations being measured at or over the flame of a flare. For example, currently in the United States the combustion efficiency of a flare should be at least 96.5% or the destruction efficiency should be at least 98%. Flares are designed to achieve the desired combustion efficiency (e.g. at least 96.5%) with a net heating value in the combustion zone or a net heating value in the vent gas of at least a specific value. Currently in the United States for common flare designs this net heating value in the combustion zone is at least 270 BTU/SCF for steam-assisted flares or at least 22 BTU/SQF on a dilution basis for air-assisted flares. The net heating value in the vent gas is at least 300 BTU/SCF. Efficiency of a flare is discussed in more detail in Marc McDaniel, *Flare Efficiency Study*, prepared for the U.S. Environmental Protection Agency EPA-600/2-83/052 (July 1983), *and Parameters for Properly Designed and Operated Flares*, U.S. Environmental Protection Agency Office of Air Quality Planning and Standards (April 2012), each of which is incorporated by reference. Applicable regulations are also found in Title 40 of the Code of Federal Regulations, Parts 60 and 63.

Disclosed herein are aspects and embodiments of a method and apparatus for vent gas recovery with flare control during a flare event. Vent gas can be recovered for end use (e.g., process gas, fuel gas, etc.) while a flare is in a standby state. Upon detection of a flare event that causes vent gas to flow to the flare, the flare is changed from the standby state to an active state. The flare is controlled for efficient combustion of vent gas that flows to the flare during the flare event. Upon detection of a subsidence of the flare event, the flare can be changed from the active state to the standby state. The flare can remain in the standby state until another flare event is detected. The flare event is detected when one or more of the disclosed flare activation conditions are detected, and subsidence of the flare event is detected when the flare deactivation conditions are detected. During the active state of the flare, the methods and apparatuses can automatically control, in real-time, the flow of one or more of the vent gas, steam or air, and supplemental fuel gas to the flare that is configured to combust the vent gas. During the standby state, a re-sealable pressure seal apparatus can prevent vent gas flow to the flare while vent gas is directed to the vent gas recovery system.

The disclosed methods and apparatuses improve the field of flaring because the amount of vent gas sent to the flare is reduced, since the methods and apparatuses are designed to flow vent gas to a vent gas recovery system, and since vent gas flows to the flare only upon occurrence of a flare event. A flare event can include any plant event that triggers the flare activation conditions disclosed herein, including but not limited to plant upset, vent gas recovery system upset, an increase in plant capacity, etc. Moreover, when flaring is needed, the methods and apparatuses disclosed herein advantageously allow for automated flare control over a wide spectrum of flare operating conditions, including emergency operations and planned operations, due to the real-time control. Moreover still, each of the embodiments disclosed herein allows automated control of supplemental fuel gas flow to the flare without interfering with operation of the vent gas recovery system. Further, efficient combustion when the flare is in an active state results in more complete destruction of the vent gas components and better environmental performance of the plant.

The disclosed embodiments also improve the field of flaring by utilizing a pressure seal apparatus to prevent vent gas from flowing to the flare. Once the seal is broken, the disclosed embodiments allow for re-sealing of the pressure seal apparatus. Thus, the same pressure seal apparatus can be used over and over to control flow of vent gas to the flare. The disclosed embodiments can also reduce the likelihood of cooling-induced transient flows through the vent gas flow meter of the disclosed embodiments.

The disclosed embodiments also can monitor and control the flow of supplemental fuel gas to the flare, and use the flow of supplemental fuel gas in flare control calculations. Flare control can be more responsive in response to changes in supplemental fuel gas flow, resulting in lower supplemental fuel gas consumption during flaring.

Some embodiments (e.g., those disclosed in FIG. 1B, FIG. 1O, FIG. 2B, and FIG. 2C) allow direct measurement of only vent gas at the vent gas flow meter, which eliminate the need to account for supplemental fuel gas flow at the vent gas flow meter, when relying on the vent gas flow meter to determine if the vent gas is flowing to the flare (flow greater that zero at the vent gas flow meter is one of the flare activation conditions disclosed herein).

Figure 1B:
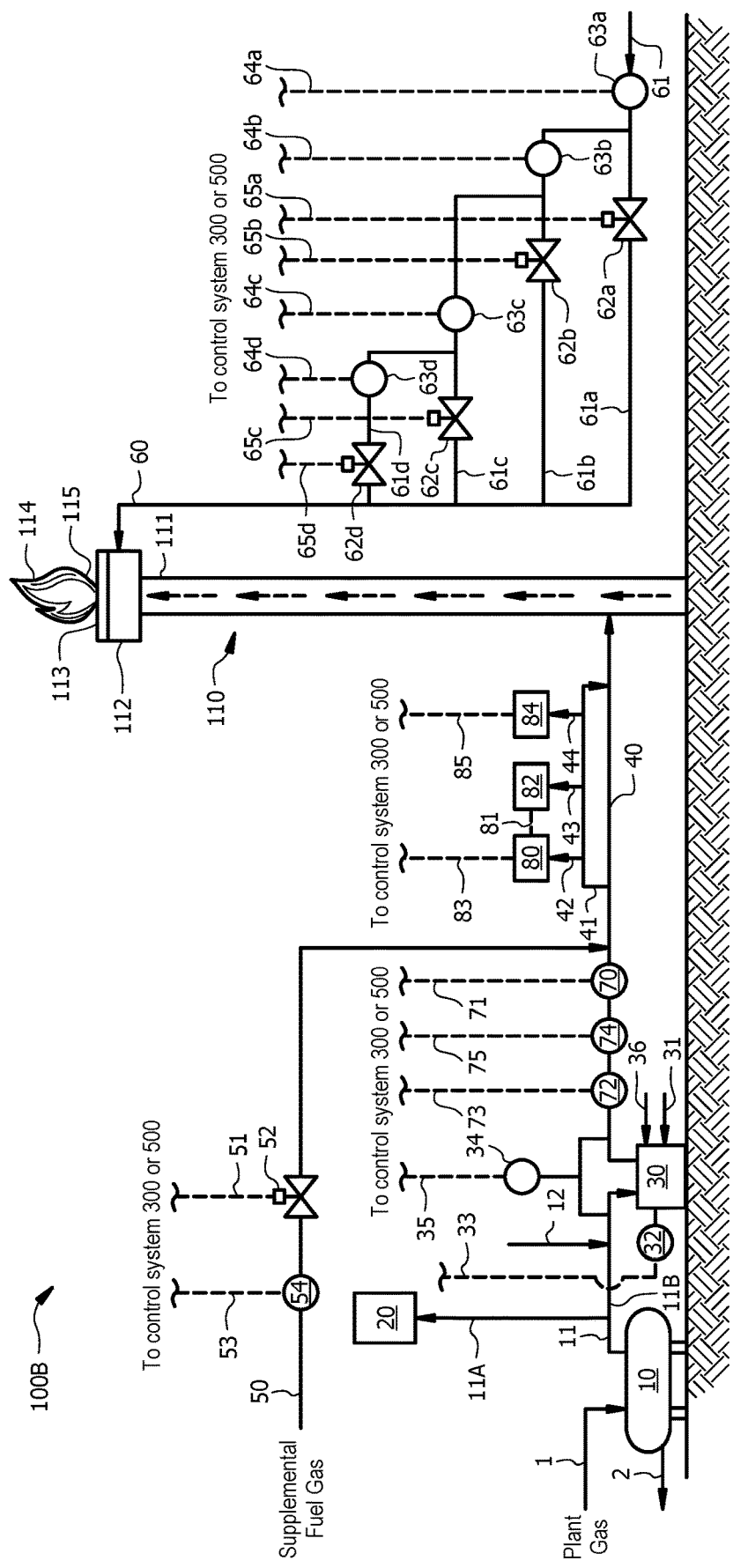
FIG. 1B illustrates a schematic diagram of another embodiment of a flare control and vent gas recovery apparatus utilizing steam-assisted flaring.
Figure 2A:
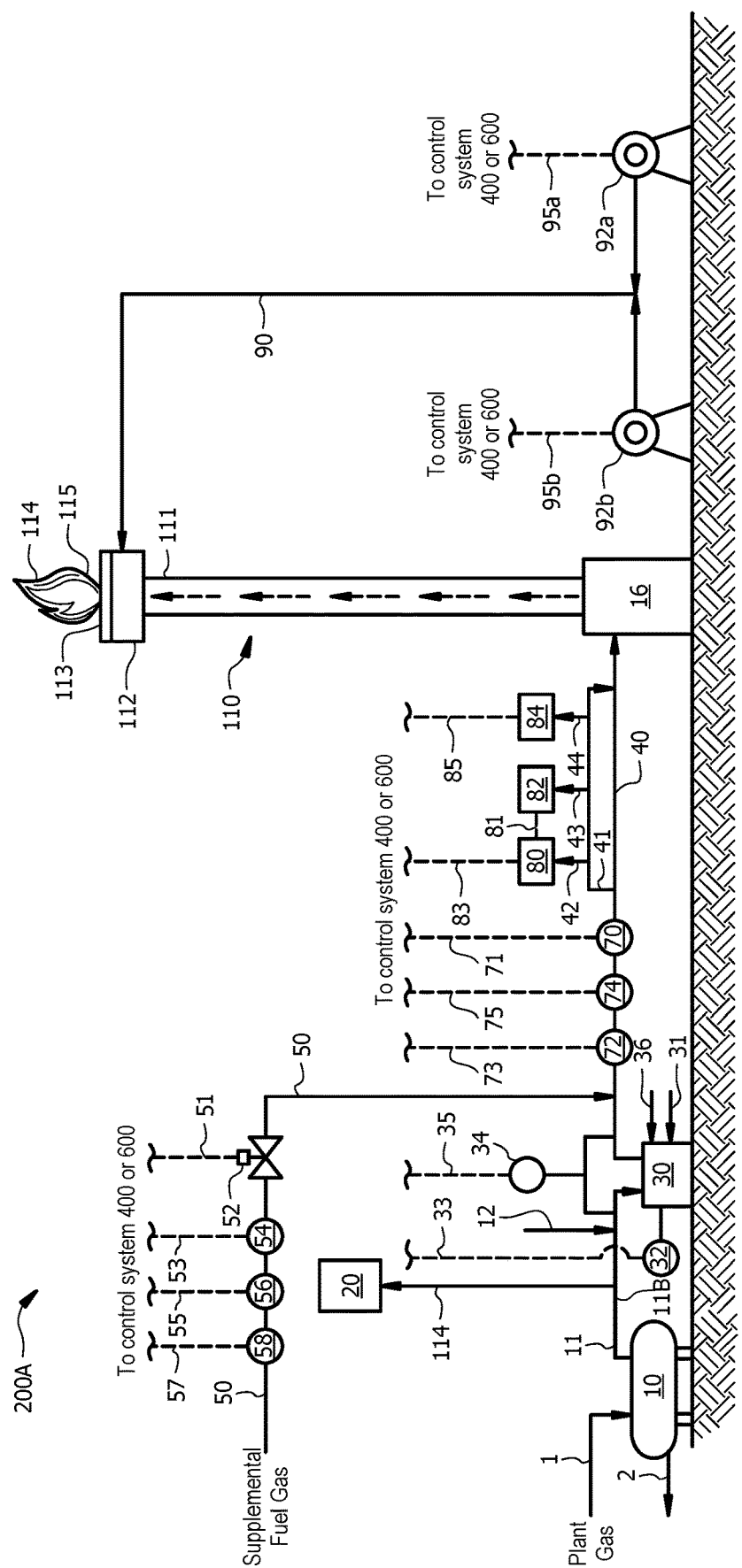
FIG. 2A illustrates a schematic diagram an embodiment of a flare control and vent gas recovery apparatus utilizing air-assisted flaring.
Figure 2B:
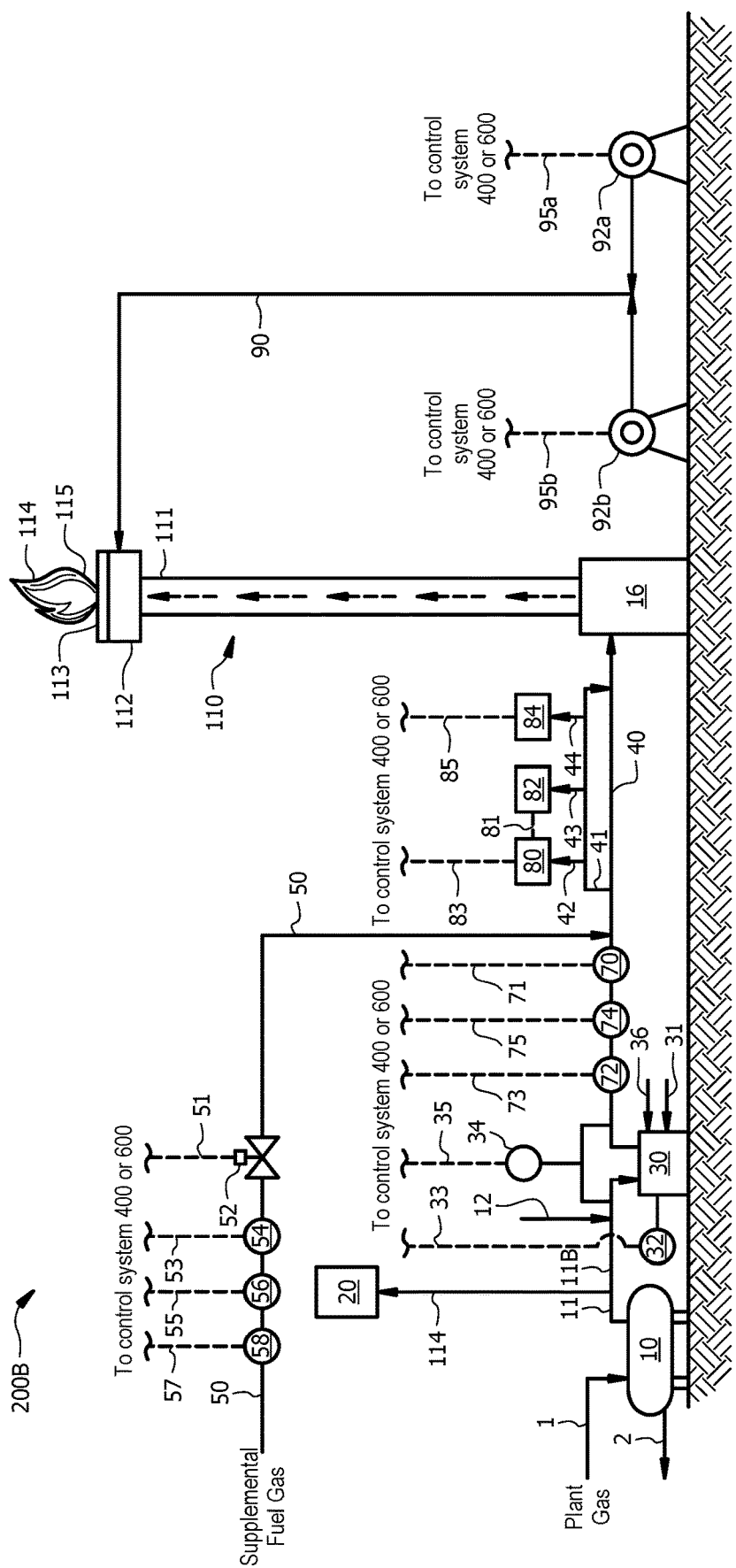
FIG. 2B illustrates a schematic diagram another embodiment of a flare control and vent gas recovery apparatus utilizing air-assisted flaring.
Figure 2C:
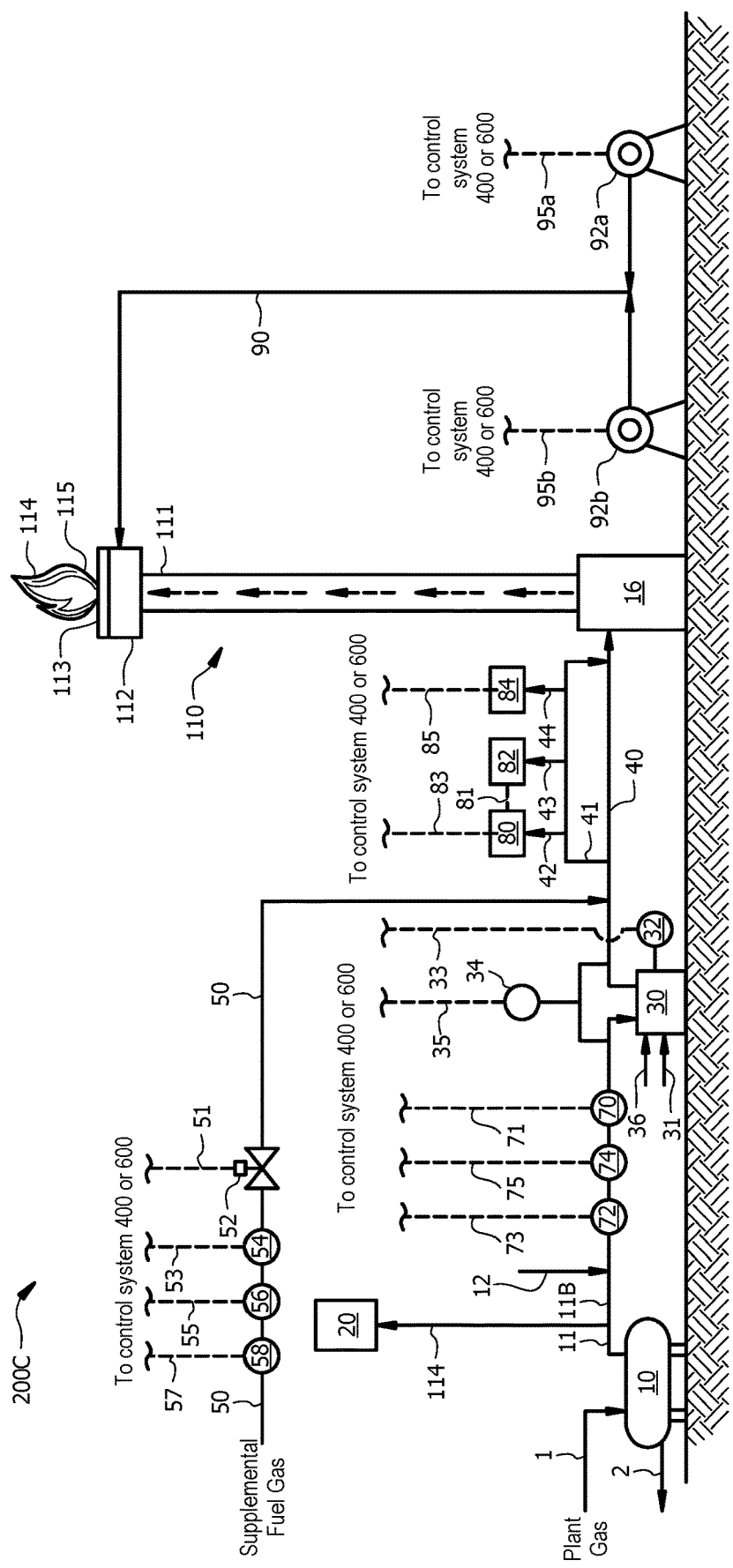
FIG. 2C illustrates a schematic diagram another embodiment of a flare control and vent gas recovery apparatus utilizing air-assisted flaring.

FIG. 1A illustrates an embodiment of a flare control and vent gas recovery apparatus 100A utilizing steam-assisted flaring. FIG. 1B illustrates another embodiment of a flare control and vent gas recovery apparatus 100B utilizing steam-assisted flaring. FIG. 1O illustrates another embodiment of a flare control and vent gas recovery apparatus 100C utilizing steam-assisted flaring. FIG. 2A illustrates an embodiment of a flare control and vent gas recovery apparatus 200A utilizing air-assisted flaring. FIG. 2B illustrates another embodiment of a flare control and vent gas recovery apparatus 200B utilizing air-assisted flaring. FIG. 2C illustrates another embodiment of a flare control and vent gas recovery apparatus 200C utilizing air-assisted flaring.

Each of the apparatuses 100A, 10013, 100C, 200A, 200B, and 200C can include a knockout pot 10, a vent gas recovery system 20, a pressure seal apparatus 30, a flare 110, a vent gas stream 40 having the instrumentation disclosed herein, a supplemental fuel gas stream 50 having the control valve and instrumentation disclosed herein, and a flare control system 300, 400, 500, or 600. Apparatuses 100A, 10013, and 100C can further include a steam stream 60 coupled with associated control valves and instrumentation disclosed herein. Apparatuses 200A, 200B, and 200C can further include an air stream 90 coupled with blowers as described herein.

Each flare control and vent gas recovery apparatus 100A, 10013, 100C, 200A, 200B, and 200C can include at least one knockout pot 10. The knockout pot 10 can have any configuration known in the art for recovering the raw vent gas stream 11. For example, the knockout pot 10 can be of any typical configuration found in a petrochemical plant or refinery, for example, a horizontal cylindrical shape configured to separate liquid from gas, where gas exits the top of the knockout pot 10. The knockout pot 10 can be configured to receive a plant gas in plant gas stream 1 (the plant gas stream 1 can interchangeably be referred to as the flare header of the flare 110), and to recover a raw vent gas stream 11 containing vent gas from the plant gas stream 1. In aspects, the plant gas stream 1 can be recovered from at least part of a stream from a cracking unit, a natural gas liquid facility, a polymer production facility, a poly alpha olefin (PAO) plant, a normal alpha olefin (NAO) plant, a reformer, a catalytic cracker, an alkylation process, any other petrochemical process, or refining process incorporating a flammable hydrocarbon, or a combination thereof. The knockout pot 10 can be further configured to recover separated liquid in liquid stream 2.

In additional aspects, the flare control and vent gas recovery apparatus 100A, 100B, 100C, 200A, 200B, and 200C can have more than one knockout pot configured similarly to knockout pot 10 and configured to recover other raw vent gases from other plant gas streams. The other raw vent gases can be combined into raw vent gas stream 11 along with the raw vent gas recovered from knockout pot 10 to be collectively referred to as the recovered raw vent gas in stream 11.

In aspects, the knockout pot 10 can be located in a cracking unit, a natural gas liquid facility, a polymer production facility, a poly alpha olefin (PAO) plant, a normal alpha olefin (NAO) plant, a reformer, a catalytic cracker, an alkylation process, any other petrochemical process, or refining process incorporating a flammable hydrocarbon, or a combination thereof.

The vent gas in the raw vent gas stream 11 can include a wide variety of gaseous components, typically organic gases, inorganic gases, and any other gases which are present in a cracking unit, a natural gas liquid facility, a polymer production facility, a poly alpha olefin (PAO) plant, a normal alpha olefin (NAO) plant, a reformer, a catalytic cracker, an alkylation process, any other petrochemical process, or refining process incorporating a flammable hydrocarbon, or a combination thereof. Examples of components of the vent gas in the vent gas stream 40 include one or more of $C_1$-$C_{20}$ hydrocarbons, nitrogen, carbon monoxide, carbon dioxide, water (as vapor or steam), hydrogen, hydrogen sulfide, hydrogen cyanide, ammonia, amine, a molecule containing HC+N, a molecule containing +O, a molecule containing +S, or a combination thereof.

As can be seen in FIGS. 1A, 1B, 1O, 2A, 2B, and 2C, the vent gas stream 11 can be configured to split into a first stream 11A and a second stream 11B. The flow of vent gas in first stream 11A (and subsequently to the vent gas recovery system 20) and in second stream 11B (and subsequently in the vent gas stream 40) depends on whether vent gas has broken the seal of the pressure seal apparatus 30. When the seal is broken by the vent gas, the apparatuses 100A, 100B, 100C, 200A, 200B, and 200C are configured to change the flare 110 from a standby state to an active state upon detection of one or more flare activation conditions (described in more detail herein). That is, the flare 110 can be changed from a standby state to an active state upon the occurrence of a flare event that is indicated by flare activation conditions. When the seal is re-sealed, the apparatuses 100A, 100B, 100C, 200A, 200B, and 200C are configured to change the flare 110 from the active state to the standby state upon detection of multiple flare deactivation conditions (described in more detail herein). That is, the flare 110 can be changed from the active state to the standby state after subsidence of a flare event that is indicated by flare deactivation conditions.

For clarity, description of flare states will begin with the flare 110 in the standby state. In the standby state of the flare 110, vent gas can flow only in first stream 11A to the vent gas recovery system 20. It is contemplated that no vent gas from the knockout pot 10 flows in vent gas stream 40 when the flare 110 is in the standby state. In apparatuses 100A, 100B, 200A, and 200B, a sweep line 12 can be connected to the second stream 11B at a location upstream of the inlet of the pressure seal apparatus 30. In apparatuses 100C and 200C, the sweep line 12 can be connected to the second stream 11B at a location upstream of the inlet of the pressure seal apparatus 30 and of the vent gas flow meter 70 that is in the second stream 11B. The sweep line 12 is configured to flow a sweep gas into second stream 11B at a pressure lower than the seal pressure of the pressure seal apparatus 30 such that that sweep gas (e.g., fuel gas or natural gas) flows in the second stream 11B toward the point where raw vent gas stream 11 splits, and then into first stream 11A to the vent gas recovery system 20. The flow of gas in sweep line 12 and to the vent gas recovery system 20 during standby state of the flare 110 is contemplated to prevent stagnant conditions in the second stream 11B that may allow buildup of corrosive or other undesired materials. In alternative aspects without use of a sweep gas, vent gas can be allowed to occupy second stream 11B and remain stagnant in second stream 11B until a flare event pushes the stranded vent gas in second stream 11B through the pressure seal apparatus 30.

Upon the occurrence of one or more flare activation conditions that indicate a flare event, the apparatuses 100A, 100B, 100C, 200A, 200B, and 200C can be configured to change the flare 110 from the standby state to the active state. In the active state, vent gas flows in the second stream 11B, through the pressure seal apparatus 30 and then through the vent gas stream 40 (or through the vent gas stream 40 and then through the pressure seal apparatus 30, and to the flare 110. When the flare 110 is in the active state, embodiments of this disclosure contemplate that a first portion of the vent gas continues to flow in the first stream 11A and a second portion of the vent gas flows in second stream 11B. Alternative embodiments contemplate (such as during upset in the vent gas recovery system 20), that when the flare 110 is in the active state, all of the vent gas can flow in the second stream 11B while a reduced flow or no flow of vent gas flows in the first stream 11A.

Upon the occurrence of one or more flare deactivation conditions that indicate subsidence of a flare event, the apparatuses 100A, 100B, 100C, 200A, 200B, and 200C can be configured to change the flare 110 from the active state to the standby state. In the standby state, vent gas again can flow only in first stream 11A to the vent gas recovery system 20. As previously described, a sweep gas in line 12 can be used to prevent stagnant conditions in the second stream 11B that may allow buildup of corrosive or other undesired materials; alternatively, vent gas can be allowed to occupy second stream 11B and remain stagnant in second stream 11B until a flare event pushes the stranded vent gas in second stream 11B through the pressure seal apparatus 30.

In aspects, the vent gas recovery system 20 can be configured to receive all or a portion of the raw vent gas in raw vent gas stream 11 from the knockout pot 10. The raw vent gas that flows to the vent gas recovery system 20 can flow via first stream 11A, which is fluidly connected to the vent gas recovery system 20 and fluidly coupled to the knockout pot 10. First stream 11A can also be referred to as the feed stream for the vent gas recovery system 20. When the flare 110 is in a standby state, all of the raw vent gas flows from the knockout pot 10 in stream 11, into first stream 11A, and then to the vent gas recovery system 20. When the flare 110 is in an active state, the vent gas recovery system 20 can remain online and the raw vent gas in raw vent gas stream 11 can be split into a first portion that flows in first stream 11A and a second portion that flows in the second stream 11B.

In aspects, the pressure seal apparatus 30 is configured to provide a head pressure against a forward flow of the vent gas in the second stream 11B to the flare 110. In some aspects, a purge flow in purge stream 36 to the pressure seal apparatus 30 can be utilized and configured to prevent air ingress into the flare 110. The purge flow can be a flow of an inert gas (e.g., nitrogen) or fuel gas (e.g., natural gas or fuel gas), and the purge flow exits the pressure seal apparatus 30, flowing to the flare 110. The pressure seal apparatus 30 is configured to allow vent gas to flow to the flare 110 when a head pressure of the vent gas is greater than the head pressure of the pressure seal apparatus 30. In aspects, the pressure seal apparatus 30 can be embodied as a vessel having a level of water contained therein that provides a head pressure against a flow of vent gas to the flare 110. If the pressure of vent gas in the second stream 11B (and raw vent gas stream 11) exceeds the head pressure of the water in the liquid seal vessel, then the vent gas can move through the water in the vessel and into piping or conduit of the vent gas stream 40 that fluidly couples the pressure seal apparatus 30 to the flare 110. Flow of vent gas through the vessel can cause water to splash out of the pressure seal apparatus 30, lowering the water level and head pressure. In some embodiments, the pressure seal apparatus 30 can include a makeup water line 31 and a level sensor 32. The makeup water line 31 and level sensor 32 can each be connected to the vessel that holds the water in the pressure seal apparatus 30. The level sensor 32 can sense a level of water in the pressure seal apparatus 30. If a flare event causes the head pressure of the vent gas to overcome the head pressure of the water, and water subsequently splashes out of the pressure seal apparatus 30, level sensor 32 can be configured to detect the lower level of water that is below the setpoint level, and can be further configured to send a signal to control system 300, 400, 500, or 600 so that makeup water line 31 can be opened to fill the pressure seal apparatus 30 with water to the setpoint level. In embodiments, the level sensor 32 can communicate with the flare control system 300, 400, 500, or 600 through a communication line 33.

A differential pressure sensor 34 can be included in the apparatuses 100A, 100B, 100C, 200A, 200B, and 200C. The differential pressure sensor 34 can be configured to measure the difference in pressure between the pressure upstream of the pressure seal apparatus 30 and the pressure downstream of the pressure seal apparatus 30. In FIGS. 1A, 1B, 2A, and 2B, the differential pressure sensor 34 can have one side connected to the second stream 11B immediately upstream of the pressure seal apparatus 30 and an opposite side connected to the vent gas stream 40 immediately downstream of the pressure seal apparatus 30. Alternatively in FIGS. 1A, 1B, 2A, and 2B, the differential pressure sensor 34 can have one side connected to an inlet of the pressure seal apparatus 30 and an opposite side connected to an outlet of the pressure seal apparatus 30. In FIGS. 10 and 2C, the differential pressure sensor 34 can have one side connected to the vent gas stream 40 immediately upstream of the pressure seal apparatus 30 and an opposite side connected to the vent gas stream 40 immediately downstream of the pressure seal apparatus 30 between the pressure seal apparatus 30 and the flare 110. Alternatively in FIGS. 10 and 2C, the differential pressure sensor 34 can have one side connected to an inlet of the pressure seal apparatus 30 and an opposite side connected to an outlet of the pressure seal apparatus 30. In embodiments, the differential pressure sensor 34 can communicate with the flare control system 300, 400, 500, or 600 through a communication line 35.

Each flare control and vent gas recovery apparatus 100A, 100B, 100C, 200A, 200B, and 200C can include a first gas analyzer 80 coupled to the vent gas stream 40. The first gas analyzer 80 can be configured to analyze the vent gas in a sample stream formed by lines 41 and 42 taken from the vent gas stream 40. FIG. 1A, FIG. 1B, FIG. 10, FIG. 2A, FIG. 2B, and FIG. 2C show the sample stream formed by lines 41 and 42 can be coupled to the vent gas stream 40 and configured to pass a portion of the vent gas from the vent gas stream 40 to the first gas analyzer 80 for analysis of the composition of the vent gas. The sample stream formed by lines 41 and 42 can be configured to minimize any delay in passing the sample of vent gas to the first gas analyzer 80. Alternatively, the first gas analyzer 80 can be configured to analyze the vent gas in a flow path of the vent gas in the vent gas stream 40.

In an aspect, the first gas analyzer 80 can be an online tunable infrared absorption based gas analyzer. An example of an online tunable infrared absorption based gas analyzer is the SpectraScan 2400 manufactured by MDS Instruments, Inc. and packaged and certified by SERVOMEX™. In alternative aspects, the first gas analyzer 80 can be a mass spectrometer or a gas analyzer that utilizes Raman analytical technology. An examples of mass spectrometers include AMETEK™ FlarePro, EXTREL™ Max300-RTG, and THERMO FISHER SCIENTIFIC™ Prima Pro. An example of a gas analyzer that utilizes Raman analytical technology is the IMACC Raman1.

The first gas analyzer 80 can be configured to measure a concentration of at least one hydrocarbon of the vent gas in the sample stream formed by lines 41 and 42 taken from the vent gas stream 40. In some aspects, the first gas analyzer 80 can identify other gas components in the vent gas stream 40 and their respective concentration. The frequency of measurement of the concentration by the first gas analyzer 80 can be on the order of seconds, for example, every 5 to 6 seconds, or otherwise an amount of time which corresponds to the measurement and analysis time for an online tunable infrared absorption based gas analyzer or a mass spectrometer (e.g., every 20 seconds). The at least one hydrocarbon for which concentration is measured by the first gas analyzer 80 includes one or more of $C_1$-$C_{20}$ hydrocarbons; alternatively, $C_1$-$C_6$ hydrocarbons. Other gas components for which concentration can be measured include, but are not limited to, one or more of CO and $H_2S$. The first gas analyzer 80 can communicate with the flare control system 300, 400, 500, or 600 via any suitable communication protocol, e.g., a Modbus TCP/IP protocol.

In aspects where the first gas analyzer 80 is an online tunable infrared absorption based gas analyzer, the first gas analyzer 80 can be coupled via communication line 81 to a hydrogen scanning analyzer 82. The hydrogen scanning analyzer 82 can be configured to analyze the vent gas in a sample stream formed by lines 41 and 43 taken from the vent gas stream 40. The sample stream formed by lines 41 and 43 can be coupled to the vent gas stream 40 in a location which is upstream or downstream of the location where the sample stream formed by lines 41 and 42 is located. Alternatively, the hydrogen scanning analyzer 82 can be configured to analyze the vent gas in a flow path of the vent gas in the vent gas stream 40. The hydrogen scanning analyzer 82 can measure a hydrogen concentration in the vent gas in a sample stream formed by lines 41 and 43 taken from the vent gas stream 40 in real-time (e.g., every 5-6 seconds). The hydrogen scanning analyzer 82 can communicate the concentration of hydrogen to the first gas analyzer 80 via any suitable communication protocol, e.g., a 4-20 mA signal via communication line 81. In turn, the first gas analyzer 80 can ascertain the concentration of the at least one hydrocarbon, as well as other gaseous components including, for example, CO, $H_2S$, and hydrogen on a mol % basis. Alternatively, the hydrogen scanning analyzer 82 can communicate the concentration of hydrogen directly to the flare control system 300, 400, 500, or 600 via any suitable communication protocol.

In aspects where the first gas analyzer 80 is a mass spectrometer, the first gas analyzer 80 can ascertain the concentration of the at least one hydrocarbon, as well as other gaseous components including, for example, H, CO, $H_2S$, and hydrogen on a mol % basis. In these aspects, there is no need for the hydrogen scanning analyzer 82 because the first gas analyzer 80 can measure the concentration of hydrogen. The first gas analyzer 80 can communicate the concentration of the at least one hydrocarbon and hydrogen directly to the flare control system 300, 400, 500, or 600 via any suitable communication protocol.

The first gas analyzer 80 can communicate with flare control system 300, 400, 500, or 600 via communication line 83 the concentration of the at least one hydrocarbon, as well as other gaseous components. The flare control system 300, 400, 500, or 600 can control, in real-time based at least in part on the hydrogen concentration in the vent gas stream 40, the flow of steam or air to the flare 110, respectively. An example of a hydrogen scanning analyzer 82 is the HY-OPTIMA™ 2700 Series manufactured by SERVOMEX™. The HY-OPTIMA™ 2700 Series is an example of an explosion-proof in-line hydrogen gas analyzer which uses a solid-state, non-consumable thin film palladium-nickel alloy-based lattice sensor to measure a hydrogen concentration in the vent gas stream 40, in real-time.

Each flare control and vent gas recovery apparatus 100A, 100B, 100C, 200A, 200B, and 200C can optionally include a second gas analyzer 84 coupled to the vent gas stream 40. The second gas analyzer 84 can be configured to analyze the vent gas in a sample stream formed by lines 41 and 44 taken from the vent gas stream 40. FIG. 1A, FIG. 1B, FIG. 1C, FIG. 2A, FIG. 2B, and FIG. 2C show the sample stream formed by lines 41 and 44 can be coupled to the vent gas stream 40 and can be configured to pass a portion of the vent gas stream 40 to the optional second gas analyzer 84 for analysis of the composition of the vent gas in the vent gas stream 40. The sample stream formed by lines 41 and 44 can be configured to minimize any delay in passing the sample of vent gas to the second gas analyzer 84. The sample stream formed by lines 41 and 44 can be coupled to the vent gas stream 40 in a location which is upstream or downstream of the location where the sample stream formed by lines 41 and 42 and/or the location where the sample stream formed by lines 41 and 43 is located. Alternatively, the second gas analyzer 84 can be configured to analyze the vent gas in a flow path of the vent gas in the vent gas stream 40. In an aspect, the second gas analyzer 84 can be a gas chromatograph (GC). Gas chromatographs for sampling process streams are known in the art and commercially available. The second gas analyzer 84 can be configured to measure a concentration of at least one hydrocarbon of the vent gas in sample stream formed by lines 41 and 44 taken from the vent gas stream 40. The frequency of measurement of the concentration by the second gas analyzer 84 can be on the order of magnitude of minutes, for example, every 7 to 10 minutes, or otherwise an amount of time which corresponds to the measurement and analysis time for a gas chromatograph. The primary purpose of the gas chromatograph is for reporting of vent gas composition to regulatory agencies, since at least for some regulatory agencies, gas chromatography is the standard technique for reporting.

In aspects, the gas analyzers 80, 82, and 84 can be housed in an enclosure (e.g., a building or equipment enclosure), and at least a portion of each of the sample lines 41/42, 41/43, 41/44 can also be configured to connect to the gas analyzers 80, 82, and 84 in the enclosure. The sample lines 41/42, 41/43, 41/44 can be configured to include gas conditioning equipment including filtration devices which remove particulate materials and other materials found in the vent gas stream 40 which can damage the gas analyzers 80, 82, and 84. The conditioning equipment of the sample lines 41/42, 41/43, 41/44 can also include pressure and heating devices which keep the vent gas in the sample lines 41/42, 41/43, 41/44 at suitable pressure, temperature, and flow rate for measurement and analysis.

In an alternative aspect, the gas analyzers 80 and 82 can be housed in a first enclosure, and the second gas analyzer 84 can be housed in a second enclosure. Sample line 41 can be appropriately configured to flow to each of the gas analyzers 80, 82, and 84 in their respective enclosures.

While FIG. 1A, FIG. 1B, FIG. 10, FIG. 2A, FIG. 2B, and FIG. 2C illustrate that the first gas analyzer 80 and the hydrogen scanning analyzer 82 are upstream of the second gas analyzer 84, relative to the flow of the sample line 41, it is contemplated that the second gas analyzer 84 can be upstream of the first gas analyzer 80 and the hydrogen scanning analyzer 82.

As can be seen in FIG. 1A, FIG. 1B, FIG. 10, FIG. 2A, FIG. 2B, and FIG. 2C, line 41 which forms part of each sample stream can be configured to pass the remaining vent gas from which samples are taken back to the vent gas stream 40. The configuration of line 41 is in FIG. 1A, FIG. 1B, FIG. 10, FIG. 2A, FIG. 2B, and FIG. 2C is shown for clarity, and it is contemplated that different configurations can be used and that line 41 can include appropriate equipment such as valves, instrumentation, and gas pumps.

Each flare control and vent gas recovery apparatus 100A, 100B, 100C, 200A, 200B, and 200C can also include a vent gas flow meter 70 to measure a velocity of the vent gas in the vent gas stream 40. In aspects, the vent gas flow meter 70 can be embodied as an orifice meter, a multi-hole meter, a thermal mass dispersion meter, a Coriolis flow meter, an ultrasonic flow meter, or an optical flow sensor. For example, the vent gas flow meter 70 can be an ultrasonic flow meter configured to utilize a single set of ultrasonic transducers to measure the vent gas velocity, or it can be configured to measure vent gas velocity with two sets of ultrasonic transducers. In a two-set transducer configuration, the ultrasonic flow meter can further be configured to use both sets of transducers to generate an average velocity measurement with either a single range or a dual range (low-flow and high-flow) or to use a single set of transducers to measure a low-flow regime and the other set of transducers to measure a high-flow regime using two sets of probes. Other velocity measurement technologies suitable for measuring vent gas flow may also be applied to provide the vent gas velocity measurement. Such measurement technologies may include the OSI OFS-2000F™ velocity measurement device using optical scintillation technology.

The vent gas flow meter 70 can communicate with the flare control system 300, 400, 500, or 600 through a communication line 71. Each flare control and vent gas recovery apparatus 100A, 100B, 100C, 200A, 200B, and 200C can also include one or more vent gas temperature sensors 72 to measure a temperature of the vent gas in the vent gas stream 40. The vent gas temperature sensor(s) 72 can communicate with the flare control system 300, 400, 500, or 600 through communication line 73. Each flare control and vent gas recovery apparatus 100A, 100B, 100C, 200A, 200B, and 200C can also include one or more vent gas pressure sensors 74 to measure a pressure of the vent gas in the vent gas stream 40. The vent gas pressure sensor(s) 74 communicates with the flare control system 300, 400, 500, or 600 through communication line 75. The temperature sensor(s) 72 and pressure sensor(s) 74 may be placed directly in the vent gas stream 40 or may be placed in equipment connected to the vent gas stream 40 having capability of measuring the actual temperature and pressure of the vent gas in the vent gas stream 40. While the temperature sensor(s) 72 and pressure sensor(s) 74 are illustrated in FIG. 1A, FIG. 1B, FIG. 10, FIG. 2A, FIG. 2B, and FIG. 2C as being upstream of the flow meter 70, alternative embodiments contemplate that the temperature sensor(s) 72 and pressure sensor(s) 74 can be placed in other arrangements (e.g., one upstream and one downstream, both downstream of the flow meter 70) provided that the temperature and pressure signals (from communication lines 73 and 75) are representative of the temperature and pressure at the vent gas flow meter 70.

FIG. 1A, FIG. 1B, FIG. 2A, and FIG. 2B illustrate the vent gas flow meter 70 being located in vent gas stream 40 upstream of the gas analyzers 80, 82, and 84. FIGS. 1A, 1B, 2A, and 2B illustrate that the vent gas flow meter 70 is also located in the vent gas stream 40 downstream of the pressure seal apparatus 30. FIGS. 10 and 2C illustrate that the vent gas flow meter 70 is located in second stream 11B at a location that is upstream of the pressure seal apparatus 30 and downstream of the location where the sweep line 12 connects with the second stream 11B. Alternative embodiments for FIG. 1B and FIG. 2B contemplate that the the vent gas flow meter 70 can be located in vent gas stream 40 downstream of the gas analyzers 80, 82, and 84, such as in aspects where the vent gas flow meter 70 is embodied as a type of flow meter that does not require a purge to prevent buildup of vent gas in the flow meter 70. In aspects where the vent gas flow meter 70 is located in the second stream 11B as shown in FIGS. 10 and 2C, the flow rate of purge gas in purge stream 36 can be measured to account for the flow rate of any hydrocarbons in the purge gas to the flare 110 in control schemes described herein. For example, the flow rate of purge gas can be measured using devices in purge stream 36 such as a differential-pressure flow meter, a Coriolis flow meter, or a restrictive orifice combined with engineering calculations that utilize online temperature and pressure measurements. In aspects, multiple flow meters in multiple stages such as the staged configuration for measuring steam flow rate in FIGS. 1A, 1B, and 10 can be used for the flow meters in purge stream 36. Any flow measurement device in the purge stream 36 can be connected to control system 300, 400, 500, or 600, as appropraite, for communication of the flow rate measurement from the flow measurement device to the control system 300, 400, 500, or 600.

The vent gas stream 40 comprises a raw vent gas recovered from a plant gas stream 1 and optionally a supplemental fuel gas added to the raw vent gas via supplemental fuel gas stream 50. Stated another way, each flare control and vent gas recovery apparatus 100A, 100B, 100C, 200A, 200B, and 200C can also include a supplemental fuel gas stream 50 containing supplemental fuel gas which can combine with raw vent gas to form the vent gas in the vent gas stream 40. Examples of the supplemental fuel gas include a fuel gas or natural gas. One or both of these supplemental fuel gases can be used to increase the net heating value (NHV) of the vent gas in the vent gas stream 40 for appropriate combustion in the flare 110.

Supplemental fuel gas (e.g., fuel gas or natural gas) can be added to the vent gas in vent gas stream 40 via the supplemental fuel gas stream 50.

In the configurations shown in FIGS. 1A, 1B, 2A, and 2B, the supplemental fuel gas stream 50 can connect to the vent gas stream 40 downstream of the pressure seal apparatus 30 and upstream of the gas analyzers 80, 82, and 84. In FIG. 1A and in FIG. 2A, the supplemental fuel gas stream 50 can connect to the vent gas stream 40 upstream of the vent gas flow meter 70. In FIG. 1B, in FIG. 10, in FIG. 2B, and in FIG. 2C, the supplemental fuel gas stream 50 can connect to the vent gas stream 40 downstream of the vent gas flow meter 70. The supplemental fuel gas can be added to the vent gas in order to raise the net heating value of the vent gas in the vent gas stream 40 for combustion in the flare 110. In the configurations shown in FIGS. 1A, 1B, 2A, and 2B, the supplemental fuel gas stream 50 can connect to the vent gas stream 40 downstream of the sweep line 12.

In aspects of the flare control and vent gas recovery apparatus 100A, 100B, 100C, 200A, 200B, and 200C, the supplemental fuel gas stream 50 can include a control valve 52 for controlling a flow rate of the supplemental fuel gas stream 50 and a flow meter 54 for measuring the velocity of supplemental fuel gas in the supplemental fuel gas stream 50. In aspects, the supplemental fuel gas flow meter 54 can be embodied as an orifice meter, a multi-hole meter, a thermal mass dispersion meter, a Coriolis flow meter, an ultrasonic flow meter, or an optical flow sensor. While FIG. 1A, FIG. 1B, FIG. 1C, FIG. 2A, FIG. 2B, and FIG. 2C illustrate the supplemental fuel gas flow meter 54 being upstream of the control valve 52; alternative embodiments contemplate that the supplemental fuel gas flow meter 54 can be located downstream of the control valve 52. In upstream embodiments, the supplemental fuel gas flow meter 54 can be embodied as a differential-pressure flow meter or a Coriolis flow meter, for example. In embodiments, the control valve 52 can communicate with the flare control system 300, 400, 500, or 600 through a communication line 51. In embodiments, the supplemental fuel gas flow meter 54 can communicate with the flare control system 300, 400, 500, or 600 through a communication line 53. In aspects, the supplemental fuel gas flow meter 54 can include multiple staged flow meters, the control valve 52 can include multiple control valves, arranged as described herein.

Each flare control and vent gas recovery apparatus 200A, 200B, and 200C can also include one or more supplemental fuel gas temperature sensors 56 to measure a temperature of the supplemental fuel gas in the supplemental fuel gas stream 50. The supplemental fuel gas temperature sensor(s) 56 can communicate with the flare control system 400 or 600 through communication line 55. Each flare control and vent gas recovery apparatus 200A, 200B, and 200C can also include one or more supplemental fuel gas pressure sensors 58 to measure a pressure of the supplemental fuel gas in the supplemental fuel gas stream 50. The supplemental fuel gas pressure sensor(s) 58 communicates with the flare control system 400 or 600 through communication line 57. The temperature sensor(s) 56 and pressure sensor(s) 58 may be placed directly in the supplemental fuel gas stream 50 or may be placed in equipment connected to the supplemental fuel gas stream 50 having capability of measuring the actual temperature and pressure of the supplemental fuel gas in the supplemental fuel gas stream 50. While the temperature sensor(s) 56 and pressure sensor(s) 58 are illustrated in FIG. 2A, FIG. 2B, and FIG. 2C as being upstream of the supplemental fuel flow meter 54, alternative embodiments contemplate that the temperature sensor(s) 56 and pressure sensor(s) 58 can be placed in other arrangements (e.g., one upstream and one downstream, both downstream of the supplemental fuel gas flow meter 54) provided that i) the flow meter 54, temperature sensor(s) 56, and pressure sensor(s) 58 are all either upstream of the control valve 52 or all downstream of the control valve 52, and ii) the temperature and pressure signals (e.g., via communication lines 55 and 57) are representative of the temperature and pressure at the supplemental fuel gas flow meter 54.

In aspects of the flare control and vent gas recovery apparatus 100A, 100B, 100C, 200A, 200B, and 200C, the flow of the supplemental fuel gas stream 50 can be controlled via supplemental fuel gas control valve 52, which is controlled by the flare control system 300, 400, 500, or 600. These aspects include controlling, in real-time based at least in part on the concentration of the at least one hydrocarbon measured by the first gas analyzer 80, a flow of a supplemental fuel gas (e.g., natural gas or fuel gas) into the vent gas stream 40. The control of the supplemental fuel gas so as to combine with the raw vent gas stream 11 to form the vent gas stream 40 is not manually performed. Put another way, the control of the supplemental fuel gas stream 50 via the supplemental fuel gas control valve 52 does not require manual control of the supplemental fuel gas control valve 52 at any time over the entire set of operating conditions of the flare 110 as compared with a flare control and vent gas recovery apparatus not utilizing real-time control based at least in part on the concentration of at least one hydrocarbon measured by the first gas analyzer 80.

In general, addition of the supplemental fuel gas to the vent gas can maintain a minimum net heating value (NHV) in the resultant vent gas stream 40. When utilizing steam for efficient combustion, e.g., FIG. 1A, FIG. 1B, and FIG. 1C, the minimum NHV for the vent gas stream 40 required by current regulation is a minimum regulated value of 300 BTU/SCF), and the minimum NHV in the combustion zone 115 of the flare 110 required by current regulation is a minimum regulated value of 270 BTU/SCF. When utilizing air for efficient combustion, e.g., FIG. 2A, FIG. 2B, and FIG. 2C, the minimum NHV for the vent gas stream 40 required by current regulation is a minimum regulated value of 300 BTU/SCF, and the minimum NHV dilution parameter in combustion zone 115 required by current regulation is a minimum regulated value of 22 BTU/SQF. The minimum regulated value can differ by jurisdiction and can change over time. Thus, the minimum regulated values for NHV discussed herein are not intended to be limited to those currently in force or those in a single jurisdiction. To the extent different jurisdictions require different minimum regulated values for NHV, the scope of this disclosure is intended to include the applicable minimum regulated values for different jurisdictions.

The flare 110 can have a flare stack 111, an injection manifold 112, a flare tip 113, and a flame 114 for combustion of flammable components in a combustion zone 115 of the flare 110. The flare 110 can include other equipment such as an enclosure for the flame 114, wind deflectors, a gas barrier, and a pilot (discussed herein as part of the injection manifold 112). Examples of the components and equipment which can be included with the flare 110 are discussed in Adam Bader et al., *Selecting the Proper Flare Systems*, CEP, July 2011 at 45 and KLM Technology Group, *Kolmetz Handbook of Process Equipment Design, Flare Systems Safety, Selection and Sizing*, Rev:01 pages 1-19 (2007), each of which is incorporated herein by reference.

The combustion zone 115 of the flare 110 is the portion of the flame 114 at the flare tip 113 where the gas received from the vent gas stream 40 is combined with steam or air and combusted. When using steam for efficient combustion, control of a net heating value (NHV) in the combustion zone 115 is maintained at a minimum regulated value (e.g., 270 BTU/SCF). When using air for efficient combustion, control of a net heating value (NHV) on a dilution basis in the combustion zone 115 is maintained at a minimum regulated value (e.g., 22 BTU/SQF). These values for the minimum regulated value for steam or air are based on current regulations, and the values are subject to change according to jurisdiction and over time.

The flare 110 can generally receive the vent gas for combustion at a point along the flare stack 111, for example, near ground level at the bottom of the flare stack 111. The received gas rises upwardly in the flare stack 111, with or without gas blower assistance within the flare stack 111. The received gas can flow from the flare stack 111 into the combustion zone 115 of the flare 110.

The injection manifold 112 can have any configuration of piping and nozzles for feeding steam or air to the combustion zone 115 so as to atomize the vent gas and blend the vent gas with steam or air for combustion at the flare tip 113. The flare tip 113 can be configured to include an injection manifold 112 and a flare tip 113 that generates the flame 114 for the combustion zone 115. The injection manifold 112 and flare tip 113 can also include an ignition system which can initiate and maintain combustion of the vent gas in a stable manner. The ignition system can have one or more pilots, pilot igniters, pilot flame detectors, and apparatus to stabilize the pilot. In an aspect, the injection manifold 112 and the flare tip 113 can have one or more apparatus to stabilize the flame 114. A discussion of an ignition system, injection manifold 112, and flare tip 113 can be found in Adam Bader et al., *Selecting the Proper Flare Systems*, CEP, July 2011 at 45, which is incorporated herein by reference. The gas to be combusted (e.g., the vent as) can pass from the flare stack 111, through the injection manifold 112, to the flare tip 113 and into the flame 114. In an aspect, combustion and blending can occur simultaneously in the combustion zone 115.

Within the scope of this disclosure, it is contemplated that the flare 110 can additionally include a side knockout pot fluidly connected to the flare stack 111. The side knockout pot can be configured with piping which receives condensed vapors from the flare stack 111 and recovers additional gas from the condensed vapors for combustion in the flare 110. The knockout pot 10 within the scope of this disclosure does not include the side knockout pot of the flare 110.

During flare events, a vent gas containing flammable components can feed to the flare 110 via a vent gas stream 40 (in FIGS. 1A, 1B, 2A, and 2B) or via the pressure seal apparatus 30 (in FIGS. 1C and 2C) connected to the flare 110 at or near the bottom of the flare stack 111. The point at which the vent gas is fed to the flare 110 is not limited by this disclosure and can feed at any location on the flare 110 which is upstream of the combustion zone 115.

Figure 1C:
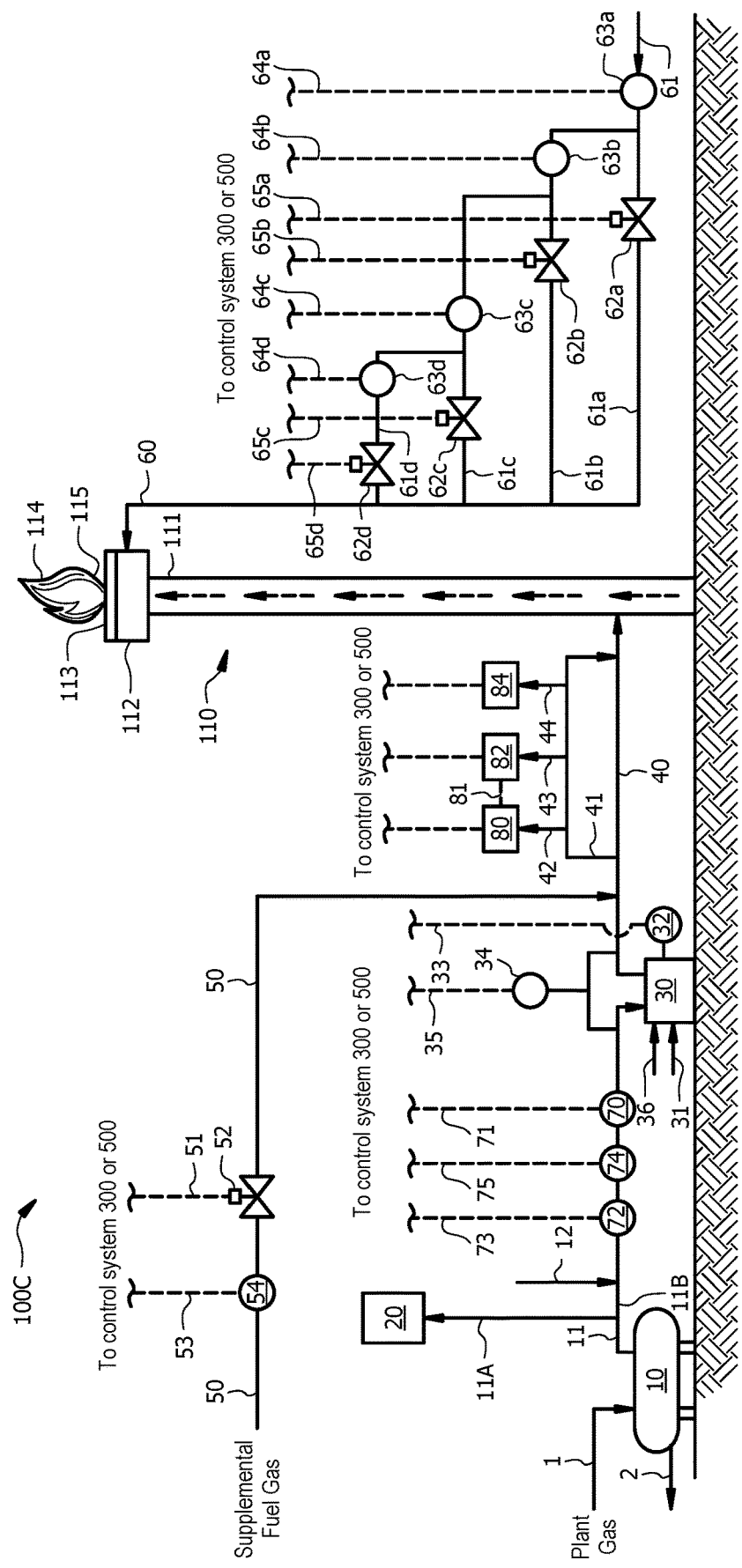
FIG. 1C illustrates a schematic diagram of another embodiment of a flare control and vent gas recovery apparatus utilizing steam-assisted flaring.
Figure 3:
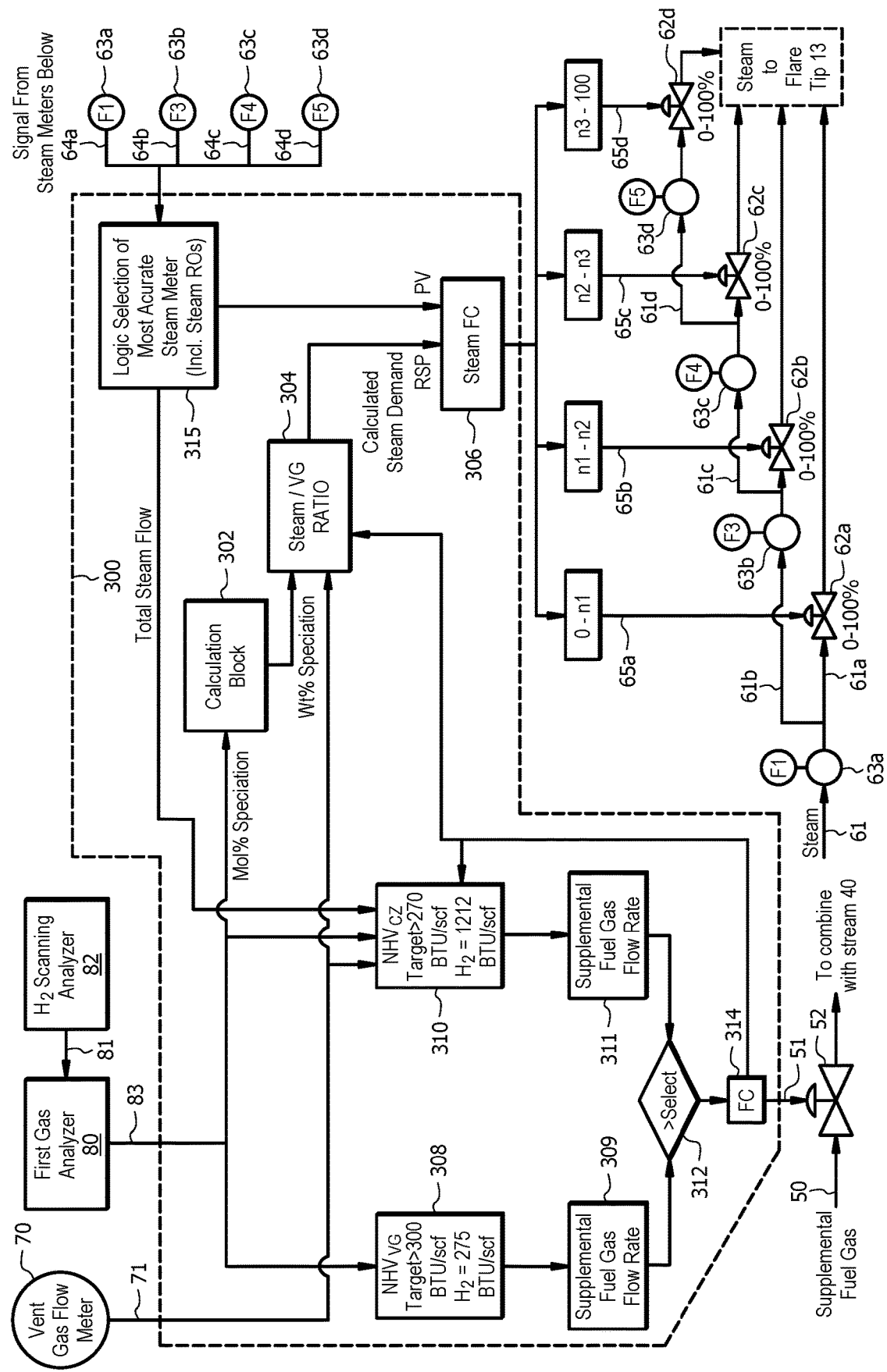
FIG. 3 illustrates a schematic diagram with flowchart of a flare control system that can be utilized in the apparatus of FIG. 1A and FIG. 1B.
Figure 5:
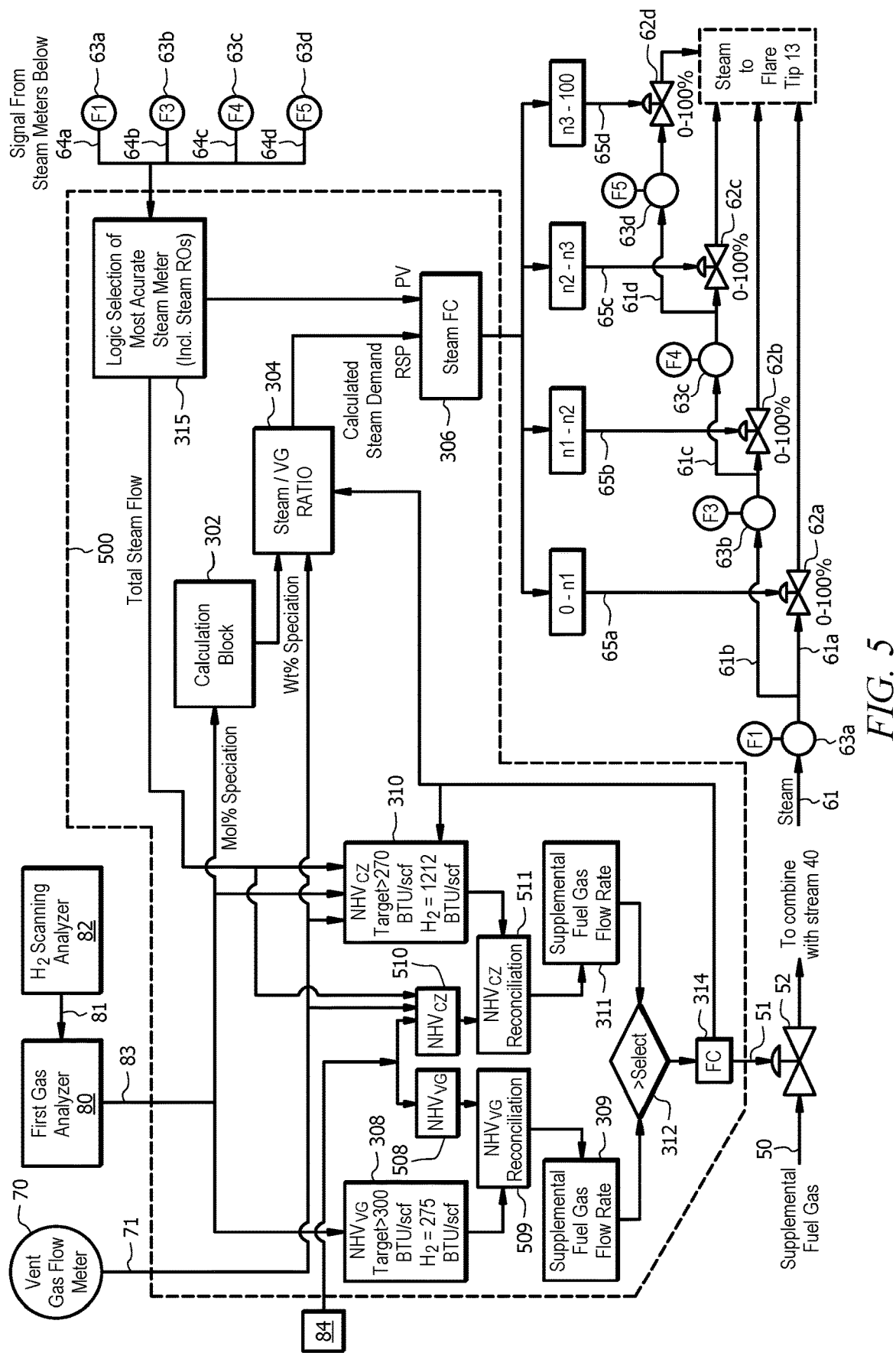
FIG. 5 illustrates a schematic diagram with flowchart of another flare control system that can be utilized in the apparatus of FIG. 1A and FIG. 1B.

Efficient operation of the flare 110 can be achieved by controlling the flow of steam in the flare control and vent gas recovery apparatus 100A of FIG. 1A, 100B of FIG. 1B, and 100C of FIG. 1C using flare control system 300 of FIG. 3 or the flare control system 500 of FIG. 5. Steam can feed to the injection manifold 112 via stream 60. Stream 60 is fluidly connected to a plurality of steam lines 61a, 61b, 61c, and 61d, all being fed steam by a steam supply line 61. Each of the plurality of steam lines 61a, 61b, 61c, and 61d comprises a corresponding steam flow control valve 62a, 62b, 62c, and 62d and a corresponding steam flow meter 63a, 63b, 63c, and 63d, all being fed steam by the steam supply line 61. The corresponding steam flow control valves 62a, 62b, 62c, and 62d can be used to control the flow of steam to the flare 110 via the plurality of steam lines 61a, 61b, 61c, and 61d. Each of the corresponding steam flow control valves 62a, 62b, 62c, and 62d can be the same or different from one another. In an aspect, one or more of the steam flow control valves 62a, 62b, 62c, and 62d can be of different sizes. In an aspect, each of the corresponding steam flow control valves 62a, 62b, 62c, and 62d can be networked or linked to the flare control system (e.g., flare control system 300 in FIG. 3 or flare control system 500 in FIG. 5). While four steam lines 61a-d, four steam flow control valves 62a-d, and four steam flow meters 63a-d are shown in FIG. 1A, FIG. 1B, and FIG. 10, it is contemplated that any other arrangement or number of lines, valves, and meters can be linked to and controlled by the flare control system 300 or flare control system 500. That is, the arrangement of four steam lines 61a-d, four steam flow control valves 62a-d, and four steam flow meters 63a-d in FIG. 1A, FIG. 1B, and 10 is exemplary and it is not intended that the disclosure is limited to this arrangement.

FIG. 1A, FIG. 1B, and 10 show the plurality of steam lines 61a, 61b, 61c, and 61d are arranged in a cascade fashion. In the cascade fashion, steam lines 61b, 61b, 61c, and 61d each comprises a portion of steam from steam supply line 61. Each of the plurality of steam lines 61a, 61b, 61c, and 61d flows to stream 60 which feeds steam to the injection manifold 112 of the flare 110.

The steam flow meters 63a, 63b, 63c, and 63d can have a reading accuracy of +/−5%.

Flare control and vent gas recovery apparatus 100A, 100B, and 100C include a flare control system 300 or 500 networked with the first gas analyzer 80, the hydrogen scanning analyzer 82, the optional second gas analyzer 84, the plurality of steam flow control valves 62a-62d, the vent gas flow meter 70, the vent gas temperature sensor 72, the vent gas pressure sensor 74, the level sensor 32, the differential pressure sensor 34, the supplemental fuel gas flow control valve 52, and the supplemental fuel gas flow meter 54. The networking of the flare control system 300 or 500 with the first gas analyzer 80, the hydrogen scanning analyzer 82, the optional second gas analyzer 84, the plurality of steam flow control valves 62a-62d, the plurality of steam flow meters 63a-63d, the vent gas flow meter 70, the vent gas temperature sensor 72, the vent gas pressure sensor 74, the level sensor 32, the differential pressure sensor 34, the supplemental fuel gas flow control valve 52, and the supplemental fuel gas flow meter 54 can include any suitable actuation technique and/or networking technique. Networking techniques can include wired networking (e.g., local area network, wide area network, or proprietary LAN) and wireless networking (e.g., Bluetooth, Wi-Fi) via communication lines 33, 35, 51, 53, 64a-64d, 65a-65d, 71, 73, 75, 83, and 85.

The flare control system 300 or 500 can be embodied with computer equipment such as one or more processors, memory, datastores, networking cards, and other equipment for processing data (e.g., sending/receiving messages containing data). Processors, memory, and datastores can be distributed among several computer devices or located in a single computer device.

In operation, the flare control system 300 can read measurements from one or any combination of the steam flow meters 63a, 63b, 63c, and 63d across the entire operating range of flow rates in order to open or close any one or combination of the plurality of steam flow control valves 62a, 62b, 62c, and 62d to achieve the required flow of steam determined by the flare control system 300 or 500.

The control scheme of the flare control system 300 is explained in more detail in the description for FIG. 3, and the control scheme of the flare control system 500 is explained in more detail in the description for FIG. 5.

Figure 4:
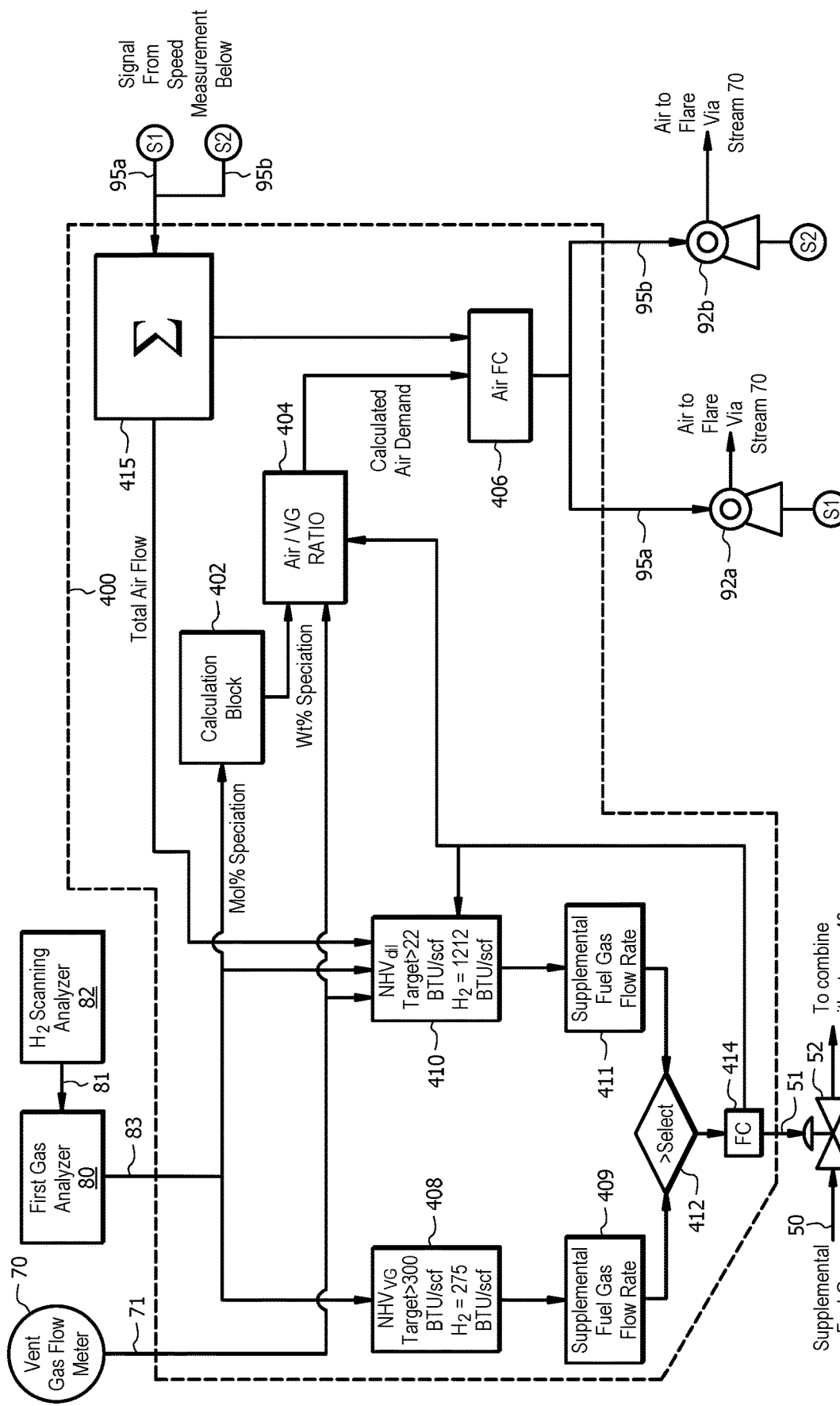
FIG. 4 illustrates a schematic diagram with flowchart of a flare control system that can be utilized in the apparatus of FIG. 2A and FIG. 2B.
Figure 6:
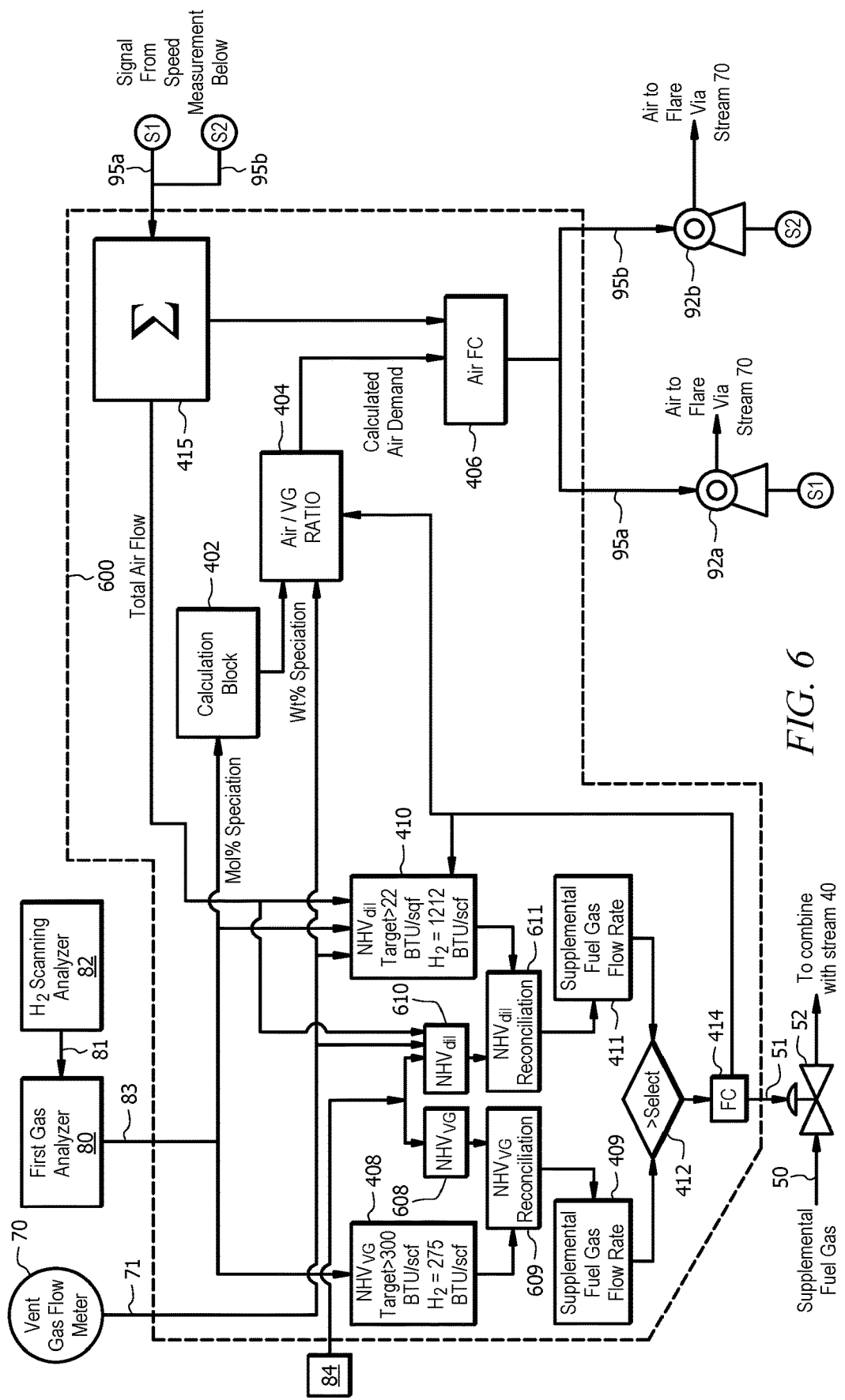
FIG. 6 illustrates a schematic diagram with flowchart of another flare control system that can be utilized in the apparatus of FIG. 2A and FIG. 2B.

Efficient operation of the flare 110 can be achieved by controlling the flow of air in the flare control and vent gas recovery apparatus 200A of FIG. 2A, 200B of FIG. 2B, and 200C of FIG. 2C using flare control system 400 of FIG. 4 or the flare control system 600 of FIG. 6. Air can feed to the flare 110 via stream 90. The blowers 92a and 92b can be equipment known in the art for moving air at a desired speed to the flare 110 via stream 90. In an aspect, the blowers 92a and 92b can each have a variable frequency drive (VFD)

motor controller that can adjust the speed of an electric motor of each of the blowers 92a or 92b by varying the frequency and voltage. The flare control system 400 or flare control system 600 can be linked with the VFD motor controller of the blowers 92a and 92b so as to control the flow of the air to the flare 110. Blower curves, which include data for motor speed (RPM) versus corresponding flow of air, can be used by the flare control system 400 or flare control system 600 to relate which speed needs to be used in order to achieve a particular air flow.

The flare control system 400 and the flare control system 600 can operate and control the first blower 92a across a range of speeds for desired air flow rates and additionally operate and control the second blower 92b for additional air flow. FIG. 2A, FIG. 2B, and FIG. 2C show the blowers 92a and 92b in parallel arrangement for feeding air to stream 90. While the two blowers 92a and 92b are shown in parallel arrangement in FIG. 2A, FIG. 2B, and FIG. 2C, it is understood that the configuration shown in FIG. 2A, FIG. 2B, and FIG. 2C is exemplary and the disclosure contemplates any other number and arrangement of blowers which can be linked to and controlled by the flare control system 400 or the flare control system 600.

Flare control and vent gas recovery apparatus 200A, 200B, and 200C include a flare control system 400 or 600 coupled with the first gas analyzer 80, the hydrogen scanning analyzer 82, the optional second gas analyzer 84, the blowers 92a and 92b, the vent gas flow meter 70, the vent gas temperature sensor 72, the vent gas pressure sensor 74, the level controller 32, the differential pressure sensor 34, the supplemental fuel gas flow control valve 52, the supplemental fuel gas flow meter 54, the supplemental fuel gas temperature sensor 56, and the supplemental fuel gas pressure sensor 58. The networking techniques of the flare control system 400 or 600 with the first gas analyzer 80, the hydrogen scanning analyzer 82, the optional second gas analyzer 84, the blowers 92a and 92b, the vent gas flow meter 70, the vent gas temperature sensor 72, the vent gas pressure sensor 74, the level controller 32, the differential pressure sensor 34, the supplemental fuel gas flow control valve 52, the supplemental fuel gas flow meter 54, the supplemental fuel gas temperature sensor 56, and the supplemental fuel gas pressure sensor 58 can include any suitable actuation technique and/or networking technique. Networking techniques can include wired networking (e.g., local area network, wide area network, proprietary LAN) and wireless networking (e.g., Bluetooth, Wi-Fi) via communication lines 33, 35, 51, 53, 55, 57, 71, 73, 75, 83, 85, and 95a-95b.

The flare control system 400 or 600 can be embodied with computer equipment such as one or more processors, memory, datastores, networking cards, and other equipment for processing data (e.g., sending/receiving messages containing data). Processors, memory, and datastores can be distributed among several computer devices or located in a single computer device.

In operation, the flare control system 400 or 600 can communicate through communication lines 95a and 95b with the VFD motor controller of any of the blowers 92a and 92b to determine the speed of the blowers 92a and 92b. The flare control system 400 or 600 can then determine the flow rate of air to the flare 110 and determine whether the flow rate of air needs to be adjusted to a new required flow rate. The flare control system 400 or 600 can then communicate with the VFD motor controller of the blowers 92a and 92b to adjust the speed of an electric motor of each of the blowers 92a or 92b by varying the frequency and voltage, in order to achieve the required flow of air determined by the flare control system 400 or 600.

The control scheme of the flare control system 400 is explained in more detail in the description for FIG. 4. The control scheme of the flare control system 600 is explained in more detail in the description for FIG. 6.

The apparatuses 100A, 100B, 100C, 200A, 200B, and 200C can each be configured to flow the vent gas via first stream 11A to the vent gas recovery system 20 while the flare 110 is in the standby state. Each of the apparatuses 100A, 100B, 100C, 200A, 200B, and 200C can be further configured to determine that a flare event has occurred. Determining a flare event can include detecting one or more flare activation conditions that are indicative of a flare event having occurred. The flare activation conditions can be detected using signals from the various sensors in the apparatuses 100A, 100B, 100C, 200A, 200B, and 200C. For example, the flare activation conditions can include one or more of i) a first signal (e.g., via communication line 35) received from the differential pressure sensor 34 of the pressure seal apparatus 30, wherein the first signal indicates that a differential pressure between a seal inlet and a seal outlet of the pressure seal apparatus 30 is greater than a static head pressure of a liquid in the pressure seal apparatus 30; ii) a second signal (e.g., via communication line 33) received from a liquid level sensor 32 of the pressure seal apparatus 30, wherein the second signal indicates that a liquid level in the pressure seal apparatus 30 is below a setpoint liquid level; iii) a third signal (e.g., via communication line 71) received from the vent gas flow meter 70, wherein the third signal indicates that a flow rate of the vent gas in the vent gas stream 40 is greater than zero; and iv) a fourth signal (e.g., via communication line 53) received from the supplemental fuel gas flow meter 54, wherein the fourth signal indicates that a flow rate of supplemental fuel gas in a supplemental fuel gas stream 50 is greater than zero.

After detecting one or more flare activation conditions, the apparatuses 100A, 100B, 100C, 200A, 200B, and 200C can each be configured to adjust the flare 110 from the standby state to the active state based on detecting the one or more flare activation conditions. In aspects, adjusting the flare 110 from the standby state to the active state can include increasing the flow of supplemental fuel gas (e.g., via control valve 52 in supplemental fuel gas stream 50) to the flare 110 and increasing the flow of steam or air to the flare 110.

While the flare is in the active state, the apparatuses 100A, 100B, 100C, 200A, 200B, and 200C can each be configured to control, in real-time based at least in part on a concentration of at least one hydrocarbon in the vent gas stream 40, i) a flow of the supplemental fuel gas (e.g., via control valve 52 in the supplemental fuel gas stream 50) and a flow of steam to the flare 110 or ii) a flow of the supplemental fuel gas (e.g., via control valve 52 in the supplemental fuel gas stream 50) and a flow of air to the flare 110. In aspects, the flow of supplemental fuel gas and steam can be controlled according to the control scheme used in the flare control system 300 of FIG. 3 or the control scheme used in the control system 500 of FIG. 5. The flow of supplemental fuel gas and air can be controlled according to the control scheme used in the flare control system 400 of FIG. 4 or the control scheme used in the control system 600 of FIG. 6. These control schemes are described in detail herein. In optional aspects, while the flow of supplemental fuel gas and steam or air to the flare 110 is controlled, the flow of a portion of the vent gas, in first stream 11A, can continue to flow to the vent gas recovery system 20.

The beginning of a flare event can include vent gas overcoming the static head in the pressure seal apparatus 30. Practically speaking, the vent gas may bubble roughly through the liquid (e.g., water), thus splashing the liquid out of the vessel which holds the liquid in the pressure seal apparatus 30. After detecting the one or more flare activation conditions that indicate a flare event, the apparatuses 100A, 100B, 100C, 200A, 200B, and 200C can detect a signal from the liquid level sensor 32 that a liquid level in the pressure seal apparatus 30 is below the setpoint liquid level and actuate a valve in the water line 31 to fill the pressure seal apparatus 30 with liquid (e.g., water) to the setpoint liquid level. The apparatuses 100A, 100B, 100C, 200A, 200B, and 200C can stop filling the pressure seal apparatus 30 with liquid once the liquid level sensor 32 indicates that the liquid level is at the setpoint liquid level.

The apparatuses 100A, 100B, 100C, 200A, 200B, and 200C can continue flowing the vent gas to the to the flare 110 (e.g., via second stream 11B and vent gas stream 40), and optionally, to the vent gas recovery system 20 (e.g., via first stream 11A). The apparatuses 100A, 100B, 100C, 200A, 200B, and 200C can continue controlling the flare 110 according to the control schemes described herein until subsidence of the flare event is determined. That is, each of the apparatuses 100A, 1008, 100C, 200A, 200B, and 200C can be further configured to determine that a subsidence of the flare event has occurred. Determining a flare event has subsided can include detecting, while the flare 110 is in the active state, a plurality of flare deactivation conditions that are indicative of a subsidence of the flare event.

The plurality of flare deactivation conditions can include at least: i) a signal received from the differential pressure sensor 34 of the pressure seal apparatus 30, wherein the signal indicates that a differential pressure between a seal inlet and a seal outlet of the pressure seal apparatus 30 is less than a static head pressure of a liquid in the pressure seal apparatus 30; ii) a signal received from the liquid level sensor 32 of the pressure seal apparatus 30, wherein the signal indicates that a liquid level in the pressure seal apparatus 30 is at or above a setpoint liquid level; and iii) a signal received from the vent gas flow meter 70, wherein the signal indicates that a flow rate of the vent gas in the vent gas stream 40 is zero.

Once the flare deactivation conditions are detected, the flow of vent gas in vent gas stream 40 should eventually cease, as the pressure seal apparatus 30 again provides a static head pressure against the flow of vent gas to the flare 110.

The apparatuses 100A, 1008, 100C, 200A, 200B, and 200C can be further configured to adjust the flare 110 from the active state to the standby state based on the detecting the plurality of flare deactivation conditions. In aspects, adjusting can include stopping the flow of the supplemental fuel gas to the flare 110 and stopping the flow of steam or air to the flare 110.

Once the flare 110 returns to the standby state, the apparatuses 100A, 1008, 100C, 200A, 200B, and 200C can be configured to continue flowing vent gas to the vent gas recovery system 20 (e.g., via first stream 11A) while the flare 110 is in the standby state.

The control scheme used in the flare control system 300 is now described in detail using FIG. 3. Reference numerals for components in FIG. 1A, FIG. 1B, and FIG. 10 can be referred to in this discussion for clarity.

The flare control system 300 can be configured to control, in real-time based at least in part on the concentration of the at least one hydrocarbon, a flow of steam to the flare 110. With reference to FIG. 3, controlling a flow of steam to the flare 110 can include one or more of:

- at block 302, calculating a molecular weight of the vent gas in the vent gas stream 40 using the concentration of the at least one hydrocarbon from the first gas analyzer 80 and the hydrogen scanning analyzer 82, and a molecular weight of the at least one hydrocarbon;
- at block 304, measuring a velocity of the vent gas in the vent gas stream 40 using the vent gas flow meter 70;
- at block 306, calculating a mass flow rate of the vent gas in the vent gas stream 40 using the measured vent gas velocity, the molar volume at standard conditions of 385.3 SCF/LB-MOL, and the calculated molecular weight;
- at block 315, determining the current flow rate of steam to the flare using values obtained from steam flow meters 63a-63d;
- at block 304, calculating a total steam:vent gas mass ratio for efficient operation of the flare 110 using the concentration of the at least one hydrocarbon in the vent gas stream 40 multiplied by a standard steam:hydrocarbon ratio required for smokeless operation of the flare 110 for the at least one hydrocarbon;
- at block 306, calculating a required steam flow rate for the flow of steam to the flare 110 using the total steam:vent gas ratio and the vent gas mass flow rate; and at block 306, adjusting the flow of steam to the flare 110 to the required steam flow rate.

In aspects, controlling a flow of steam to the flare 110 is not manually performed. In certain aspects, controlling a flow of steam to the flare 110 does not require manual control at any time over the entire set of operating conditions of the flare 110 as compared with a plant not utilizing the first gas analyzer 80 and/or which does not control the flow of steam in real-time.

The flare control system 300 can be configured to control a flow of the supplemental fuel gas in the supplemental fuel gas stream 50, which subsequently combines with the raw vent gas stream 11 to form the vent gas stream 40 by the flare control system 300. Controlling a flow of the supplemental fuel gas in the supplemental fuel gas stream 50 by the flare control system 300 can include one or more of:

- at block 308, calculating a net heating value of the vent gas in the vent gas stream 40 using the concentration of the at least one hydrocarbon and a net heating value for the at least one hydrocarbon, wherein the concentration of the at least one hydrocarbon is measured by the first gas analyzer 80;
- at block 309, calculating a first flow rate for the supplemental fuel gas that is required to change the net heating value of the vent gas in the vent gas stream 40 to meet a first setpoint value, wherein the first setpoint value is optionally defined as equal to or greater than a minimum net heating value for a vent gas specified by regulation;
- at block 310, calculating a net heating value in the combustion zone 115 in the flare 110 using the flow rate of the vent gas in the vent gas stream 40, a flow rate of steam to the flare 110, and the calculated net heating value of the vent gas, wherein the flow rate of the vent gas is measured using the vent gas flow meter 70;
- at block 311, calculating a second flow rate for the supplemental fuel gas that is required to change the net heating value in the combustion zone 115 to meet a second setpoint value, wherein the second setpoint value is optionally defined as equal to or greater than a minimum net heating value for a combustion zone specified by regulation;

at decision block 312, determining and selecting which one of the net heating value of the vent gas in the vent gas stream 40 and the net heating value for the combustion zone 115 is a selected net heating value that requires more supplemental fuel gas to meet the respective setpoint value (or alternatively stated, determining which one of the first flow rate and the second flow rate is greater, and identifying the one as a selected flow rate); and at block 314, adjusting the flow of supplemental fuel gas in the supplemental fuel gas stream 50 to the selected flow rate.

Algorithms and programming of the flare control system 300 in FIG. 3 are designated inside the dashed lines. The equipment of the flare control and vent gas recovery apparatus 100A, 100B, and 100C, e.g., the vent gas flow meter 70, the first gas analyzer 80, the hydrogen scanning analyzer 82, the optional second gas analyzer 84, the supplemental fuel gas flow control valve 52, the steam flow meters 63a-63d, and the corresponding plurality of steam flow control valves 62a-62d are shown as networked with the flare control system 300.

A description of each variable and the associated units used in the equations to explain the functionality of the flare control system 300 are listed below:

equation to make the calculation for the total molecular weight of the vent gas in the vent gas stream 40:

$$MW_{vg} = \frac{\sum (\text{mol }\%_{comp\,n}) * (MW_{comp\,n})}{NF}.$$

Note that the above equation sums the multiple of the numerator value for the respective number "n" of components. The normalization factor, NF, is provided by the first gas analyzer 80 and is in units of mol %. In the absence of any needed normalization recommended by the first gas analyzer 80, a value of 1 is used for the normalization factor. Component molecular weights can be found in literature, and Table 1 below gives some example molecular weight values in units of LB/LB-MOL:

TABLE 1

| Component | Molecular Weight (LB/LBMOL) | Steam Ratio (LB steam/ LB component) | Target NHV (BTU/SCF) |
|---|---|---|---|
| Nitrogen | 28.01 | 0 | 0 |
| Water | 18.02 | 0 | 0 |
| Hydrogen | 2.02 | 0 | 274 (1212) |
| Methane | 16.04 | 0 | 896 |
| Ethane | 30.07 | 0.1-0.15 | 1595 |

| | |
|---|---|
| D1 | Pipe diameter of vent gas stream, FT |
| D2 | Pipe diameter of purge gas stream, FT |
| D3 | Pipe diameter of supplemental fuel gas stream, FT |
| Mol $\%_{COMP\,n}$ | Mole Percent of component 'n' in the vent gas stream |
| $MW_{vg}$ | Calculated molecular weight of the vent gas based on stream composition, LB/LB-MOL |
| $NHV_{cz}$ | Net heating value in the combustion zone, BTU/SCF, based on the combined heating value contributions of individual components in the vent gas steam, supplemental fuel gas, and steam. |
| $NHV_{cz\,setpoint}$ | Combustion zone net heating value setpoint, BTU/SCF |
| $NHV_{sg}$ | Net heating value of the supplemental fuel gas, BTU/SCF |
| $NHV_{vg}$ | Net heating value of the vent gas stream, BTU/SCF |
| $NHV_{vg\,setpoint}$ | Vent gas net heating value setpoint, BTU/SCF |
| $NHV_{COMP\,n}$ | Net heating value of component 'n' in the vent gas stream, BTU/SCF |
| $P_A$ | Actual pressure, PSIG |
| $P_S$ | Standard pressure, 0 PSIG |
| $Q_{s,\,MASS}$ | Flowrate of steam, MLB/HR |
| $Q_{s,\,req}$ | Calculated required flowrate of steam, MLB/HR |
| $Q_{s,\,VOL}$ | Flowrate of steam, MSCF/HR |
| $Q_{vg,\,MASS}$ | Flowrate of vent gas, MLB/HR |
| $Q_{vg,\,VOL}$ | Flowrate of vent gas, MSCF/HR |
| RSP | Remote setpoint for controller |
| $STM:VG_{Total}$ | Required ratio of steam flow to total vent gas flow to maintain flame smokeless operation, LB/LB |
| $STM:VG_{COMP\,n}$ | Required ratio of steam to pure component 'n' to maintain smokeless operation, LB/LB |
| $T_A$ | Actual temperature, ° F. |
| $T_S$ | Standard temperature, 68° F. |
| $V_{vg}$ | Vent gas velocity in the vent gas stream, FT/SEC |
| $V_{pg}$ | Purge gas velocity in purge gas stream, FT/SEC |
| $V_{sfg}$ | Supplemental fuel gas velocity in the supplemental fuel gas stream, FT/SEC |
| Wt $\%_{COMP\,n}$ | Weight percent of component 'n' in the vent gas stream |

Controlling a flow of steam to the flare 110 can include calculating a molecular weight of the vent gas in the vent gas stream 40 using the concentration of the at least one hydrocarbon and a molecular weight of the at least one hydrocarbon. Recall the concentration at least one hydrocarbon and other gas components of the vent gas in the vent gas stream 40 are measured by the first gas analyzer 80 in units of mol %. The flare control system 300 can use the following TABLE 1-continued

| Component | Molecular Weight (LB/LBMOL) | Steam Ratio (LB steam/ LB component) | Target NHV (BTU/SCF) |
|---|---|---|---|
| Propane | 44.10 | 0.25-0.3 | 2281 |
| Butane | 58.12 | 0.3-0.35 | 2957 |
| Pentane | 72.15 | 0.4-0.45 | 3655 |

TABLE 1-continued

| Component | Molecular Weight (LB/LBMOL) | Steam Ratio (LB steam/ LB component) | Target NHV (BTU/SCF) |
|---|---|---|---|
| Ethylene | 28.05 | 0.4-0.5 | 1477 |
| Propylene | 42.08 | 0.5-0.6 | 2150 |
| Butene | 56.11 | 0.6-0.7 | 2928 |
| Butadiene | 54.09 | 0.9-1 | 2690 |
| Acetylene | 26.04 | 0.5-0.6 | 1404 |
| Benzene | 78.11 | 0.8-0.9 | 3591 |
| C5+ | 72.15 | 0.8-0.9 | 3655 |

The molecular weights and target NHV values in Table 1 can be found in the Federal Register at 80 Fed. Reg. 75178, 75271 (Dec. 1, 2015), which is incorporated herein by reference in its entirety. The required steam ratio for each component in Table 1 can be found, for example, in Pressure-relieving and Depressuring Systems, API Standard 521, 6$^{th}$ Ed. (January 2014) at Table 14, which is incorporated herein by reference in its entirety. To the extent more than one value is given for the required steam ratio, the higher value can be used as the initial setpoint. In aspects, a net heating value of 274 BTU/SCF for hydrogen is used for calculating NHV$_{vg}$, and a net heating value of 1212 BTU/SCF for hydrogen is used for calculating NHV$_{cz}$. Additional information can be found in Petroleum Refinery Sector Risk and Technology Review and New Source Performance Standards, 79 Fed. Reg. 36,880 (Jun. 30, 2014) and 40 CFR 63.11(b)(ii), each of which is incorporated herein by reference in their entirety.

Controlling a flow of steam to the flare 110 can include 1) measuring a velocity V$_{vg}$ of the vent gas (comprising raw vent gas and supplemental fuel gas) in the vent gas stream 40 using the vent gas flow meter 70 and optionally measuring a velocity V$_{pg}$ of purge gas in purge gas stream 36 using a purge gas flow meter, or 2) measuring a velocity V$_{vg}$ of only the raw vent gas in the vent gas stream 40 using the vent gas flow meter 70, measuring a velocity V$_{sfg}$ of the supplemental fuel gas in the supplemental fuel gas stream 50 using the flow meter 54, and optionally measuring a velocity V$_{pg}$ of purge gas in purge gas stream 36 using a purge gas flow meter. Velocity measurement technologies suitable for measuring gas flow in a respective stream can include a single set of ultrasonic transducers, two sets of ultrasonic transducers, or an OSI OFS-2000F™ velocity measurement device using optical scintillation technology. In a two-set transducer configuration, the ultrasonic flow meter can further be configured to use both sets of transducers to generate an average velocity measurement with either a single range or a dual range (low-flow and high-flow) or to use a single set of transducers to measure a low-flow regime and the other set of transducers to measure a high-flow regime using two sets of probes. In FIG. 1A, the velocity measured by the vent gas flow meter 70 in the vent gas stream 40 is for the vent gas that contains the raw vent gas and any supplemental fuel gas that is added to the vent gas stream 40; thus, the velocity V$_{vg}$ accounts for the velocity of the raw vent gas and the supplemental fuel gas flowing in the vent gas stream 40. In FIG. 1B and in FIG. 1C, the velocity measured by the vent gas flow meter 70 in the vent gas stream 40 is only for the raw vent gas since supplemental fuel gas is introduced into vent gas stream 40 downstream of the vent gas flow meter 70. The velocity of the supplemental fuel gas in supplemental fuel gas stream 50 is measured using supplemental fuel gas flow meter 54.

Controlling a flow of steam to the flare 110 calculating a mass flow rate of the vent gas in the vent gas stream 40 using the measured vent gas velocity, the molar volume at standard conditions of 385.3 SCF/LB-MOL, and the calculatd molecular weight. In an aspect, this step can be performed in two sub-steps.

First, the volumetric flow rate of the vent gas flowing to the flare 110 can be calculated. In FIG. 1A, the volumetric flow rate of the vent gas in the vent gas stream 40 can be calculated using 1) the measured vent gas velocity, and optionally 2) the measured purge gas velocity in purge stream 36, since the vent gas that flows through the vent gas flow meter 70 contains both the supplemental fuel gas and the raw vent gas but does not contain the purge gas in stream 36. For determining Q$_{vg,VOL}$ in FIG. 1A, the flare control system 300 can use the following equation to make the calculation:

$$Q_{vg,VOL} = \left(V_{vg} * \pi\left(\frac{D1}{2}\right)^2 + V_{pg} * \pi\left(\frac{D2}{2}\right)^2\right) * \\ \left(\frac{(P_A + 14.696)*(T_S + 459.69)}{(P_S + 14.696)*(T_A + 459.69)}\right) * \frac{3600 \text{ SEC/HR}}{1000 \text{ scf/Mscf}},$$

where Q$_{vg,VOL}$ is the volumetric flow rate of the vent gas (comprising the raw vent gas and supplemental fuel gas) and purge gas in the vent gas stream 40 in units of MSCF per hour. The variable description and units for V$_{vg}$, V$_{pg}$, D1, D2, p$_A$, T$_A$, p$_S$, and T$_S$ are given above. p$_A$ and T$_A$ can be measured by equipment in the vent gas stream 40 having capability of measuring the actual temperature and pressure of the vent gas in the vent gas stream 40 and by equipment in the purge gas stream 36. In FIG. 1B and in FIG. 1C, the volumetric flow rate of the vent gas in the vent gas stream 40 can be calculated using 1) the measured raw vent gas velocity in vent gas velocity in vent gas stream 40, 2) the measured supplemental fuel gas velocity in the supplemental fuel gas stream 50, and optionally 3) the measured purge gas velocity in purge stream 36, since the raw vent gas that flows through the vent gas flow meter 70 does not contain the supplemental fuel gas or the purge gas. For determining Q$_{vg,VOL}$ in FIG. 1B and in FIG. 10, the flare control system 300 can use the following equation to make the calculation:

$$Q_{vg,VOL} = \left(V_{vg} * \pi\left(\frac{D1}{2}\right)^2 + V_{pg} * \pi\left(\frac{D2}{2}\right)^2 + V_{sfg} * \pi\left(\frac{D3}{2}\right)^2\right) * \\ \left(\frac{(P_A + 14.696)*(T_S + 459.69)}{(P_S + 14.696)*(T_A + 459.69)}\right) * \frac{3600 \text{ SEC/HR}}{1000 \text{ scf/Mscf}},$$

where Q$_{vg,VOL}$ is the volumetric flow rate of the vent gas (comprising the raw vent gas and supplemental fuel gas) and purge gas in the vent gas stream 40 in units of MSCF per hour. The variable description and units for V$_{vg}$, V$_{pg}$, V$_{sfg}$, D1, D2, D3, p$_A$, T$_A$, p$_S$, and T$_S$ are given above. p$_A$ and T$_A$ can be measured by equipment in the vent gas stream 40, the supplemental fuel gas stream 50, and the purge gas stream 36 having capability of measuring the actual temperature and pressure of the respective gas. In all cases that utilize the purge gas and/or supplemental gas flow, these streams can alternatively be measured directly in standard volumetric flow (Mscf/hr) and added to the vent gas flow calculated from the vent header velocity. Alternatively, the mass flow of purge gas and/or supplemental gas can be measured, with conversion to standard volumetric flow with a measured molecular weight via online analysis or periodic samples.

Second, a mass flow rate of the vent gas in the vent gas stream 40 can be calculated using the calculated volumetric flow, the molar volume of 385.3 SCF/LB-MOL, and the calculated molecular weight. The flare control system 300 can use the following equation to make the calculation:

$$Q_{vg,MASS} = \left(\frac{Q_{vg,VOL}}{385.3\frac{SCF}{LB-MOL}}\right) * MW_{vg},$$

where $Q_{vg,MASS}$ is the mass flow rate of the vent gas in the vent gas stream 40 in units of Mlb/hr per hour. The variable description and units for $Q_{vg,VOL}$ and $MW_{vg}$ are given above, and the molar volume at standard conditions of 385.3 SCF/LB-MOL is the molar volume used for the calculation.

Controlling a flow of steam to the flare 110 can include determining the current flow rate of steam to the flare 110 using values obtained from steam flow meters 63a-63d. Each of the steam flow meters 63a-63d can be networked to the flare control system 300 such that the signals from each of the steam flow meters 63a-63d communicate the signals via lines 64a-64d. In an aspect, the current flow can be determined in the flare control system 300 by logic selection of the most accurate steam flow meter 63a, 63b, 63c, 63d, or combinations thereof.

Controlling a flow of steam to the flare 110 can include calculating a total steam:vent gas mass ratio for efficient operation of the flare 110 using the concentration of the at least one hydrocarbon in the vent gas stream 40 multiplied by a standard steam:hydrocarbon ratio required for smokeless operation of the flare 110 for the at least one hydrocarbon. The flare control system 300 can use the following equation to make the calculation for the total steam:vent gas mass ratio, for example in block 304:

$$STM: VG_{Total} = \sum \frac{(Wt\%_{COMPn}) * (STM: VG_{COMPn})}{100 \text{ lb vent gas}}$$

The standard steam:hydrocarbon ratio for a particular component n, $STM:VG_{comp\ n}$, is also available in literature with examples shown in Table 1 above. Alternatively, the standard steam:hydrocarbon ratio for component n can be determined by empirical testing a given flare by adding a set of known flow rates of component n to the vent gas and adjusting the steam flow to determine the required steam flow to control smoke formation for each known flow rate of component n.

The wt $\%_{comp\ n}$ n is the weight percent of a particular component n in the vent gas stream 40 obtained by converting the mol % concentration data measured by the first gas analyzer 80 to wt % using the following equation:

$$Wt\%_{COMPn} = \frac{(Mol\%_{COMPn}) * (MW_{COMPn})}{(NF) * (MW_{vg})}.$$

The mol $\%_{comp\ n}$ is the concentration of component n in units of mol % provided by the first gas analyzer 80. The $MW_{comp\ n}$ is the molecular weight of component n taken from information available in literature (examples shown in Table 1 above). The normalization factor, NF, is provided by the first gas analyzer 80 and is in units of mol %. In the absence of any needed normalization recommended by the first gas analyzer 80, a value of 1 is used for the normalization factor.

Controlling a flow of steam to the flare 110 can include calculating a required steam flow rate for the flow of steam to the flare 110 using the total steam:vent gas mass ratio and the total mass flow rate of the vent gas in the vent gas stream 40. The flare control system 300 can use the following equation to make the calculation, for example in block 308:

$$Q_{s,req}=(STM:VG_{Total})*(Q_{vg,MASS})$$

The variables used to calculate the required steam flow rate are explained above.

Controlling a flow of steam to the flare 110 can include adjusting the flow of steam to the flare 110 at the required steam flow rate, $Q_{s,req}$. In some aspects, the input needed for the steam flow control valves 62a-d is in volumetric flow-rate. In these aspects, the mass-basis flow rate of steam in the value for $Q_{s,req}$ can be converted to a volumetric basis for the steam flow rate setpoint using the following equation, for example in block 306:

$$Q_{s,VOL} = \frac{Q_{S,MASS} * 385.3 \frac{SCF}{LB-MOL}}{18.02 \frac{LB}{LB-MOL}}.$$

The flare control system 300 can adjust the steam flow control valves 62a-62d to achieve the value calculated for $Q_{S,VOL}$.

Controlling a flow of a supplemental fuel gas in supplemental fuel gas stream 50 can include calculating a net heating value of the vent gas in the vent gas stream 40 using the concentration of the at least one hydrocarbon and a net heating value for the at least one hydrocarbon. The flare control system 300 can use the following equation to make the calculation:

$$NHV_{vg} = \frac{\sum(mol\ \%_{comp\ n}) * (NHV_{comp\ n})}{100}$$

where mol $\%_{comp\ n}$ is the concentration of component "n" in the vent gas stream 40 measured by the first gas analyzer 80 and $NHV_{comp\ n}$ the net heating value of the component "n" which is available in the literature and examples for certain gasous components are provided in Table 1 above. Calculating a net heating value of the vent gas in the vent gas stream 40 can also utilize the concentration of hydrogen in the vent gas of the vent gas stream 40 based on the hydrogen scanning analyzer 82. FIG. 3 shows that a value of 274 BTU/SCF should be used for the NHV of hydrogen when calculating the contribution of any measured hydrogen to the overall net heating value of the vent gas in the vent gas stream 40, $NHV_{vg}$.

Controlling a flow of a supplemental fuel gas in the supplemental fuel gas stream 50 can include measuring a flow rate of the vent gas in the vent gas stream 40 with the vent gas flow meter 70. The flow rate, $Q_{vg,VOL}$ can be the volumetric flow rate, which is described using the equation for $Q_{vg,VOL}$ above. To obtain the $Q_{vg,VOL}$, $V_{vg}$ (the velocity of the vent gas in the vent gas stream 40) is obtained. The value of $V_{vg}$ (the velocity of the vent gas in the vent gas stream 40) can be obtained as described above.

Controlling a flow of a supplemental fuel gas in supplemental fuel gas stream 50 can include calculating a net heating value in a combustion zone 115 in the flare 110 using the flow rate of the vent gas in the vent gas stream 40, a flow rate of steam to the flare 110, and the calculated net heat value for the vent gas. The flare control system 300 can use the following equation to make the calculation, for example in block 310:

$$NHV_{cz} = \frac{Q_{vg,VOL} * NHV_{vg}}{Q_{vg,VOL} + Q_{S,VOL}}.$$

The net heating value in the combustion zone 115, $NHV_{cz}$, uses the values for $NHV_{vg}$ and $Q_{vg,VOL}$ which are discussed above. This equation also includes the term Qs,vol, which is calculated as explained above when calculating the required steam flow rate on a volumetric flow rate basis. The term Qs,vol, is used to account for the dilution effect of the steam on the net heating value in the combustion zone 115, $NHV_{cz}$. FIG. 3 shows that a value of 1,212 BTU/SCF should be used for the NHV of hydrogen when calculating the contribution of any measured hydrogen to the overall net heating value in the combustion zone 115, $NHV_{cz}$.

Controlling a flow of a supplemental fuel gas in supplemental fuel gas stream 50 can include, at block 309, calculating a first flow rate for the supplemental fuel gas that is required to change the net heating value of the vent gas in the vent gas stream 40 to meet a first setpoint value, wherein the first setpoint value is equal to or greater than a first target net heating value for a vent gas specified by regulation. As discussed herein, the first target value for NHV required by regulation for the vent gas in the vent gas stream 40 is currently a minimum value of 300 BTU/SCF. As such, the first setpoint value can be equal to or greater than 300 BTU/SCF.

Controlling a flow of a supplemental fuel gas in supplemental fuel gas stream 50 can include, at block 311, calculating a second flow rate for the supplemental fuel gas that is required to change the net heating value in the combustion zone 115 to meet a second setpoint value, wherein the second setpoint value is equal to or greater than a second target net heating value for a combustion zone specified by regulation. As discussed herein, the second target value for NHV required by regulation in the combustion zone 115 is currently a minimum value of 270 BTU/SCF. As such, the second setpoint value can be equal to or greater than 270 BTU/SCF.

Controlling a flow of a supplemental fuel gas in supplemental fuel gas stream 50 can include determining which one of the net heating value of the vent gas in the vent gas stream and the net heating value for the combustion zone 115 requires more supplemental fuel gas to meet a setpoint net heating value. FIG. 3 shows the flare control system 300 uses decision block 312 to determine which net heating value parameter requires the larger flow of supplemental fuel gas and select the one that has the larger flow of supplemental fuel gas for the supplemental fuel gas control. At decision block 312, the larger flow of the supplemental fuel gas can be identified and/or selected as the selected flow rate for the supplemental fuel gas stream 50. Alternatively stated, block 312 can decide which calculated supplemental fuel gas flow rate is greater and identify/select the greater flow rate as the selected flow rate for the supplemental fuel gas stream 50.

Controlling a flow of a supplemental fuel gas in the supplemental fuel gas stream 50 can include adjusting the flow rate of the supplemental fuel gas in the supplemental fuel gas stream 50 (e.g., using the supplemental fuel gas valve 52) to the selected flow rate. Practically speaking, the flare control system 300 can actuate the supplemental fuel gas flow control valve 52 to the appropriate level to adjust the flow of the supplemental fuel gas to the selected flow rate.

Once one or more of the steam and the supplemental fuel gas is controlled, the vent gas of the vent gas stream 40 can be combusted in the flare 110 according to the flow rate controlled for steam and optionally according to the flow rate controlled for the supplemental fuel gas.

The control scheme used in the flare control system 400 is now described in detail using FIG. 4. Reference numerals for components in FIG. 2A, FIG. 2B, and FIG. 2C can be referred to in this discussion for clarity.

The flare control system 400 can be configured to control, in real-time based at least in part on the concentration of the at least one hydrocarbon, a flow of air to the flare 110. Controlling a flow of air to the flare 110 can include one or more of:

at block 402, calculating a molecular weight of the vent gas in the vent gas stream 40 using the concentration of the at least one hydrocarbon obtained from the first gas analyzer 80 and the hydrogen scanning analyzer 82, and a molecular weight of the at least one hydrocarbon;

at block 404, measuring a velocity of the vent gas and/or supplemental gas in the vent gas stream 40 using the vent gas flow meter 70;

at block 404, calculating the volumetric flow rate of the vent gas and/or supplemental gas in the vent gas stream 40 using the measured vent gas velocity;

at block 404, calculating a total air:vent gas mole ratio for smokeless operation of the flare 110 using the concentration of the at least one hydrocarbon in the vent gas stream 40 multiplied by a standard air:hydrocarbon ratio required for smokeless operation of the flare 110 for the at least one hydrocarbon;

at block 404, calculating a required air flow rate for the flow of air to the flare 110 by multiplying the total air:vent gas mole ratio by the volumetric flow rate of the vent gas in the vent gas stream 40; and at block 406, adjusting the flow of air to the flare 110 to the required air flow rate. In an aspect, adjusting the flow of air to the flare 110 to the required air flow rate can include controlling a speed of one or more of the blowers 92a and 92b which is/are fluidly coupled with the flare 110.

In an aspect, adjusting a flow of air to the flare 110 to the required air flow rate includes comparing the sum of the air flowing to the flare 110 calculated at block 415 with air demand determined at block 406.

In aspects, controlling a flow of air to the flare 110 is not manually performed. In certain aspects, controlling a flow of air to the flare 110 does not require manual control at any time for any operating conditions of the flare as compared with a flare control and vent gas recovery apparatus which does not control the flow of air in real-time and/or which does not measure the concentration with the first gas analyzer 80.

The flare control system 400 can be configured to control a flow of a supplemental fuel gas in the supplemental fuel gas stream 50 that combines with raw vent gas stream 11 to form the vent gas stream 40. Controlling a flow of a supplemental fuel gas in the supplemental fuel gas stream 50 by the flare control system 400 can include one or more of:

at block 408, calculating a net heating value of the vent gas in the vent gas stream 40 using the concentration of the at least one hydrocarbon and a net heating value for the at least one hydrocarbon;

at block 409, calculating a first flow rate for the supplemental fuel gas that is required to change the net heating value of the vent gas in the vent gas stream 40 to meet a first target value, wherein the first target value is optionally defined as a minimum net heating value for a vent gas specified by regulation;

at block 410, measuring a flow rate of the vent gas in the vent gas stream 40 using the vent gas flow meter 70;

at block 415, determining the current flow rate of air to the flare 110 using the signal of speed measurement from blowers 92a and 92b via communication lines 95a and 95b;

at block 414, adjusting the flow of the supplemental fuel gas in the supplemental fuel gas stream 50 to the selected flow rate.

Algorithms and programming of the flare control system 400 in FIG. 4 are designated inside the dashed lines. The equipment of the flare control and vent gas recovery apparatus, e.g., the vent gas flow meter 70, the first gas analyzer 80, the hydrogen scanning analyzer 82, the optional second gas analyzer 84, the supplemental fuel gas flow control valve 52, and the blowers 92a and 92b are shown as networked with the flare control system 400.

A description of each variable and the associated units used in the equations to explain the functionality of the flare control system 400 are listed below:

| Variable | Description |
|---|---|
| $AIR:VG_{Total}$ | Required ratio of air flow to total vent gas flow to maintain flame smokeless operation, SCF/SCF |
| $AIR:VG_{COMP\ n}$ | Required ratio of air to pure component 'n' to maintain smokeless operation, SCF/SCF |
| D1 | Pipe diameter of the vent gas stream, FT |
| D2 | Pipe diameter of the purge gas stream, FT |
| D3 | Pipe diameter of the supplemental fuel gas stream, FT |
| $D_{tip}$ | Diameter of the flare tip, FT |
| $Mol\ \%_{COMP\ n}$ | Mole percent of component 'n' in the vent gas stream |
| $MW_{vg}$ | Calculated molecular weight of the vent gas based on stream composition, LB/LB-MOL |
| $NHV_{dil}$ | Net heating value dilution parameter, $BTU/FT^2$ |
| $NHV_{dil\ setpoint}$ | Net heating value dilution parameter setpoint greater than or equal to 22 $BTU/FT^2$ |
| $NHV_{sg}$ | Net heating value of the supplemental fuel gas, BTU/SCF |
| $NHV_{vg}$ | Net heating value of the vent gas stream, BTU/SCF |
| $NHV_{vg\ setpoint}$ | Vent gas net heating value setpoint, BTU/SCF |
| $NHV_{COMP\ n}$ | Net heating value of component 'n' in the vent gas stream BTU/SCF |
| $P_A$ | Actual pressure, PSIA |
| $P_S$ | Standard pressure, 14.696 PSIA |
| $Q_{air/req}$ | Flowrate of air, SCF/MIN |
| $Q_{vg,\ VOL}$ | Flowrate of vent gas, MSCF/HR |
| RSP | Remote setpoint for controller |
| $T_A$ | Actual temperature, ° F. |
| $T_S$ | Standard temperature, 68° F. |
| $V_{vg}$ | Vent gas velocity in the vent gas stream, FT/SEC |
| $V_{pg}$ | Purge gas velocity in purge gas stream, FT/SEC |
| $V_{sfg}$ | Supplemental fuel gas velocity in the supplemental fuel gas stream, FT/SEC | at block 410, calculating a net heating value dilution parameter in a combustion zone 115 in the flare 110 using the flow rate of the vent gas in the vent gas stream 40, the flow rate of air to the flare 110, the net heating value calculated for the vent gas, and a diameter of a flare tip 113 of the flare 110;

at block 411, calculating a second flow rate for the supplemental fuel gas that is required to change the net heating value dilution parameter of the combustion zone 115 to meet a second target value, wherein the second target value is optionally defined as a minimum net heating value dilution parameter for a combustion zone specified by regulation;

at decision block 412, determining and selecting which one of the net heating value of the vent gas in the vent gas stream 40 and the net heating value dilution parameter for the combustion zone 115 is a selected net heating value that requires more supplemental fuel gas to meet the respective setpoint value (or alternatively stated, determining which one of the first flow rate and the second flow rate is greater, and identifying the greater one as a selected flow rate);

Controlling a flow of air to the flare 110 can include calculating a molecular weight of the vent gas in the vent gas stream 40 using the concentration of the at least one hydrocarbon and a molecular weight of the at least one hydrocarbon. Recall the concentration of at least one hydrocarbon and other gas components of the vent gas in the vent gas stream 40 are measured by the first gas analyzer 80 in units of mol %. The flare control system 400 can use the following equation to make the calculation for the total molecular weight of the vent gas in the vent gas stream 40:

$$MW_{vg} = \frac{\sum (Mol\ \%_{comp\ n}) * (MW_{comp\ n})}{NF}.$$

Note that the above equation sums the multiple of the numerator value for the respective number "n" of components. The normalization factor, NF, is provided by the first gas analyzer 80 and is in units of mol %. In the absence of any needed normalization recommended by the first gas analyzer 80, a value of 1 is used for the normalization factor. Component molecular weights can be found in literature, and Table 2 below gives some example molecular weight values in units of LB/LB-MOL:

TABLE 2

| Component | Molecular Weight (LB/LBMOL) | Air Ratio (SCF Air/ SCF component) | Target NHV (BTU/SCF) |
|---|---|---|---|
| Nitrogen | 28.01 | 0 | 0 |
| Water | 18.02 | 0 | 0 |
| Hydrogen | 2.02 | 0 | 274 (1212) |
| Methane | 16.04 | 0 | 896 |
| Ethane | 30.07 | 1.67-5.00 | 1595 |
| Propane | 44.10 | 2.38-7.14 | 2281 |
| n-Butane | 58.12 | 3.10-9.29 | 2968 |
| Isobutane | 58.12 | 3.10-9.29 | 2957 |
| C5's | 72.15 | 4.44-13.33 | 3655 |
| Ethylene | 28.05 | 4.29-5.71 | 1477 |
| Propylene | 42.08 | 6.43-8.57 | 2150 |
| Methyl Acetylene | 40.06 | 24.33-32.44 | 2088 |
| Propadiene | 40.06 | 7.30-9.73 | 2066 |
| Butenes | 56.11 | 8.57-11.43 | 2882 |
| Butadienes | 54.00 | 12.39-16.53 | 2690 |
| Acetylene | 26.04 | 16.24-21.65 | 1404 |
| Benzene | 78.11 | 10.71-14.29 | 3591 |
| Toluene | 92.14 | 12.86-17.14 | 4276 |
| C6+ | 84.16 | 12.86-17.14 | 3593 |

The molecular weights and target NHV values in Table 2 can be found in the Federal Register at 80 Fed. Reg. 75178, 75271 (Dec. 1, 2015), which is incorporated herein by reference in its entirety. The required air ratio for each component in Table 2 can be found, for example, in Pressure-relieving and Depressuring Systems, API Standard 521, 6$^{th}$ Ed. (January 2014) at Section 5.7.3.2.5, which is incorporated herein by reference in its entirety. To the extent more than one value is given for the required air ratio, the higher value can be used as the initial setpoint. In aspects, a net heating value of 274 BTU/SCF for hydrogen is used for calculating NHV Vg, and a net heating value of 1212 BTU/SCF for hydrogen is used for calculating NHV dd. Additional information can be found in Petroleum Refinery Sector Risk and Technology Review and New Source Performance Standards, 79 Fed. Reg. 36,880 (Jun. 30, 2014) and 40 CFR 63.11(b)(ii), each of which are incorporated herein by reference in their entirety.

Controlling a flow of air to the flare 110 can include 1) measuring a velocity of the vent gas (comprising raw vent gas and supplemental fuel gas) in the vent gas stream 40 using the vent gas flow meter 70 and optionally measuring a velocity $V_{pg}$ of purge gas in purge gas stream 36 using a purge gas flow meter, or 2) measuring a velocity $V_{vg}$ of only the raw vent gas in the vent gas stream 40 using the vent gas flow meter 70, measuring a velocity $V_{sfg}$ of the supplemental fuel gas in the supplemental fuel gas stream 50 using the flow meter 54, and optionally measuring a velocity $V_{pg}$ of purge gas in purge gas stream 36 using a purge gas flow meter. Velocity measurement technologies suitable for measuring gas flow in a respective stream can include a single set of ultrasonic transducers, two sets of ultrasonic transducers, or an OSI OFS-2000F™ velocity measurement device using optical scintillation technology. In a two-set transducer configuration, the ultrasonic flow meter can further be configured to use both sets of transducers to generate an average velocity measurement with either a single range or a dual range (low-flow and high-flow) or to use a single set of transducers to measure a low-flow regime and the other set of transducers to measure a high-flow regime using two sets of probes. In FIG. 2A, the velocity measured by the vent gas flow meter 70 in the vent gas stream 40 is for the vent gas that contains the raw vent gas and any supplemental fuel gas that is added to the vent gas stream 40; thus, the velocity $V_{vg}$ accounts for the velocity of the raw vent gas and the supplemental fuel gas flowing in the vent gas stream 40. In FIG. 2B and in FIG. 2C, the velocity measured by the vent gas flow meter 70 in the vent gas stream 40 is only for the raw vent gas since supplemental fuel gas is introduced into vent gas stream 40 downstream of the vent gas flow meter 70. The velocity of the supplemental fuel gas in supplemental fuel gas stream 50 is measured using supplemental fuel gas flow meter 54.

Controlling a flow of air to the flare 110 can include calculating the volumetric flow rate $Q_{vg,VOL}$ of the vent gas flowing to the flare 110. In FIG. 2A, the volumetric flow rate $Q_{vg,VOL}$ of the vent gas in the vent gas stream 40 can be calculated the same way as described for calculating the volumetric flow rate $Q_{vg,VOL}$ of vent gas for FIG. 1A. In FIG. 2B and FIG. 2C, the volumetric flow rate $Q_{vg,VOL}$ of the vent gas in the vent gas stream 40 can be calculated the same way as described for calculating the volumetric flow rate $Q_{vg,VOL}$ of vent gas for FIG. 1B FIG. 10.

Controlling a flow of air to the flare 110 can include calculating, at block 404, a total air:vent gas mole ratio for smokeless operation of the flare 110 using the concentration of the at least one hydrocarbon in the vent gas stream 40 multiplied by a standard air:hydrocarbon ratio required for smokeless operation of the flare 110 for the at least one hydrocarbon. The flare control system 400 can use the following equation to make the calculation in block 406:

$$\text{AIR}: VG_{Total} = \sum \frac{(\text{mol } \%_{comp\, n}) * (\text{AIR}: VG_{comp\, n})}{100 \text{ lb vent gas}}$$

The mol $\%_{COMP\, n}$ is the mole percent of a particular component n in the vent gas stream 40 obtained by the first gas analyzer 80. The standard air-to-vent gas ratio for a particular component n, AIR:$VG_{COMP\, n}$, is available in literature with examples shown in Table 2 above. Alternatively, the standard air-to-vent gas ratio for component n can be determined by empirical testing a given flare by adding a set of known flow rates of component n to the vent gas and adjusting the air flow to determine the required air flow to control smoke formation for each known flow rate of component n.

Controlling a flow of air to the flare 110 can include calculating a required air flow rate for the flow of air to the flare 110 by multiplying the total air:vent gas mole ratio by the volumetric flow rate of the vent gas in the vent gas stream 40. The flare control system 400 can use the following equation to make the calculation:

$$Q_{air,req} = (\text{AIR}: VG_{Total}) * .0167 \frac{HR}{MIN}$$

The variables used to calculate the required flow rate of air, $Q_{air,req}$, are explained above.

Controlling a flow of air to the flare 110 can include adjusting a flow of air to the flare 110 to the required air flow rate, $Q_{air,req}$. To do so, the speed of one or more of the blowers 92a and 92b is adjusted, if needed. The flare control system 400 can be programmed to associate a particular RPM of the variable drive motor in the blowers 92a and 92b with a particular volume of air. Alternatively, the flare control system 400 can be programmed to measure the air speed using an air flow meter coupled to each blower 92a and 92b, and to control the RPM of the variable drive motor so as to control the flow of the air to the flare 110. In aspects, adjusting a flow of air to the flare 110 to the required air flow rate includes controlling a speed of one or more of the blowers 92a and 92b which is/are fluidly coupled with the flare 110.

Controlling a flow of a supplemental fuel gas in the supplemental fuel gas stream 50 can include calculating a net heating value of the vent gas in the vent gas stream 40 using the concentration of the at least one hydrocarbon and a net heating value for the at least one hydrocarbon. The flare control system 400 can use the following equation to make the calculation in block 408:

$$NHV_{vg} = \frac{\sum (\text{mol } \%_{comp\,n}) * (NHV_{comp\,n})}{100}$$

where mol $\%_{comp\,n}$ is the concentration of component "n" in the vent gas stream 40 measured by the first gas analyzer 80 and $NHV_{comp\,n}$ is the net heating value of the component "n" which is available in the literature and examples for certain gasous components are provided in Table 2 above. Calculating a net heating value of the vent gas in the vent gas stream 40 can also utilize the concentration of hydrogen in the vent gas stream 40 measured by the hydrogen scanning analyzer 82. FIG. 4 shows that a value of 274 BTU/SCF should be used for the NHV of hydrogen when calculating the contribution of any measured hydrogen to the overall net heating value of the vent gas in the vent gas stream 40, $NHV_{vg}$.

Controlling a flow of a supplemental fuel gas in the supplemental fuel gas stream 50 can include measuring a flow rate of the vent gas in the vent gas stream 40 with the vent gas flow meter 70. The flow rate, referred to here for flare control system 400 interchangeably as $Q_{vg}$ or $Q_{vg,VOL}$, can be the volumetric flow rate, which is described using the equation for $Q_{vg,VOL}$ above. To obtain the $Q_{vg,VOL}$, $V_{vg}$ (the velocity of the vent gas in the vent gas stream 40) is obtained. The value of $V_{vg}$ (the velocity of the vent gas in the vent gas stream 40) obtained by the flare control system 400 can be the velocity measurement made by the vent gas flow meter 70.

Controlling a flow of a supplemental fuel gas in the supplemental fuel gas stream 50 can include determining a flow rate of air to the flare 110. The air flow rate, referred to here as $Q_{air,VOL}$, can be determined by the flare control system 400 by determining the speed of the variable frequency drive motors of the blowers 92a and 92b and matching the speed(s) with the corresponding air flow rates from blower curves stored on or accessible by the flare control system 400. Alternatively, a flow rate of air to the flare 110 can be determined by measuring a flow of air in stream 90, for example, with flow meter devices that utilize ultrasonic and/or optical scintillation technology.

Controlling a flow of a supplemental fuel gas in the supplemental fuel gas stream 50 can include calculating a net heating value dilution parameter in the combustion zone 115 in the flare 110 using the flow rate of the vent gas in the vent gas stream 40, the net heating value calculated for the vent gas, the flow rate of air to the flare 110, and a diameter of a tip of the flare 110. The flare control system 400 can use the following equation to make the calculation in block 410:

$$NHV_{dil} = \frac{(Q_{vg} * NHV_{vg}) * D_{tip}}{(Q_{vg} + Q_{air,VOL})}.$$

The net heating value dilution parameter in the combustion zone 115, $NHV_{dil}$, uses the values for $NHV_{vg}$ and $Q_{vg}$ which are discussed above. This equation also includes the variable $Q_{air,VOL}$, which is determined as explained above when calculating the required air flow rate on a volumetric flow rate basis. The term $Q_{air,VOL}$, is used to account for the dilution effect of the air on the net heating value dilution parameter in the combustion zone 115, $NHV_{dil}$. FIG. 4 shows that a value of 1,212 BTU/SCF should be used for the NHV of hydrogen when calculating the contribution of any measured hydrogen to the overall net heating value dilution parameter in the combustion zone 115, $NHV_{dil}$. This equation also uses the value for $D_{tip}$ in units of ft, which is the diameter of the tip 113 of the flare 110. The effective tip diameter for a given flare is generally available from the manufacturer.

Controlling a flow of a supplemental fuel gas in supplemental fuel gas stream 50 can include, at block 409, calculating a first flow rate for the supplemental fuel gas that is required to change the net heating value of the vent gas in the vent gas stream 40 to meet a first setpoint value, wherein the first setpoint value is equal to or greater than a target net heating value for a vent gas specified by regulation. As discussed herein, the target value for NHV required by regulation for the vent gas in the vent gas stream 40 is currently a minimum value of 300 BTU/SCF. As such, the first setpoint value can be equal to or greater than 300 BTU/SCF.

Controlling a flow of a supplemental fuel gas in supplemental fuel gas stream 50 can include, at block 411, calculating a second flow rate for the supplemental fuel gas that is required to change the net heating value dilution parameter in the combustion zone 115 to meet a second setpoint value, wherein the second setpoint value is equal to or greater than a target net heating value dilution parameter for a combustion zone specified by regulation. As discussed herein, the target value for NHV dilution parameter required by regulation in the combustion zone 115 is currently a minimum value of 22 BTU/SQF. As such, the second setpoint value can be equal to or greater than 22 BTU/SQF.

Controlling a flow of a supplemental fuel gas in the supplemental fuel gas stream 50 can include determining which one of the net heating value of the vent gas in the vent gas stream 40 and the net heating value dilution parameter in the combustion zone 115 requires more supplemental fuel gas to meet its setpoint value. FIG. 4 shows the flare control system 400 uses decision block 412 to determine which of the net heating value and the net heating value dilution parameter requires the larger supplemental fuel gas flow and to select the one that requires the larger supplemental fuel gas flow. At decision block 412, the larger flow of the supplemental fuel gas can be identified and/or selected as the selected flow rate for the supplemental fuel gas stream 50. Alternatively stated, block 412 can decide which calculated supplemental fuel gas flow rate is greater and identify/select the greater flow rate as the selected flow rate for the supplemental fuel gas stream 50.

Controlling a flow of a supplemental fuel gas in the supplemental fuel gas stream 50 can include adjusting the flow rate of the supplemental fuel gas stream 50 (e.g., using the supplemental fuel gas valve 52) to the selected flow rate. Practically speaking, the flare control system 400 can actuate the supplemental fuel gas flow control valve 52 to the appropriate level to adjust the flow of the supplemental fuel gas to the selected flow rate.

Once one or more of the air and supplemental fuel gas is controlled, the vent gas of the vent gas stream 40 can be combusted in the flare 110 according to the flow rate controlled for air and optionally according to the flow rate controlled for the supplemental fuel gas.

FIG. 5 illustrates a detailed view of another flare control system 500 that can be utilized in the apparatuses 100A of FIG. 1A, 100B of FIG. 1B, and 100C of FIG. 1C. In the flare control system 500 in FIG. 5, the flow of steam is controlled in the same manner as described for the flare control system 300 in FIG. 3; thus, the description of steam flow control is not reproduced here. The flow of supplement fuel gas is controlled by accounting for and reconciling any differences in the concentration of species in the vent gas measured by i) the first gas analyzer 80 and optionally the hydrogen scanning analyzer 82, and ii) the second gas analyzer 84.

The same calculations for $NHV_{vg}$ and $NHV_{cz}$ as described for FIG. 3 can be performed by the flare control system 500 for the concentrations measured by the first gas analyzer 80 and hydrogen scanning analyzer 82. Additionally for the flare control system 500, these values can be identified as the $NHV_{vg}$ and $NHV_{cz}$ values calculated for the first gas analyzer 80 and hydrogen scanning analyzer 82, associated with the time (t) at which the sample of vent gas was collected, and stored in a datastore of the flare control system 500. The values for vent gas flow and steam flow rate at time (t) can also be stored in the datastore of the flare control system 500 for later calculation of the $NHV_{vg}$ and $NHV_{cz}$ values at time (t) using concentrations obtained with the second gas analyzer 84. The flare control system 500 can be configured to separately calculate $NHV_{vg}$ and $NHV_{cz}$ values for the concentrations measured by the second gas analyzer 84. The value for $NHV_{vg}$ can be calculated in the same manner as described for FIG. 3 using concentrations measured by the second gas analyzer 84 at block 508 in FIG. 5, and the value for $NHV_{cz}$ can be calculated in the same manner described for FIG. 3 using the concentrations measured by the second gas analyzer 84 at block 510 in FIG. 5, as well as the vent gas flow rate and steam flow rate stored in datastore for time (t).

At block 509 of the flare control system 500 of FIG. 5, the value for $NHV_{vg}$ obtained in block 308 at a particular time (t) using the concentrations measured by the first gas analyzer 80 and hydrogen scanning analyzer 82 ($NHV_{vg\ 1}$) is reconciled with the value for $NHV_{vg}$ obtained in block 508 at the particular time (t) using the concentrations measured by the second gas analyzer 84 ($NHV_{vg\ 2}$). To reconcile any difference between $NHV_{vg\ 1}$ and $NHV_{vg\ 2}$, the flare control system 500 is configured to take the ratio of $NHV_{vg\ 2}$ to $NHV_{vg\ 1}$ and multiply said ratio by the value for $NHV_{vg\ 1}$ obtained in block 308, according to the following equation:

$$NHV_{vg\ reconciled} = \frac{NHV_{vg2}}{NHV_{vg1}} \times NHV_{vg1}$$

The value for $NHV_{vg\ reconciled}$ is the value that is used to calculate the flow rate of supplemental fuel gas in block 309 of FIG. 5, which is performed in the same manner as described for block 309 of FIG. 3, except that $NHV_{vg\ reconciled}$ according to the above equation is used instead of the raw $NHV_{vg}$ value obtained using measurements only from the first gas analyzer 80 and the hydrogen scanning analyzer 82.

At block 511 of the flare control system 500 of FIG. 5, the value for $NHV_{cz}$ obtained in block 310 at a particular time (t) using the concentrations measured by the first gas analyzer 80 and hydrogen scanning analyzer 82 ($NHV_{cz\ 1}$) is reconciled with the value for $NHV_{cz}$ obtained in block 510 at the particular time (t) using the concentrations measured by the second gas analyzer 84 ($NHV_{cz\ 2}$). To reconcile any difference between $NHV_{cz\ 1}$ and $NHV_{cz\ 2}$, the flare control system 500 is configured to take the ratio of $NHV_{cz\ 2}$ to $NHV_{cz\ 1}$ and multiply said ratio by the value for $NHV_{cz\ 1}$ obtained in block 310, according to the following equation:

$$NHV_{cz\ reconciled} = \frac{NHV_{cz2}}{NHV_{cz1}} \times NHV_{cz1}$$

The value for $NHV_{cz\ reconciled}$ is the value that is used to calculate the flow rate of supplemental fuel gas in block 311 of FIG. 5, which is performed in the same manner as described for block 311 of FIG. 3, except that $NHV_{cz\ reconciled}$ according to the above equation is used instead of the raw $NHV_{cz}$ value obtained using measurements only from the first gas analyzer 80 and the hydrogen scanning analyzer 82.

Alternatively, at block 511, the $NHV_{cz\ reconciled}$ value can be obtained by using $H_2$-adjusted NHVs in the ratio. The following equation describes the use of such ratio:

$$NHV_{cz\ reconciled} = \frac{NHV_{H2\ adjusted\ 2}}{NHV_{H2\ adjusted\ 1}} \times NHV_{cz1}$$

The "$NHV_{H2\ adjusted\ 1}$" value is the hydrogen-adjusted net heating value calculated using one or more of the concentrations measured by the first gas analyzer 80 and hydrogen scanning analyzer 82 at time (t). The "$NHV_{H2\ adjusted\ 2}$" value is the hydrogen-adjusted net heating value calculated using one or more of the concentrations measured by the second gas analyzer 84 at time (t). The $NHV_{cz\ 1}$ value is obtained in block 310 at a particular time (t) using the concentrations measured by the first gas analyzer 80 and hydrogen scanning analyzer 82. The value for $NHV_{cz\ reconciled}$ is the value that is used to calculate the flow rate of supplemental fuel gas in block 311 of FIG. 5, which is performed in the same manner as described for block 311 of FIG. 3, except that $NHV_{cz\ reconciled}$ according to the above equation is used instead of the raw $NHV_{cz}$ value obtained using measurements only from the first gas analyzer 80 and the hydrogen scanning analyzer 82.

In the flare control system 500, blocks 312 and 314 are still used as described for FIG. 3 in order to control the flow rate of the supplemental fuel gas in the supplemental fuel gas stream 50.

In aspects, the flare control system 500 can be configured to periodically update the values for the ratio of $NHV_{vg\ 2}$ to $NHV_{vg\ 1}$ that are used to calculate the value for $NHV_{vg\ reconciled}$ at time t=0 to time t=X. In an aspect where the second gas analyzer 84 is slower to report concentrations in the vent gas than the first gas analyzer 80, time t=0 is the time when the second gas analyzer 84 reports concentrations by which $NHV_{vg}$ values can be calculated, and time t=X is the time when the second gas analyzer 84 updates a new value for the $NHV_{vg}$ in the vent gas. In such a scenario, the first gas analyzer 80 can report values of concentration in the vent gas more frequently. An equation to describe this updating technique is shown below:

$$NHV_{vg\,reconciled\,t=0\,to\,X} = \frac{NHV_{vg\,2\,t=0}}{NHV_{vg\,1\,t=0}} \times NHV_{vg\,1\,t=0\,to\,X}$$

It can be seen that the ratio is based on the values for $NHV_{vg\,2}$ to $NHV_{vg\,1}$ at time t=0. These values can be used until time X, e.g., the time when the second gas analyzer 84 reports another set of concentrations of components in the vent gas. For the period of time period from t=0 to t=X, the ratio value stays the same since the $NHV_{vg}$ values are those used at time t=0, while the value for $NHV_{vg}$ t=0 to x updates as new values become available from concentration measurements made by the first gas analyzer 80 until time X. At time X, the ratio can be updated based on the values for $NHV_{vg\,2}$ to $NHV_{vg\,1}$ at time t=X. These values can be used to calculate the ratio until time Y, e.g., the time when the second gas analyzer 84 reports another set of concentrations of components in the vent gas. For the period of time period from t=X to t=Y, the ratio value stays the same since the $NHV_{vg}$ values are those used at time t=X, while the value for $NHV_{vg\,t=X}$ to Y updates as new values become available from concentration measurements made by the first gas analyzer 80 until time Y.

In aspects, the flare control system 500 can be configured to periodically update the values for the ratio of $NHV_{cz\,2}$ to $NHV_{cz\,1}$ that are used to calculate the value for $NHV_{cz\,reconciled}$ at time t=0 to time t=X. In an aspect where the second gas analyzer 84 is slower to report concentrations in the vent gas than the first gas analyzer 80, time t=0 is the time when the second gas analyzer 84 reports concentrations by which $NHV_{cz}$ values can be calculated, and time t=X is the time when the second gas analyzer 84 updates a new value for the $NHV_{cz}$ in the combustion zone 115. In such a scenario, the first gas analyzer 80 can report values of concentration in the vent gas more frequently. An equation to describe this updating technique is shown below:

$$NHV_{cz\,reconciled\,t=0\,to\,X} = \frac{NHV_{cz\,2\,t=0}}{NHV_{cz\,1\,t=0}} \times NHV_{cz\,1\,t=0\,to\,X}$$

It can be seen that the ratio is based on the values for $NHV_{cz\,2}$ to $NHV_{cz\,1}$ at time t=0. These values can be used until time X, e.g., the time when the second gas analyzer 84 reports another set of concentrations of components in the vent gas. For the period of time period from t=0 to t=X, the ratio value stays the same since the $NHV_{cz}$ values are those used at time t=0, while the value for $NHV_{cz\,t=0\,to\,X}$ updates as new values become available from concentration measurements made by the first gas analyzer 80 until time X. At time X, the ratio can be updated based on the values for $NHV_{cz\,2}$ to $NHV_{cz\,1}$ at time t=X. These values can be used to calculate the ratio until time Y, e.g., the time when the second gas analyzer 84 reports another set of concentrations of components in the vent gas. For the period of time period from t=X to t=Y, the ratio value stays the same since the $NHV_{cz}$ values are those used at time t=X, while the value for $NHV_{cz\,t=0\,to\,Y}$ updates as new values become available from concentration measurements made by the first gas analyzer 80 until time Y. Another equation to describe this updating technique is shown below:

$$NHV_{cz\,reconciled\,t=0\,to\,X} = \frac{NHV_{H2\,Adjusted\,2\,t=0}}{NHV_{H2\,Adjusted\,1\,t=0}} \times NHV_{cz\,1\,t=0\,to\,X}$$

It can be seen that the ratio is based on the values for $NHV_{H2\,Adjusted\,2}$ to $NHV_{H2\,Adjusted\,1}$ at time t=0. These values can be used until time X, e.g., the time when the second gas analyzer 84 reports another set of concentrations of components in the vent gas. For the period of time period from t=0 to t=X, the ratio value stays the same since the $NHV_{H2\,Adjusted\,1}$ and $NHV_{H2\,Adjusted\,1}$ values are those used at time t=0, while the value for $NHV_{cz\,t=0\,to\,X}$ updates as new values become available from concentration measurements made by the first gas analyzer 80 or hydrogen gas analyzer 82 until time X. At time X, the ratio can be updated based on the values for $NHV_{H2\,Adjusted\,2}$ to $NHV_{H2\,Adjusted\,1}$ at time t=X. These values can be used to calculate the ratio until time Y, e.g., the time when the second gas analyzer 84 reports another set of concentrations of components in the vent gas. For the period of time period from t=X to t=Y, the ratio value stays the same since the $NHV_{H2\,Adjusted\,1}$ and $NHV_{H2\,Adjusted\,2}$ values are those used at time t=X, while the value for $NHV_{H2\,Adjusted\,1\,t=X\,to\,Y}$ updates as new values become available from concentration measurements made by the first gas analyzer 80 or hydrogen gas analyzer 82 until time Y.

Recall that as discussed for FIG. 1A, FIG. 1B, FIG. 10, FIG. 2A, FIG. 2B, and FIG. 20, gas analyzers 80, 82, and 84 can analyze samples of the vent gas via sample streams 41/42/43/44. In aspects, the flare control system 500 can be configured to compensate for lead or lag time between i) when the first gas analyzer 80 analyzes a portion of a sample of vent gas and ii) when the second gas analyzer 84 analyzes another portion of the sample of vent gas. For example, it is contemplated that the first gas analyzer 80 can be installed into an existing flare 110 that already has a second gas analyzer 84 installed (e.g., configured as a gas chromatograph). Due to the space available at the flare 110, the first gas analyzer 80 and the hydrogen scanning analyzer 82 can be located at a distance from the second gas analyzer 84, even in a separate enclosure, and thus, a lead time exists which amounts to the difference in time from the time at which a portion of the sample is analyzed in the first gas analyzer 80 and the time at which another portion of the sample is analyzed in the second gas analyzer 84. Alternatively, there can be a lag time to transport a portion of the vent gas sample from the sample supply line of the second gas analyzer 84, through a connecting tubing (e.g., sample line 41), to the first gas analyzer 80 and the hydrogen scanning analyzer 82. In such a scenario, a lag time exists which amounts to the difference in time from the time at which a portion of the sample is analyzed in the second gas analyzer 84 and the time at which another portion of the sample is analyzed in the first gas analyzer 80. By example only, for a sample line flow of 750 cm³/min though 100 ft of a connecting line that is ¼ inch tubing, the lead or lag time can be as much as 40 seconds. Thus, in aspects, the lead or lag time between when a portion of a sample is analyzed by the first gas analyzer 80 and when another portion of a sample of the vent gas is analyzed by the second gas analyzer 84 is known.

The flare control system 500 can be configured to account for the lead or lag time between i) when the first gas analyzer 80 analyzes a portion of a sample of vent gas and ii) when the second gas analyzer 84 analyzes another portion of the sample of vent gas. In aspects, the second gas analyzer 84 can be configured to communicate (e.g., via appropriate networking as described herein) to the flare control system 500 when a portion of the sample is measured, in order to start the lead/lag time window. Recall that the flare control system 500 can be configured to use a first setpoint value for the $NHV_{vg}$ which is equal to greater than the minimum $NHV_{vg}$ required by regulation and to use a second setpoint value for the $NHV_{cz}$ which is equal to greater than the minimum $NHV_{cz}$ required by regulation, in order to determine, select, and control the flow rate of supplemental fuel gas in the supplemental fuel gas stream 50. In aspects having lead or lag time considerations, the flare control system 500 can be configured to make several additional determinations at block 509 and block 511.

At block 509, the flare control system 500 can be additionally configured to determine if the net heating value of the vent gas is less than the first target value. As discussed for FIG. 3, the first target value can be a minimum net heating value for a vent gas specified by regulation. If the net heating value of the vent gas is less than the first target value, the flare control system 500 can be configured to adjust the first setpoint value to a higher vent gas setpoint value that is greater than the first setpoint value. In an aspect, the flare control system 500 can maintain the higher vent gas setpoint value in place of the first setpoint value for a period of time, for example, the time it takes for the second gas analyzer to complete 1, 2, 3, 4, or 5 analyses.

At block 309, when the flare control system 500 maintains the higher vent gas setpoint value in place of the first setpoint value, the flow rate required for the supplemental flow gas that is calculated in block 309 can utilize the higher vent gas setpoint value instead of the first setpoint value.

At block 511, the flare control system 500 can be additionally configured to determine if the net heating value in the combustion zone is less than the second target value. As discussed for FIG. 3, the second target value can be a minimum net heating value in the combustion zone 115 specified by regulation. If the net heating value in the combustion zone 115 is less than the second target value, the flare control system 500 can be configured to adjust the second setpoint value to a higher combustion zone setpoint value that is greater than the second setpoint value. In an aspect, the flare control system 500 can maintain the higher combustion zone setpoint value in place of the second setpoint value for a period of time, for example, the time it takes for the second gas analyzer to complete 1, 2, 3, 4, or 5 analyses.

At block 311, when the flare control system 500 can maintain the higher combustion zone setpoint value in place of the second setpoint value, the flow rate required for the supplemental flow gas that is calculated in block 311 can utilize the higher combustion zone setpoint value instead of the second setpoint value.

FIG. 6 illustrates a detailed view of another flare control system 600 that can be utilized in the apparatuses 200A of FIG. 2A, 200B of FIG. 2B, and 200C of FIG. 2C. In the flare control system 600 in FIG. 6, the flow of air is controlled in the same manner as described for the flare control system 400 in FIG. 4; thus, the description of steam flow control is not reproduced here. The flow of supplement fuel gas is controlled by accounting for and reconciling any differences in the concentration of species in the vent gas measured by i) the first gas analyzer 80 and optionally the hydrogen scanning analyzer 82, and ii) the second gas analyzer 84.

The same calculations for $NHV_{vg}$ and $NHV_{dil}$ as described for FIG. 4 can be performed by the flare control system 600 for the concentrations measured by the first gas analyzer 80 and hydrogen scanning analyzer 82. Additionally for the flare control system 600, these values can be identified as the $NHV_{vg}$ and $NHV_{dil}$ values calculated for the first gas analyzer 80 and hydrogen scanning analyzer 82, associated with the time (t) at which the sample of vent gas was collected, and stored in a datastore of the flare control system 600. The values for vent gas flow and air flow rate at time (t) can also be stored in the datastore of the flare control system 600 for later calculation of the $NHV_{vg}$ and $NHV_{dil}$ values at time (t) using concentrations obtained with the second gas analyzer 84. The flare control system 600 is configured to separately calculate $NHV_{vg}$ and $NHV_{dil}$ values for the concentrations measured by the second gas analyzer 84. The value for $NHV_{vg}$ is calculated in the same manner as described for FIG. 4 using concentrations measured by the second gas analyzer 84 at block 608 in FIG. 6, and the value for $NHV_{dil}$ is calculated in the same manner as described for FIG. 4 using the concentrations measured by the second gas analyzer 84 at block 610 in FIG. 6, as well as the vent gas flow rate and air flow rate stored in datastore for time (t).

At block 609 of the flare control system 600 of FIG. 6, the value for $NHV_{vg}$ obtained in block 408 at a particular time (t) using the concentrations measured by the first gas analyzer 80 and hydrogen scanning analyzer 82 ($NHV_{vg\ 1}$) is reconciled with the value for $NHV_{vg}$ obtained in block 608 at the particular time (t) using the concentrations measured by the second gas analyzer 84 ($NHV_{vg\ 2}$). To reconcile any difference between $NHV_{vg\ 1}$ and $NHV_{vg\ 2}$, the flare control system 600 is configured to take the ratio of $NHV_{vg\ 2}$ to $NHV_{vg\ 1}$ and multiply said ratio by the value for $NHV_{vg\ 1}$ obtained in block 408, according to the following equation:

$$NHV_{vg\ reconciled} = \frac{NHV_{vg\ 2}}{NHV_{vg\ 1}} \times NHV_{vg\ 1}$$

The value for $NHV_{vg\ reconciled}$ is the value that is used to calculate the flow rate of supplemental fuel gas in block 409 of FIG. 6, which is performed in the same manner as described for block 409 of FIG. 4, except that $NHV_{vg\ reconciled}$ according to the above equation is used instead of the raw $NHV_{vg}$ value obtained using measurements only from the first gas analyzer 80 and the hydrogen scanning analyzer 82.

At block 611 of the flare control system 600 of FIG. 6, the value for $NHV_{dil}$ obtained in block 410 at a particular time (t) using the concentrations measured by the first gas analyzer 80 and hydrogen scanning analyzer 82 ($NHV_{dil\ 1}$) is reconciled with the value for $NHV_{dil}$ obtained in block 610 at the particular time (t) using the concentrations measured by the second gas analyzer 84 ($NHV_{dil\ 2}$). To reconcile any difference between $NHV_{dil\ 1}$ and $NHV_{dil\ 2}$, the flare control system 600 is configured to take the ratio of $NHV_{dil\ 2}$ to $NHV_{dil\ 1}$ and multiply said ratio by the value for $NHV_{dil\ 1}$ obtained in block 410, according to the following equation:

$$NHV_{dil\ reconciled} = \frac{NHV_{dil\ 2}}{NHV_{dil\ 1}} \times NHV_{dil\ 1}$$

The value for $NHV_{dil\ reconciled}$ is the value that is used to calculate the flow rate of supplemental fuel gas in block 411 of FIG. 6, which is performed in the same manner as described for block 411 of FIG. 4, except that $NHV_{dil\ reconciled}$ according to the above equation is used instead of the raw $NHV_{dil}$ value obtained using measurements only from the first gas analyzer 80 and the hydrogen scanning analyzer 82.

Alternatively, at block 611, the $NHV_{dil\ reconciled}$ value can be obtained by using H$_2$-adjusted NHVs in the ratio. The following equation describes the use of such ratio:

$$NHV_{dil\ reconciled} = \frac{NHV_{H2\ adjusted\ 2}}{NHV_{H2\ adjusted\ 1}} \times NHV_{dil\ 1}$$

The "$NH_{VH2\ adjusted\ 1}$" value is the hydrogen-adjusted net heating value calculated using one or more of the concentrations measured by the first gas analyzer 80 and hydrogen scanning analyzer 82 at time (t). The "$NH_{VH2\ adjusted\ 2}$" value is the hydrogen-adjusted net heating value calculated using one or more of the concentrations measured by the second gas analyzer 84 at time (t). The $NHV_{dil\ 1}$ value is obtained in block 410 at a particular time (t) using the concentrations measured by the first gas analyzer 80 and hydrogen scanning analyzer 82. The value for $NHV_{dil\ reconciled}$ is the value that is used to calculate the flow rate of supplemental fuel gas in block 411 of FIG. 6, which is performed in the same manner as described for block 411 of FIG. 4, except that $NHV_{dil\ reconciled}$ according to the above equation is used instead of the raw $NHV_{dil}$ value obtained using measurements only from the first gas analyzer 80 and the hydrogen scanning analyzer 82.

In the flare control system 600, blocks 412 and 414 are still used as described for FIG. 4 in order to control the flow rate of the supplemental fuel gas in the supplemental fuel gas stream 50.

In aspects, the flare control system 600 can be configured to periodically update the values for the ratio of $NHV_{vg\ 2}$ to $NHV_{vg\ 1}$ that are used to calculate the value for $NHV_{vg\ reconciled}$ at time t=0 to time t=X. In an aspect where the second gas analyzer 84 is slower to report concentrations in the vent gas than the first gas analyzer 80, time t=0 is the time when the second gas analyzer 84 reports concentrations by which $NHV_{vg}$ values can be calculated, and time t=X is the time when the second gas analyzer 84 updates a new value for the $NHV_{vg}$ in the vent gas. In such a scenario, the first gas analyzer 80 can report values of concentration in the vent gas more frequently. An equation to describe this updating technique is shown below:

$$NHV_{vg\ reconciled\ t=0\ to\ X} = \frac{NHV_{vg\ 2\ t=0}}{NHV_{vg\ 1\ t=0}} \times NHV_{vg\ 1\ t=0\ to\ X}$$

It can be seen that the ratio is based on the values for $NHV_{vg\ 2}$ to $NHV_{vg\ 1}$ at time t=0. These values can be used until time X, e.g., the time when the second gas analyzer 84 reports another set of concentrations of components in the vent gas. For the period of time period from t=0 to t=X, the ratio value stays the same since the $NHV_{vg}$ values are those used at time t=0, while the value for $NHV_{vg\ t=0\ to\ X}$ updates as new values become available from concentration measurements made by the first gas analyzer 80 until time X. At time X, the ratio can be updated based on the values for $NHV_{vg\ 2}$ to $NHV_{vg\ 1}$ at time t=X. These values can be used to calculate the ratio until time Y, e.g., the time when the second gas analyzer 84 reports another set of concentrations of components in the vent gas. For the period of time period from t=X to t=Y, the ratio value stays the same since the $NHV_{vg}$ values are those used at time t=X, while the value for $NHV_{vg\ t=x\ to\ Y}$ updates as new values become available from concentration measurements made by the first gas analyzer 80 until time Y.

In aspects, the flare control system 600 can be configured to periodically update the values for the ratio of $NHV_{dil\ 2}$ to $NHV_{dil\ 1}$ that are used to calculate the value for $NHV_{dil\ reconciled}$ at time t=0 to time t=X. In an aspect where the second gas analyzer 84 is slower to report concentrations in the vent gas than the first gas analyzer 80, time t=0 is the time when the second gas analyzer 84 reports concentrations by which $NHV_{dil}$ values can be calculated, and time t=X is the time when the second gas analyzer 84 updates a new value for the $NHV_{dil}$ in the combustion zone 115. In such a scenario, the first gas analyzer 80 can report values of concentration in the vent gas more frequently. An equation to describe this updating technique is shown below:

$$NHV_{dil\ reconciled\ t=0\ to\ X} = \frac{NHV_{dil\ 2\ t=0}}{NHV_{dil\ 1\ t=0}} \times NHV_{dil\ 1\ t=0\ to\ X}$$

It can be seen that the ratio is based on the values for $NHV_{dil\ 2}$ to $NHV_{dil\ 1}$ at time t=0. These values can be used until time X, e.g., the time when the second gas analyzer 84 reports another set of concentrations of components in the vent gas. For the period of time period from t=0 to t=X, the ratio value stays the same since the $NHV_{dil}$ values are those used at time t=0, while the value for $NHV_{dil}$ t=0 to x updates as new values become available from concentration measurements made by the first gas analyzer 80 until time X. At time X, the ratio can be updated based on the values for $NHV_{dil\ 2}$ to $NHV_{dil\ 1}$ at time t=X. These values can be used to calculate the ratio until time Y, e.g., the time when the second gas analyzer 84 reports another set of concentrations of components in the vent gas. For the period of time period from t=X to t=Y, the ratio value stays the same since the $NHV_{dil}$ values are those used at time t=X, while the value for $NHV_{dil\ t=X\ to\ Y}$ updates as new values become available from concentration measurements made by the first gas analyzer 80 until time Y. Another equation to describe this updating technique is shown below:

$$NHV_{dil\ reconciled\ t=0\ to\ X} = \frac{NHV_{H2\ Adjusted\ 2\ t=0}}{NHV_{H2\ Adjusted\ 1\ t=0}} \times NHV_{dil\ 1\ t=0\ to\ X}$$

It can be seen that the ratio is based on the values for $NHV_{H2\ Adjusted\ 2}$ to $NHV_{H2\ Adjusted\ 1}$ at time t=0. These values can be used until time X, e.g., the time when the second gas analyzer 84 reports another set of concentrations of components in the vent gas. For the period of time period from t=0 to t=X, the ratio value stays the same since the $NHV_{H2\ Adjusted\ 1}$ and $NHV_{H2\ Adjusted\ 1}$ values are those used at time t=0, while the value for $NHV_{dil\ t=0\ to\ X}$ updates as new values become available from concentration measurements made by the first gas analyzer 80 or hydrogen gas analyzer 82 until time X. At time X, the ratio can be updated based on the values for $NHV_{H2\ Adjusted\ 2}$ to $NHV_{H2\ Adjusted\ 1}$ at time t=X. These values can be used to calculate the ratio until time Y, e.g., the time when the second gas analyzer 84 reports another set of concentrations of components in the vent gas. For the period of time period from t=X to t=Y, the ratio value stays the same since the $NHV_{H2\ Adjusted\ 1}$ and $NHV_{H2\ Adjusted\ 1}$ values are those used at time t=X, while the value for $NHV_{dil}$ t=x to Y updates as new values become available from concentration measurements made by the first gas analyzer 80 or hydrogen gas analyzer 82 until time Y.

In aspects, the flare control system 600 can be configured to compensate for lead or lag time between i) when the first gas analyzer 80 analyzes a portion of a sample of vent gas and ii) when the second gas analyzer 84 analyzes another portion of the sample of vent gas. The lead and lag time are described for FIG. 5 and not reproduced here.

In aspects, the second gas analyzer 84 can be configured to communicate (e.g., via appropriate networking as described herein) to the flare control system 600 when a portion of the sample is measured. Recall that the flare control system 600 can be configured to use a first setpoint value for the $NHV_{vg}$ which is equal to greater than the minimum $NHV_{vg}$ required by regulation and to use a second setpoint value for the $NHV_{dil}$ which is equal to greater than the minimum $NHV_{dil}$ required by regulation, in order to determine, select, and control the flow rate of supplemental fuel gas in the supplemental fuel gas stream 50. In aspects having lead or lag time considerations, the flare control system 600 can be configured to make several additional determinations at block 609 and block 611.

At block 609, the flare control system 600 can be additionally configured to determine if the net heating value of the vent gas is less than the first target value. As discussed for FIG. 4, the first target value can be a minimum net heating value for a vent gas specified by regulation. If the net heating value of the vent gas is less than the first target value, the flare control system 600 can be configured to adjust the first setpoint value to a higher vent gas setpoint value that is greater than the first setpoint value. In an aspect, the flare control system 600 can maintain the higher vent gas setpoint value in place of the first setpoint value for a period of time, for example, the time it takes for the second gas analyzer to complete 1, 2, 3, 4, or 5 analyses.

At block 409, when the flare control system 600 maintains the higher vent gas setpoint value in place of the first setpoint value, the flow rate required for the supplemental flow gas that is calculated in block 409 can utilize the higher vent gas setpoint value instead of the first setpoint value.

At block 611, the flare control system 600 can be additionally configured to determine if the net heating value dilution parameter for the combustion zone 115 is less than the second target value. As discussed for FIG. 4, the second target value can be a minimum net heating value dilution parameter in the combustion zone 115 specified by regulation. If the net heating value dilution parameter calculated for the combustion zone 115 is less than the second target value, the flare control system 600 can be configured to adjust the second setpoint value to a higher combustion zone dilution parameter setpoint value that is greater than the second setpoint value. In an aspect, the flare control system 600 can maintain the higher combustion zone dilution parameter setpoint value in place of the second setpoint value for a period of time, for example, the time it takes for the second gas analyzer to complete 1, 2, 3, 4, or 5 analyses.

At block 411, when the flare control system 600 can maintain the higher combustion zone dilution parameter setpoint value in place of the second setpoint value, the flow rate required for the supplemental flow gas that is calculated in block 411 can utilize the higher combustion zone dilution parameter setpoint value instead of the second setpoint value.

Figure 7A:
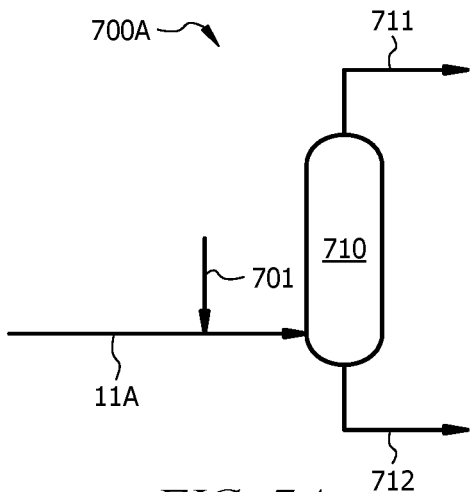
FIG. 7A illustrates a schematic diagram of an embodiment of the vent gas recovery system.

FIG. 7A illustrates a schematic diagram of an embodiment of a vent gas recovery system 700A that is configured to produce a process gas. The vent gas recovery system 700A in FIG. 7A can be used as the vent gas recovery system 20 in FIGS. 1A, 1B, 10, 2A, 2B, and 2C. The vent gas recovery system 700A in FIG. 7A is configured to receive the first stream 11A of raw vent gas and to process the first stream 11A to produce a process gas in stream 711 for use in a process in the plant in which apparatuses 100A, 100B, 100C, 200A, 200B, and 200C are located.

The vent gas recovery system 700A can include a quench tank 710 configured as a vessel containing a quick medium, such as a quench liquid that captures liquids and any solid impurities contained in the first stream 11A of vent gas. The liquids can be removed in liquid stream 712 for further processing. In some aspects, steam in stream 701 can be added to the first stream 11A prior to introduction of the first stream 11A to the quench tank 710. The quench tank 710 can be configured as one or more vessel configured to hold a quench medium for removal of the liquids and any solid impurities from the vent gas to produce a process stream 711 containing the process gas. In some aspects, the quench medium can be water. In other aspects, the quench medium can be a solvent.

Figure 7B:
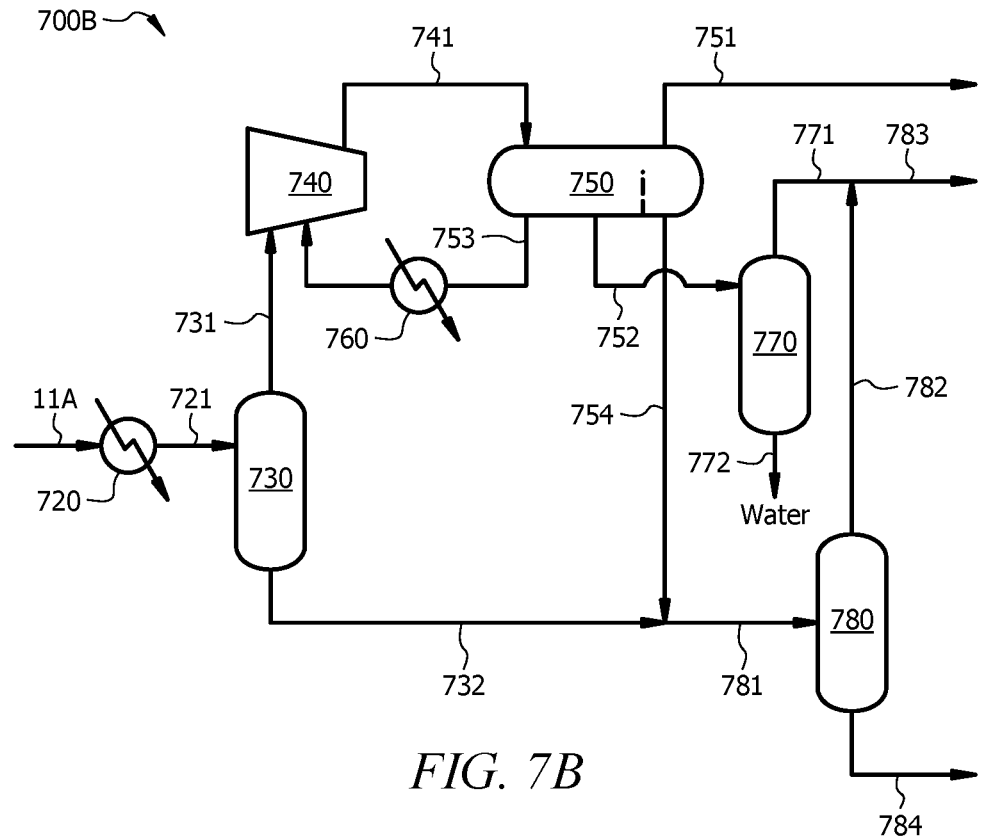
FIG. 7B illustrates a schematic diagram of another embodiment of the vent gas recovery system.

FIG. 7B illustrates a schematic diagram of another embodiment of a vent gas recovery system 700B that is configured to produce a fuel gas. The vent gas recovery system 700B in FIG. 7B is exemplary and non-limiting. The vent gas recovery system 700B can be used as the vent gas recovery system 20 in FIGS. 1A, 1B, 10, 2A, 2B, and 2C. The vent gas recovery system 700B in FIG. 7B is configured to receive the first stream 11A of raw vent gas and to process the first stream 11A to produce a recovered gas in stream 751 for use in, for example, equipment that utilizes combustion of fuel gas to produce heat or electricity or in equipment to reclaim valuable materials.

The vent gas recovery system 700B can include a first heat exchanger 720, a first knock-out drum 730 fluidly connected to the first heat exchanger 720, a compressing device 740 (e.g., a ring compressor or other type of compressor, or one or more ejectors) fluidly connected to the first knock-out drum 730, a three-phase separator 750 fluidly connected to the compressing device 740, a second heat exchanger 760 fluidly connected to a first outlet of the three-phase separator 750 and to the compressing device 740, a degassing vessel 770 fluidly connected to a second outlet of the three-phase separator 750, and second knock-out drum 780 fluidly connected to a third outlet of the three-phase separator 750 and to an outlet of the first knock-out drum 730.

The first heat exchanger 720 can be any heat exchanger (e.g., with liquid coolant or air coolant) configured to cool the vent gas in first stream 11A to produce cooled stream 721. In aspects, the cooled stream 721 can have a temperature and pressure sufficient such that some of the gaseous components of the vent gas condensed to form a liquid phase. The first knock-out drum 730 can be a vessel configured to receive the cooled vent gas in stream 721 and to separate the cooled stream 721 into a first gas stream 731 and to a first liquid stream 732. The first gas stream 731 can contain non-condensed gas components of the vent gas. The first liquid stream 732 can contain condensed components and solids from the vent gas. The first gas stream 731 can feed to compressing device 740 that is configured to compress the first gas stream 731 to form a compressed gas stream 741. The three-phase separator 750 is configured to receive the compressed gas stream 751 and to produce four streams: fuel gas stream 751, first liquid product stream 752, second liquid product stream 753, and third liquid product stream 754. The first liquid product stream 752 can be a circulating liquid blowdown that feeds to the degassing vessel 770, e.g., to refresh the circulating liquid with makeup. The second liquid product stream 753 can be cooled in heat exchanger 760 and recycled to the compressing device 740 as a circulating liquid. The third liquid product stream 754 can fluidly connect to the second knock-out drum 780. In aspects, the knock-out drum 780 can be one or more degassing vessels. The third liquid product stream 754 can include hydrocarbons and other liquids that condense in the compressing device 740. In aspects, the third liquid product stream 754 can combine with the first liquid stream 732 to form a combined liquid feed stream 781 that is introduced to the second knock-out drum 780. The degassing vessel 770 is configured to separate the first liquid product stream 752 into a first gas product stream 771 and a water stream 772. The second knock-out drum 780 is configured to separate the third liquid product stream 754 and the first liquid stream 732 into a second gas product stream 782 and a heavy liquid stream 784 that contains liquids that condensed during compression in the compressing device 740. The first gas product stream 771 and the second gas product stream 782 can combine to form stream 783 that can be fed to a process, such as a to the flare 110.

ADDITIONAL DESCRIPTION

Methods and apparatuses for vent gas recovery with flare control during a flare event have been described. The present application is also directed to the subject-matter described in the following numbered paragraphs (referred to as "para" or "paras"):

Para 1. A method comprising: flowing, while a flare is in a standby state, a vent gas to a vent gas recovery system; detecting one or more flare activation conditions; adjusting the flare from the standby state to an active state based on the detecting; and controlling, while the flare is in the active state and in real-time based at least in part on a concentration of at least one hydrocarbon in a vent gas stream that is fluidly connected to the flare, i) a flow of supplemental fuel gas and a flow of steam to the flare or ii) a flow of supplemental fuel gas and a flow of air to the flare.

Para 2. The method of Para 1, further comprising: during controlling, continuing to flow a portion of the vent gas to the vent gas recovery system.

Para 3. The method of any of Paras 1 or 2, wherein the one or more flare activation conditions comprises one or more of: i) a first signal received from a differential pressure sensor of a pressure seal apparatus, wherein the first signal indicates that a differential pressure between a seal inlet and a seal outlet of the pressure seal apparatus is greater than a static head pressure of a liquid in the pressure seal apparatus; ii) a second signal received from a liquid level sensor of the pressure seal apparatus, the second signal indicates that a liquid level in the pressure seal apparatus is below a setpoint liquid level; iii) a third signal received from a vent gas flow meter, wherein the third signal indicates that a flow rate of the vent gas in the vent gas stream is greater than zero; and iv) a fourth signal received from a supplemental fuel gas flow meter, wherein the fourth signal indicates that a flow rate of supplemental fuel gas in a supplemental fuel gas stream is greater than zero.

Para 4. The method of any of Paras 1 to 3, further comprising: filling the pressure seal apparatus with a liquid to the setpoint liquid level.

Para 5. The method of any of Paras 1 to 4, wherein adjusting the flare from the standby state to the active state comprises: increasing the flow of the supplemental fuel gas to the flare; and increasing the flow of steam or air to the flare.

Para 6. The method of any of Paras 1 to 5, wherein the supplemental fuel gas flows in a supplemental fuel gas stream that combines with the flow of vent gas in the vent gas stream.

Para 7. The method of any of Paras 1 to 6, wherein the supplemental fuel gas stream combines with the vent gas stream at a location in the vent gas stream that is i) upstream of a gas analyzer that is configured to measure a concentration of at least one hydrocarbon of the vent gas in the vent gas stream and ii) upstream or downstream of a vent gas flow meter in the vent gas stream.

Para 8. The method of any of Paras 1 to 7, further comprising: flowing, while the flare is in the active state, the vent gas to the vent gas recovery system and to the flare; detecting, while the flare is in the active state, a plurality of flare deactivation conditions; and adjusting the flare from the active state to the standby state based on the detecting the plurality of flare deactivation conditions.

Para 9. The method of Para 8, wherein the plurality of flare deactivation conditions comprise: i) a fifth signal received from the differential pressure sensor of the pressure seal apparatus, wherein the fifth signal indicates that a differential pressure between a seal inlet and a seal outlet of the pressure seal apparatus is less than a static head pressure of a liquid in the pressure seal apparatus; ii) a sixth signal received from the liquid level sensor of the pressure seal apparatus, wherein the sixth signal indicates that a liquid level in the pressure seal apparatus is at or above a setpoint liquid level; and iii) a seventh signal received from the vent gas flow meter, wherein the seventh signal indicates that a flow rate of the vent gas in the vent gas stream is zero.

Para 10. The method of any of Paras 8 to 9, wherein adjusting the flare from the active state to the standby state comprises: stopping the flow of the supplemental fuel gas to the flare; and stopping the flow of steam or air to the flare.

Para 11. The method of any of Paras 8 to 10, further comprising: after adjusting the flare from the active state to the standby state, continue flowing the vent gas to the vent gas recovery system while the flare is in the standby state.

Para 12. The method of any of Paras 1 to 11, wherein a purge flow to the pressure seal apparatus is configured to prevent air ingress into the flare stack and pressure seal apparatus.

Para 13. The method of any of Paras 1 to 12, wherein the flow of steam to the flare is controlled, wherein the step of controlling a flow of steam to the flare comprises:
  calculating a molecular weight of the vent gas in the vent gas stream using the concentration of the at least one hydrocarbon and a molecular weight of the at least one hydrocarbon;
  measuring 1) a velocity of the raw vent gas and supplemental fuel gas in the vent gas stream and optionally a velocity of a purge gas in a purge gas stream connected to the pressure seal apparatus, or 2) a velocity of the raw vent gas in the vent gas stream, a velocity of the supplemental fuel gas in the supplemental fuel gas stream, and optionally a velocity of a purge gas in a purge gas stream connected to the pressure seal apparatus;
  calculating a mass flow rate of the vent gas using the measured velocities, the molar volume at standard conditions of 385.3 SCF/LB-MOL, and the calculated molecular weight;

calculating a total steam:vent gas mass ratio for smokeless operation of the flare using the concentration of the at least one hydrocarbon in the vent gas stream multiplied by a standard steam:hydrocarbon ratio required for smokeless operation of the flare for the at least one hydrocarbon;

calculating a required steam flow rate for the flow of steam to the flare by multiplying the total steam:vent gas mass ratio by the total mass flow rate of the vent gas in the vent gas stream; and adjusting the flow of steam to the flare to the required steam flow rate.

Para 14. The method of any of Paras 1 to 13, wherein the steam flows to the flare via a plurality of steam lines, wherein each of the plurality of steam lines is in parallel flow to the other of the plurality of steam lines, where each of the plurality of steam lines comprises a steam flow control valve and a steam flow meter, and optionally wherein the supplemental fuel gas flows to the flare via a plurality of supplemental fuel gas streams, wherein each of the plurality of supplemental fuel gas streams is in parallel flow to the other of the plurality of supplemental fuel gas streams, where each of the plurality of supplemental fuel gas streams comprises a supplemental fuel gas flow control valve and a supplemental fuel gas flow meter.

Para 15. The method of any of Paras 1 to 14, wherein the flow of air to the flare is controlled, wherein the step of controlling a flow of air to the flare comprises:

calculating a molecular weight of the vent gas in the vent gas stream using the concentration of the at least one hydrocarbon and a molecular weight of the at least one hydrocarbon;

measuring 1) a velocity of the raw vent gas and supplemental fuel gas in the vent gas stream and optionally a velocity of a purge gas in a purge gas stream connected to the pressure seal apparatus, or 2) a velocity of the raw vent gas in the vent gas stream, a velocity of the supplemental fuel gas in the supplemental fuel gas stream, and optionally a velocity of a purge gas in a purge gas stream connected to the pressure seal apparatus;

calculating the volumetric flow rate of the vent gas using the calculated velocities;

calculating a total air:vent gas mole ratio for smokeless operation of the flare using the concentration of the at least one hydrocarbon in the vent gas stream multiplied by a standard air:hydrocarbon ratio required for smokeless operation of the flare for the at least one hydrocarbon;

calculating a required air flow rate for the flow of air to the flare by multiplying the total air:vent gas mole ratio by the volumetric flow rate of the vent gas in the vent gas stream; and adjusting a flow of air to the flare to the required air flow rate.

Para 16. The method of Para 15, wherein adjusting a flow of air to the flare to the required air flow rate comprises controlling a speed of one or more blowers fluidly coupled with the flare.

Para 17. The method of any of Paras 1 to 16, wherein controlling a flow of supplemental fuel gas does not require manual control at any time over the entire set of operating conditions of the flare as compared with a method not utilizing a real-time gas analyzer such as the online tunable infrared absorption based gas analyzer described herein.

Para 18. The method of any of Paras 1-17, wherein controlling a flow of supplemental fuel gas comprises:

calculating a net heating value of the vent gas in the vent gas stream using the concentration of the at least one hydrocarbon and a net heating value for the at least one hydrocarbon;

calculating a first flow rate for the supplemental fuel gas that is required to change the net heating value of the vent gas in the vent gas stream to meet a first setpoint value, wherein the first setpoint value is optionally defined as equal to or greater than a minimum net heating value for a vent gas specified by regulation;

calculating a net heating value in a combustion zone of the flare using the flow rate of the vent gas in the vent gas stream, a flow rate of steam to the flare, and the net heating value for the vent gas;

calculating a second flow rate for the supplemental fuel gas that is required to change the net heating value in the combustion zone to meet a second setpoint value, wherein the second setpoint value is optionally defined as equal to or greater than a minimum net heating value for a combustion zone specified by regulation;

determining and selecting which one of the net heating value of the vent gas in the vent gas stream and the net heating value in the combustion zone is a selected net heating value that requires more supplemental fuel gas to meet the respective setpoint value (or alternatively stated, determining which one of the first flow rate and the second flow rate is greater, and identifying the greater one as the selected flow rate);

adjusting a flow of the supplemental gas to the selected flow rate.

Para 19. The method of any of Paras 1 to 17, wherein controlling a flow of supplemental fuel gas comprises:

calculating a net heating value of the vent gas in the vent gas stream using the concentration of the at least one hydrocarbon and a net heating value for the at least one hydrocarbon;

calculating a first flow rate for the supplemental fuel gas that is required to change the net heating value of the vent gas in the vent gas stream to meet a first setpoint value, wherein the first setpoint value is optionally defined as equal to or greater than a minimum net heating value for a vent gas specified by regulation;

calculating a net heating value dilution parameter in a combustion zone of the flare using the flow rate of the vent gas in the vent gas stream, the flow rate of air to the flare, the net heating value for the vent gas, and a diameter of a tip of the flare;

calculating a second flow rate for the supplemental fuel gas that is required to change the net heating value dilution parameter of the combustion zone to meet a second setpoint value, wherein the second setpoint value is optionally defined as equal to or greater than a minimum net heating value dilution parameter for a combustion zone specified by regulation;

determining and selecting which one of the net heating value of the vent gas in the vent gas stream and the net heating value dilution parameter for the combustion zone is a selected net heating value that requires more supplemental fuel gas to meet the respective setpoint value (or alternatively stated, determining which one of the first flow rate and the second flow rate is greater, and identifying the greater one as a selected flow rate); and adjusting the flow of the supplemental fuel gas to the selected flow rate.

Para 20. The method of any of Paras 1 to 17, wherein controlling a flow of supplemental fuel gas comprises:
- calculating a first net heating value of the vent gas in the vent gas stream using the concentration of the at least one hydrocarbon that is received from a first gas analyzer and a net heating value for the at least one hydrocarbon;
- calculating a second net heating value of the vent gas in the vent gas stream using the concentration of the at least one hydrocarbon that is received from a second gas analyzer and a net heating value for the at least one hydrocarbon;
- multiplying the first net heating value of the vent gas by a ratio of the second net heating value of the vent gas to the first net heating value of the vent gas to obtain a reconciled net heating value of the vent gas;
- calculating a first flow rate for the supplemental fuel gas that is required to change the reconciled net heating value of the vent gas in the vent gas stream to meet a first setpoint value, wherein the first setpoint value is optionally defined as equal to or greater than a minimum net heating value for a vent gas specified by regulation;
- calculating a first net heating value dilution parameter in a combustion zone of the flare using the flow rate of the vent gas in the vent gas stream, a flow rate of steam to the flare, and the first net heating value for the vent gas calculated using the concentration of the at least one hydrocarbon that is received from the first gas analyzer;
- calculating a second net heating value in the combustion zone of the flare using the flow rate of the vent gas in the vent gas stream, a flow rate of steam to the flare, and the second net heating value for the vent gas calculated using the concentration of the at least one hydrocarbon that is received from the second gas analyzer;
- multiplying the first net heating value dilution parameter by a ratio of the second net heating value dilution parameter to the first net heating value dilution parameter to obtain a reconciled net heating value dilution parameter in the combustion zone;
- calculating a second flow rate for the supplemental fuel gas that is required to change the reconciled net heating value dilution parameter in the combustion zone to meet a second setpoint value, wherein the second setpoint value is optionally defined as equal to or greater than a minimum net heating value dilution parameter for a combustion zone specified by regulation;
- determining and selecting which one of the reconciled net heating value of the vent gas in the vent gas stream and the reconciled net heating value dilution parameter in the combustion zone is a selected net heating value that requires more supplemental fuel gas to meet the respective setpoint value (or alternatively stated, determining which one of the first flow rate and the second flow rate is greater, and identifying the greater one as the selected flow rate); and
- adjusting a flow of the supplemental fuel gas to the selected flow rate.

Para 21. The method of any of Paras 1 to 17, wherein controlling a flow of supplemental fuel gas comprises:
- calculating a first net heating value of the vent gas in the vent gas stream using the concentration of the at least one hydrocarbon that is received from a first gas analyzer and a net heating value for the at least one hydrocarbon;
- calculating a second net heating value of the vent gas in the vent gas stream using the concentration of the at least one hydrocarbon that is received from a second gas analyzer and a net heating value for the at least one hydrocarbon;
- multiplying the first net heating value of the vent gas by a ratio of the second net heating value of the vent gas to the first net heating value of the vent gas to obtain a reconciled net heating value of the vent gas;
- calculating a first flow rate for the supplemental fuel gas that is required to change the reconciled net heating value of the vent gas in the vent gas stream to meet a first setpoint value, wherein the first setpoint value is optionally defined as equal to or greater than a minimum net heating value for a vent gas specified by regulation;
- calculating a first net heating value dilution parameter in a combustion zone of the flare using the flow rate of the vent gas in the vent gas stream, a flow rate of air to the flare, and the first net heating value for the vent gas calculated using the concentration of the at least one hydrocarbon that is received from the first gas analyzer;
- calculating a second net heating value dilution parameter in the combustion zone of the flare using the flow rate of the vent gas in the vent gas stream, a flow rate of air to the flare, a diameter of the flare tip, and the second net heating value for the vent gas calculated using the concentration of the at least one hydrocarbon that is received from the second gas analyzer;
- multiplying the first net heating value dilution parameter by a ratio of the second net heating value dilution parameter to the first net heating value dilution parameter to obtain a reconciled net heating value dilution parameter in the combustion zone;
- calculating a second flow rate for the supplemental fuel gas that is required to change the reconciled net heating value dilution parameter in the combustion zone to meet a second setpoint value, wherein the second setpoint value is optionally defined as equal to or greater than a minimum net heating value dilution parameter for a combustion zone specified by regulation;
- determining and selecting which one of the reconciled net heating value of the vent gas in the vent gas stream and the reconciled net heating value dilution parameter in the combustion zone is a selected net heating value that requires more supplemental fuel gas to meet the respective setpoint value (or alternatively stated, determining which one of the first flow rate and the second flow rate is greater, and identifying the greater one as the selected flow rate); and adjusting a flow of the supplemental fuel gas to the selected flow rate.

Para 22. The method of any of Paras 20 to 21, further comprising:
- determining if the net heating value of the vent gas (calculated using information from the first gas analyzer and/or the second gas analyzer) is less than a first target value, wherein the first target value can be a minimum net heating value for a vent gas specified by regulation;
- adjusting the first setpoint value to a higher vent gas setpoint value that is greater than the first setpoint value;
- calculating a third flow rate for the supplemental fuel gas that is required to change the net heating value of the vent gas in the vent gas stream to meet the higher vent gas setpoint value;

determining if the net heating value in the combustion zone is less than a second target value, wherein the second target value can be a minimum net heating value in the combustion zone specified by regulation;

adjusting the second setpoint value to a higher combustion zone setpoint value that is greater than the second setpoint value;

calculating a fourth flow rate for the supplemental fuel gas that is required to change the net heating value in the combustion zone to meet the higher combustion zone setpoint value;

determining which one of the third flow rate and the fourth flow rate is greater; identifying the greater one as the selected flow rate; and adjusting the flow of the supplemental fuel gas to the selected flow rate.

Para 23. The method of any of Paras 20-21, further comprising:

determining if the net heating value of the vent gas (calculated using information from the first gas analyzer and/or the second gas analyzer) is less than a first target value, wherein the first target value can be a minimum net heating value for a vent gas specified by regulation;

adjusting the first setpoint value to a higher vent gas setpoint value that is greater than the first setpoint value;

calculating a third flow rate for the supplemental fuel gas that is required to change the net heating value of the vent gas in the vent gas stream to meet the higher vent gas setpoint value;

determining if the net heating value dilution parameter in the combustion zone is less than a second target value, wherein the second target value can be a minimum net heating value dilution parameter in the combustion zone specified by regulation;

adjusting the second setpoint value to a higher combustion zone setpoint value that is greater than the second setpoint value;

calculating a fourth flow rate for the supplemental fuel gas that is required to change the net heating value dilution parameter in the combustion zone to meet the higher combustion zone setpoint value;

determining which one of the third flow rate and the fourth flow rate is greater; identifying the greater one as the selected flow rate; and adjusting the flow of the supplemental fuel gas to the selected flow rate.

Para 24. The method of any of Paras 1-23, wherein controlling a flow of steam or air to the flare does not require manual control at any time over the entire set of operating conditions of the flare as compared with a method which does control the flow in real-time and/or which does not measure concentration with the gas analyzer.

Para 25. The method of any of Paras 1-24, wherein the concentration of the at least one hydrocarbon is measured using an online tunable infrared absorption based gas analyzer that is the first gas analyzer of any of the paragraphs above, wherein the concentration of the at least one hydrocarbon is additionally measured using gas chromatography that is the second gas analyzer of any of the paragraphs above.

Para 26. The method of any of Paras 1-25, further comprising:

measuring a hydrogen concentration in the vent gas stream;

controlling, in real-time based at least in part on the hydrogen concentration in the vent gas stream, the flow of steam or air to the flare, wherein the step of measuring is performed by an online tunable infrared absorption based gas analyzer configured to analyze the vent gas in a sample stream taken from the vent gas stream or configured to analyze the vent gas in a flow path of the vent gas in the vent gas stream at a location between a knockout pot and the combustion zone of the flare.

Para 27. The method of Paras 27, wherein the knockout pot is located in a cracking unit, a natural gas liquid facility, a polymer production facility, a poly alpha olefin (PAO) plant, a normal alpha olefin (NAO) plant, a reformer, a catalytic cracker, an alkylation process, any other petrochemical process, or refining process incorporating a flammable hydrocarbon, or a combination thereof.

Para 28. The method of any of Paras 1-27, wherein the at least one hydrocarbon of the vent gas in the vent gas stream has from 1-20 carbon atoms.

Para 29. The method of any of Paras 1-28, wherein the vent gas stream further comprises nitrogen, carbon monoxide, carbon dioxide, hydrogen, oxygen, water, fuel gas, natural gas, or a combination thereof.

Para 30. The method of any of Paras 1-29, further comprising: combusting the at least one hydrocarbon in the presence of the flow of steam or air.

Para 31. A flare control and vent gas recovery apparatus comprising:

a raw vent gas stream configured to split into a first stream and a second stream;

a vent gas recovery system having an inlet fluidly coupled to the first stream;

a pressure seal apparatus having a seal inlet fluidly coupled to the second stream;

a vent gas stream having a vent gas flow meter located therein, wherein the vent gas stream is fluidly coupled to a seal inlet or to a seal outlet of the pressure seal apparatus, wherein the pressure seal apparatus has a differential pressure sensor fluidly coupled to the seal inlet and to the seal outlet, wherein the pressure seal apparatus has a liquid level sensor configured to indicate a liquid level in the pressure seal apparatus;

a supplemental fuel gas stream fluidly coupled to the vent gas stream downstream of a first location in the vent gas stream where the seal outlet is coupled to the vent gas stream, wherein the supplemental fuel gas stream has a supplemental fuel gas flow meter located therein;

a flare fluidly coupled to the vent gas stream downstream of a second location in the vent gas stream where the supplemental fuel gas stream is fluidly coupled to the vent gas stream; and a flare control system coupled to the differential pressure sensor, the liquid level sensor, the vent gas flow meter, and the supplemental fuel gas flow meter, wherein the flare control system is configured to i) detect a flare activation condition or a plurality of flare deactivation conditions and ii) adjust the flare between a standby state and an active state.

Para 32. The flare control and vent gas recovery apparatus of Para 31, further comprising a gas analyzer located downstream of the second location where the supplemental fuel gas stream is fluidly coupled to the vent gas stream, wherein the gas analyzer is configured to analyze a vent gas in a sample stream taken from the vent gas stream or configured to analyze the vent gas in a flow path of the vent gas in the vent gas stream, wherein the gas analyzer is configured to measure a concentration of at least one hydrocarbon of the vent gas in the vent gas stream; wherein the flare control system is coupled with the gas analyzer and further configured to control, in real-time based at least in part on the concentration of the at least one hydrocarbon, a flow of supplemental fuel gas to the flare.

Para 33. The flare control and vent gas recovery apparatus of Para 31 or 32, wherein the vent gas flow meter is located in the vent gas stream positioned downstream of the location where the supplemental fuel gas stream is fluidly coupled to the vent gas stream and upstream of the gas analyzer.

Para 34. The flare control and vent gas recovery apparatus of Para 31 or 32, wherein the vent gas flow meter is located in the vent gas stream positioned upstream of the location where the supplemental fuel gas stream is fluidly coupled to the vent gas stream and upstream of the gas analyzer.

Para 35. The flare control and vent gas recovery apparatus of any of Paras 31 to 34, further comprising: an air stream or a steam stream configured to feed air or steam to the flare; and an optional hydrogen scanning analyzer configured to measure a hydrogen concentration in the vent gas stream; wherein the flare control system is further configured to control, in real-time based at least in part on the concentration of the at least one hydrocarbon and in part on the hydrogen concentration in the vent gas stream, a flow of steam or air to the flare.

Para 36. The flare control and vent gas recovery apparatus of any of Paras 31 to 35, wherein a supplemental fuel gas stream has at least one supplemental fuel gas flow meter located therein.

Para 37. The flare control and vent gas recovery apparatus of any of Paras 31 to 36, wherein the pressure seal apparatus is upstream or downstream of the vent gas flow meter and downstream of a sweep line that is coupled to the vent gas stream Para 38. The flare control and vent gas recovery apparatus of any of Paras 32 to 36, wherein the gas analyzer is configured to analyze the vent gas in a sample stream taken from the vent gas stream or configured to analyze the vent gas in a flow path of the vent gas in the vent gas stream upstream of the combustion zone, wherein the gas analyzer is configured to measure a concentration of at least one hydrocarbon of the vent gas in the vent gas stream, wherein the flare control system is coupled with the gas analyzer and configured to control, in real-time based at least in part on the concentration of the at least one hydrocarbon, a flow of steam or air to the flare.

Para 39. The flare control and vent gas recovery apparatus of any of Paras 31 to 38, further comprising: wherein the gas analyzer is configured to measure a hydrogen concentration in the vent gas stream or the apparatus also includes a hydrogen scanning analyzer configured to measure a hydrogen concentration in the vent gas stream, wherein the flare control system is further configured to control, in real-time based at least in part on the hydrogen concentration in the vent gas stream, the flow of steam or air to the flare.

Para 40. The flare control and vent gas recovery apparatus of any of Paras 31 to 29, wherein the flare control system is further configured to control, in real-time based at least in part on the concentration of the at least one hydrocarbon, a flow of supplemental fuel gas into the vent gas stream.

Para 41. The flare control and vent gas recovery apparatus of any of Paras 32-40, wherein the gas analyzer is coupled with the vent gas stream at a location in the vent gas stream that is between a knockout pot and the combustion zone of the flare.

Para 42. The flare control and vent gas recovery apparatus of Para 41, wherein the knockout pot is located in a cracking unit, a natural gas liquid facility, a polymer production facility, a poly alpha olefin (PAO) plant, a normal alpha olefin (NAO) plant, a reformer, a catalytic cracker, an alkylation process, any other petrochemical process, or refining process incorporating a flammable hydrocarbon, or a combination thereof.

Para 43. The flare control and vent gas recovery apparatus of any of Paras 31 to 42, wherein the at least one hydrocarbon of the vent gas in the vent gas stream has from 1-20 carbon atoms.

Para 44. The flare control and vent gas recovery apparatus of any of Paras 31 to 43, wherein the vent gas stream further comprises nitrogen, carbon monoxide, carbon dioxide, hydrogen, oxygen, water, fuel gas, natural gas, or a combination thereof.

Para 45. The flare control and vent gas recovery apparatus of any of Paras 31 to 44, further comprising: a gas chromatograph configured to measure the concentration of the at least one hydrocarbon by gas chromatography.

Para 46. The flare control and vent gas recovery apparatus of any of Paras 31 to 45, further comprising: an ultrasonic flow meter to measure a velocity of the vent gas in the vent gas stream.

Para 47. The flare control and vent gas recovery apparatus of any of Paras 31 to 45, wherein the flare combusts the at least one hydrocarbon in the presence of the flow of steam or air.

Para 48. A method comprising: flowing, while a flare is in an active state, a vent gas to a vent gas recovery system and to a flare; controlling, in real-time based at least in part on a concentration of at least one hydrocarbon in a vent gas stream, i) a flow of supplemental fuel gas and a flow of steam to the flare or ii) a flow of supplemental fuel gas and a flow of air to the flare; detecting, while the flare is in the active state, a plurality of flare deactivation conditions; and adjusting the flare from the active state to a standby state based on the detecting.

Para 49. The method of Para 48, wherein the plurality of flare deactivation conditions comprise: i) a fifth signal received from the differential pressure sensor of the pressure seal apparatus, wherein the fifth signal indicates that a differential pressure between a seal inlet and a seal outlet of the pressure seal apparatus is less than a static head pressure of a liquid in the pressure seal apparatus; ii) a sixth signal received from the liquid level sensor of the pressure seal apparatus, wherein the sixth signal indicates that a liquid level in the pressure seal apparatus is at or above a setpoint liquid level; and iii) a seventh signal received from the vent gas flow meter, wherein the seventh signal indicates that a flow rate of the vent gas in the vent gas stream is zero.

Para 50. The method of any of Paras 48 to 49, wherein adjusting the flare from the active state to the standby state comprises: stopping the flow of the supplemental fuel gas to the flare; and stopping the flow of steam or air to the flare.

Para 51. The method of any of Paras 48 to 50, further comprising: after adjusting the flare from the active state to the standby state, continue flowing the vent gas to the vent gas recovery system while the flare is in the standby state.

Para 52. The method of any of Paras 48 to 51, wherein a purge flow to the pressure seal apparatus is configured to prevent air ingress into the flare stack.

Para 53. The method of any of Paras 48 to 52, wherein the supplemental fuel gas flows in a supplemental fuel gas stream that combines with the flow of vent gas in the vent gas stream.

Para 54. The method of any of Paras 48 to 53, wherein the supplemental fuel gas stream combines with the vent gas stream at a location in the vent gas stream that is i) upstream of a gas analyzer that is configured to measure a concentration of at least one hydrocarbon of the vent gas in the vent gas stream and ii) upstream or downstream of a vent gas flow meter in the vent gas stream.

At least one aspect and at least one embodiment are disclosed and variations, combinations, and/or modifications of the aspect(s) and embodiment(s) and/or features of the aspect(s) and embodiment(s) made by a person having ordinary skill in the art are within the scope of the disclosure. Alternative aspects and embodiments that result from combining, integrating, and/or omitting features of the aspect(s) and embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^* (R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent. . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are aspect(s) and/or embodiment(s) of the disclosed inventive subject matter. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

What is claimed is:

1. A flare control and vent gas recovery apparatus comprising:
    a raw vent gas stream configured to split into a first stream and a second stream;
    a vent gas recovery system having an inlet fluidly coupled to the first stream;
    a pressure seal apparatus having a seal inlet fluidly coupled to the second stream;
    a vent gas stream having a vent gas flow meter located therein, wherein the vent gas stream is fluidly coupled to the seal inlet or to a seal outlet of the pressure seal apparatus, wherein the pressure seal apparatus has a differential pressure sensor fluidly coupled to the seal inlet and to the seal outlet, wherein the pressure seal apparatus has a liquid level sensor configured to indicate a liquid level in the pressure seal apparatus;
    a supplemental fuel gas stream fluidly coupled to the vent gas stream downstream of a first location in the vent gas stream where the seal outlet is coupled to the vent gas stream, wherein the supplemental fuel gas stream has a supplemental fuel gas flow meter located therein;
    a flare fluidly coupled to the vent gas stream downstream of a second location in the vent gas stream where the supplemental fuel gas stream is fluidly coupled to the vent gas stream; and
    a flare control system coupled to the differential pressure sensor, the liquid level sensor, the vent gas flow meter, and the supplemental fuel gas flow meter, wherein the flare control system is configured to i) detect a flare activation condition or a plurality of flare deactivation conditions and ii) adjust the flare between a standby state and an active state.

2. The flare control and vent gas recovery apparatus of claim 1, further comprising:
    a gas analyzer located downstream of the second location where the supplemental fuel gas stream is fluidly coupled to the vent gas stream, wherein the gas analyzer is configured to analyze a vent gas in a sample stream taken from the vent gas stream or configured to analyze the vent gas in a flow path of the vent gas in the vent gas stream, wherein the gas analyzer is configured to measure a concentration of at least one hydrocarbon of the vent gas in the vent gas stream;
    wherein the flare control system is coupled with the gas analyzer and further configured to control, in real-time based at least in part on the concentration of the at least one hydrocarbon, a flow of supplemental fuel gas to the flare.

3. The flare control and vent gas recovery apparatus of claim 2, wherein the vent gas flow meter is located in the vent gas stream positioned downstream of the first location where the supplemental fuel gas stream is fluidly coupled to the vent gas stream and upstream of the gas analyzer.

4. The flare control and vent gas recovery apparatus of claim 2, wherein the vent gas flow meter is located in the vent gas stream positioned upstream or downstream of the first location where the supplemental fuel gas stream is fluidly coupled to the vent gas stream and upstream of the gas analyzer.

5. The flare control and vent gas recovery apparatus of claim 2, further comprising:
    an air stream or a steam stream configured to feed air or steam to the flare; and
    wherein i) the gas analyzer is configured to measure a hydrogen concentration in the vent gas stream, or ii) the apparatus includes a hydrogen scanning analyzer configured to measure the hydrogen concentration in the vent gas stream;
    wherein the flare control system is further configured to control, in real-time based at least in part on the concentration of the at least one hydrocarbon and in part on the hydrogen concentration in the vent gas stream, a flow of steam or air to the flare.

6. The flare control and vent gas recovery apparatus of claim 1, wherein a purge stream is connected to the pressure seal apparatus, wherein the purge stream is configured to provide a purge flow of a purge gas to the flare.

7. A method comprising:
    flowing, while a flare is in an active state, a vent gas to a vent gas recovery system and to the flare;
    controlling, in real-time based at least in part on a concentration of at least one hydrocarbon in a vent gas stream, i) a flow of supplemental fuel gas and a flow of steam to the flare or ii) a flow of supplemental fuel gas and a flow of air to the flare;

detecting, while the flare is in the active state, a plurality of flare deactivation conditions; and adjusting the flare from the active state to a standby state based on detecting, wherein the plurality of flare deactivation conditions comprise: i) a first signal received from a differential pressure sensor of a pressure seal apparatus, wherein the first signal indicates that a differential pressure between a seal inlet and a seal outlet of the pressure seal apparatus is less than a static head pressure of a liquid in the pressure seal apparatus; ii) a second signal received from a liquid level sensor of the pressure seal apparatus, wherein the second signal indicates that a liquid level in the pressure seal apparatus is at or above a setpoint liquid level; and iii) a third signal received from a vent gas flow meter, wherein the third signal indicates that a flow rate of the vent gas in the vent gas stream is zero.

8. The method of claim 7, wherein adjusting the flare from the active state to the standby state comprises:

stopping the flow of the supplemental fuel gas to the flare; and stopping the flow of steam or air to the flare.

9. The method of claim 7, further comprising:

after adjusting the flare from the active state to the standby state, continue flowing the vent gas to the vent gas recovery system while the flare is in the standby state.

10. A method comprising:

flowing, while a flare is in a standby state, a vent gas to a vent gas recovery system;

detecting one or more flare activation conditions;

adjusting the flare from the standby state to an active state based on detecting the one or more flare activation conditions;

controlling, while the flare is in the active state and in real-time based at least in part on a concentration of at least one hydrocarbon in a vent gas stream that is fluidly connected to the flare, i) a flow of supplemental fuel gas and a flow of steam to the flare or ii) a flow of supplemental fuel gas and a flow of air to the flare;

flowing, while the flare is in the active state, the vent gas to the vent gas recovery system and to the flare;

detecting, while the flare is in the active state, a plurality of flare deactivation conditions; and adjusting the flare from the active state to the standby state based on detecting the plurality of flare deactivation conditions;

wherein the plurality of flare deactivation conditions comprise: i) a first signal received from a differential pressure sensor of a pressure seal apparatus, wherein the first signal indicates that a differential pressure between a seal inlet and a seal outlet of the pressure seal apparatus is less than a static head pressure of a liquid in the pressure seal apparatus; ii) a second signal received from a liquid level sensor of the pressure seal apparatus, wherein the second signal indicates that a liquid level in the pressure seal apparatus is at or above a setpoint liquid level; and iii) a third signal received from a vent gas flow meter, wherein the third signal indicates that a flow rate of the vent gas in the vent gas stream is zero.

11. The method of claim 10, further comprising:

during controlling, continuing to flow a portion of the vent gas to the vent gas recovery system.

12. The method of claim 10, wherein the one or more flare activation conditions comprises one or more of: i) a fourth signal received from the differential pressure sensor of the pressure seal apparatus, wherein the fourth signal indicates that the differential pressure between the seal inlet and the seal outlet of the pressure seal apparatus is greater than the static head pressure of the liquid in the pressure seal apparatus; ii) a fifth signal received from the liquid level sensor of the pressure seal apparatus, wherein the fifth signal indicates that the liquid level in the pressure seal apparatus is below the setpoint liquid level; iii) a sixth signal received from the vent gas flow meter, wherein the sixth signal indicates that the flow rate of the vent gas in the vent gas stream is greater than zero; and iv) a seventh signal received from a supplemental fuel gas flow meter, wherein the seventh signal indicates that a flow rate of supplemental fuel gas in a supplemental fuel gas stream is greater than zero.

13. The method of claim 12, further comprising:

filling the pressure seal apparatus with the liquid to the setpoint liquid level.

14. The method of claim 10, wherein a purge flow to the pressure seal apparatus is configured to prevent air ingress into a flare stack of the flare and the pressure seal apparatus.

15. The method of claim 10, wherein adjusting the flare from the standby state to the active state comprises:

increasing the flow of the supplemental fuel gas to the flare; and increasing the flow of steam or air to the flare.

16. The method of claim 15, wherein the supplemental fuel gas flows in a supplemental fuel gas stream that combines with the flow of the vent gas in the vent gas stream.

17. The method of claim 16, wherein the supplemental fuel gas stream combines with the vent gas stream at a location in the vent gas stream that is i) upstream of a gas analyzer that is configured to measure the concentration of the at least one hydrocarbon of the vent gas in the vent gas stream and ii) upstream or downstream of the vent gas flow meter in the vent gas stream.

18. The method of claim 10, wherein adjusting the flare from the active state to the standby state comprises:

stopping the flow of the supplemental fuel gas to the flare; and stopping the flow of steam or air to the flare.

19. The method of claim 10, further comprising:

after adjusting the flare from the active state to the standby state, continue flowing the vent gas to the vent gas recovery system while the flare is in the standby state.

* * * * *